United States Patent
Kondo et al.

(10) Patent No.: US 9,882,466 B2
(45) Date of Patent: Jan. 30, 2018

(54) POWER CONVERSION DEVICE INCLUDING AN AC/DC CONVERTER AND A DC/DC CONVERTER

(71) Applicant: Mitsubishi Electric Corporation, Chiyoda-ku (JP)

(72) Inventors: Ryota Kondo, Ciyoda-ku (JP); Takaaki Takahara, Chiyoda-ku (JP); Satoshi Murakami, Chiyoda-ku (JP); Masaki Yamada, Chiyoda-ku (JP); Naohisa Uehara, Chiyoda-ku (JP); Hidehiko Kinoshita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/504,555

(22) PCT Filed: Sep. 1, 2015

(86) PCT No.: PCT/JP2015/074873
§ 371 (c)(1),
(2) Date: Feb. 16, 2017

(87) PCT Pub. No.: WO2016/075996
PCT Pub. Date: May 19, 2016

(65) Prior Publication Data
US 2017/0244317 A1  Aug. 24, 2017

(30) Foreign Application Priority Data

Nov. 11, 2014  (JP) .................................. 2014-228831

(51) Int. Cl.
*H02M 1/42*  (2007.01)
*H02M 7/08*  (2006.01)
(Continued)

(52) U.S. Cl.
CPC ......... *H02M 1/4233* (2013.01); *H02M 1/083* (2013.01); *H02M 3/158* (2013.01); *H02M 7/04* (2013.01)

(58) Field of Classification Search
CPC .... H02M 1/4233; H02M 1/083; H02M 3/158; H02M 7/04
See application file for complete search history.

(56) References Cited

U.S. PATENT DOCUMENTS 6,940,734 B2 * 9/2005 Okuma ..................... H02J 3/16
363/37
2007/0047100 A1  3/2007 Takahashi et al.
(Continued)

FOREIGN PATENT DOCUMENTS

JP  2002-291260 A  10/2002
JP  2007-068338 A  3/2007
(Continued)

OTHER PUBLICATIONS

International Search Report dated Dec. 8, 2015 in PCT/JP2015/074873 filed Sep. 1, 2015.
(Continued)

*Primary Examiner* — Emily P Pham
(74) *Attorney, Agent, or Firm* — Oblon, McClelland, Maier & Neustadt, L.L.P.

(57) ABSTRACT

A main circuit of a power conversion device includes: an AC/DC converter for performing power factor correction control for a single-phase AC power supply; and a DC/DC converter connected to the AC/DC converter via a DC capacitor. In order to reduce ripple voltage and ripple current for the DC capacitor, a control circuit superimposes, onto a DC current command, an AC current command having the minimum value at the zero cross phase of the single-phase AC power supply and having the maximum value at the peak phase thereof, to generate an output current command for the
(Continued)

DC/DC converter, and performs output control for the DC/DC converter, using the output current command.

18 Claims, 46 Drawing Sheets

(51) Int. Cl.
*H02M 1/08* (2006.01)
*H02M 7/04* (2006.01)
*H02M 3/158* (2006.01)

(56) References Cited

U.S. PATENT DOCUMENTS

| | | | |
|---|---|---|---|
| 2013/0301323 A1 | 11/2013 | Iyasu et al. | |
| 2014/0346884 A1* | 11/2014 | Fujita | H02M 5/4585 307/72 |
| 2016/0280080 A1* | 9/2016 | Takei | B60L 11/1811 |

FOREIGN PATENT DOCUMENTS

| | | |
|---|---|---|
| JP | 2013-93952 A | 5/2013 |
| JP | 2013-255413 A | 12/2013 |
| JP | 2014-236662 A | 12/2014 |

OTHER PUBLICATIONS

Japanese Office Action dated Apr. 19, 2016 in 2016-503867 (with Partial English Translation) (7 pages).

\* cited by examiner

POWER CONVERSION DEVICE INCLUDING AN AC/DC CONVERTER AND A DC/DC CONVERTER

TECHNICAL FIELD

The present invention relates to a power conversion device in which an AC/DC converter for converting power while performing power factor correction control for an AC power supply, and a DC/DC converter are connected to each other via a DC capacitor.

BACKGROUND ART

In a motor control device as a conventional power conversion device, an AC power supply is rectified by a rectification circuit unit, and a high-power-factor converter circuit unit steps up inputted DC voltage and outputs the resultant voltage. The high-power-factor converter circuit unit controls the time ratio of ON and OFF of a switching transistor in a sinewave manner, thereby improving the power factor, and controls the DC voltage. The stepped-up DC voltage is stabilized by a smoothing capacitor, and an inverter circuit unit converts the DC voltage supplied from the smoothing capacitor, to three-phase AC, and supplies the resultant voltage to a motor, to drive the motor. In the case where the smoothing capacitor has a small capacitance, if, in particular, the commercial AC power supply is a single-phase type, ripple voltage of DC bus voltage, which varies at a frequency twice as high as the power supply frequency, increases.

The voltage applied to the motor varies due to the ripple voltage of the DC bus voltage, whereby the motor phase current pulsates. In order to remove the pulsation, a control unit outputs, to the inverter circuit unit, a voltage pulse corrected so as not to be influenced by the DC bus ripple voltage, by applying, to DC bus voltage, a feedback value of DC bus voltage detected by DC bus voltage detection means when calculating a current command, and thus drives the motor (see, for example, Patent Document 1).

CITATION LIST

Patent Document

Patent Document 1: Japanese Laid-Open Patent Publication No. 2002-291260

SUMMARY OF THE INVENTION

Problems to be Solved by the Invention

In such a conventional power conversion device, since the inverter circuit unit is controlled so that power pulsation having a frequency twice as high as the frequency of the power supply voltage does not flow out to a load, voltage ripple at the smoothing capacitor increases. If the voltage ripple is great, the maximum voltage causes overvoltage in the power conversion device, or due to the minimum voltage, output voltage from the inverter circuit unit cannot be ensured, and thus it is difficult to reliably operate the power conversion device. In addition, there is a problem that increasing the capacitance of the capacitor in order to reduce the voltage ripple leads to increase in the size of the power conversion device.

The present invention has been made to solve the above problems, and an object of the present invention is to obtain a power conversion device that reduces voltage oscillation of a DC capacitor by outputting permissible power pulsation, and that has a small size and high reliability.

Solution to the Problems

A first power conversion device according to the present invention includes: an AC/DC converter for performing power factor correction control for a single-phase AC power supply and converting AC power from the single-phase AC power supply, to DC power; a DC/DC converter which is connected to a DC side of the AC/DC converter and performs voltage conversion of DC power; a DC capacitor connected between positive and negative DC buses between the AC/DC converter and the DC/DC converter; and a control circuit for performing output control for the AC/DC converter and the DC/DC converter. The control circuit superimposes, onto a DC current command, an AC current command having a minimum value at a zero cross phase of the single-phase AC power supply and having a maximum value at a peak phase thereof, to generate an output current command for the DC/DC converter, and performs output control for the DC/DC converter, using the output current command.

A second power conversion device according to the present invention includes: an AC/DC converter for performing power factor correction control for a single-phase AC power supply and converting AC power from the single-phase AC power supply, to DC power; a DC/DC converter which is connected to a DC side of the AC/DC converter and performs voltage conversion of DC power; a DC capacitor connected between positive and negative DC buses between the AC/DC converter and the DC/DC converter; and a control circuit for performing output control for the AC/DC converter and the DC/DC converter. The control circuit controls the DC/DC converter with a constant duty cycle, generates a voltage command for the DC capacitor so as to contain an AC voltage component, and performs output control for the AC/DC converter, using an output current command based on the voltage command.

Effect of the Invention

The first and second power conversion devices of the present invention cause the DC/DC converter to output permissible power pulsation and thereby can reduce voltage oscillation of the DC capacitor without increasing the capacitance of the DC capacitor. Thus, it becomes possible to improve the reliability of the power conversion devices and promote downsizing thereof.

DESCRIPTION OF EMBODIMENTS

Embodiment 1

Figure 1:
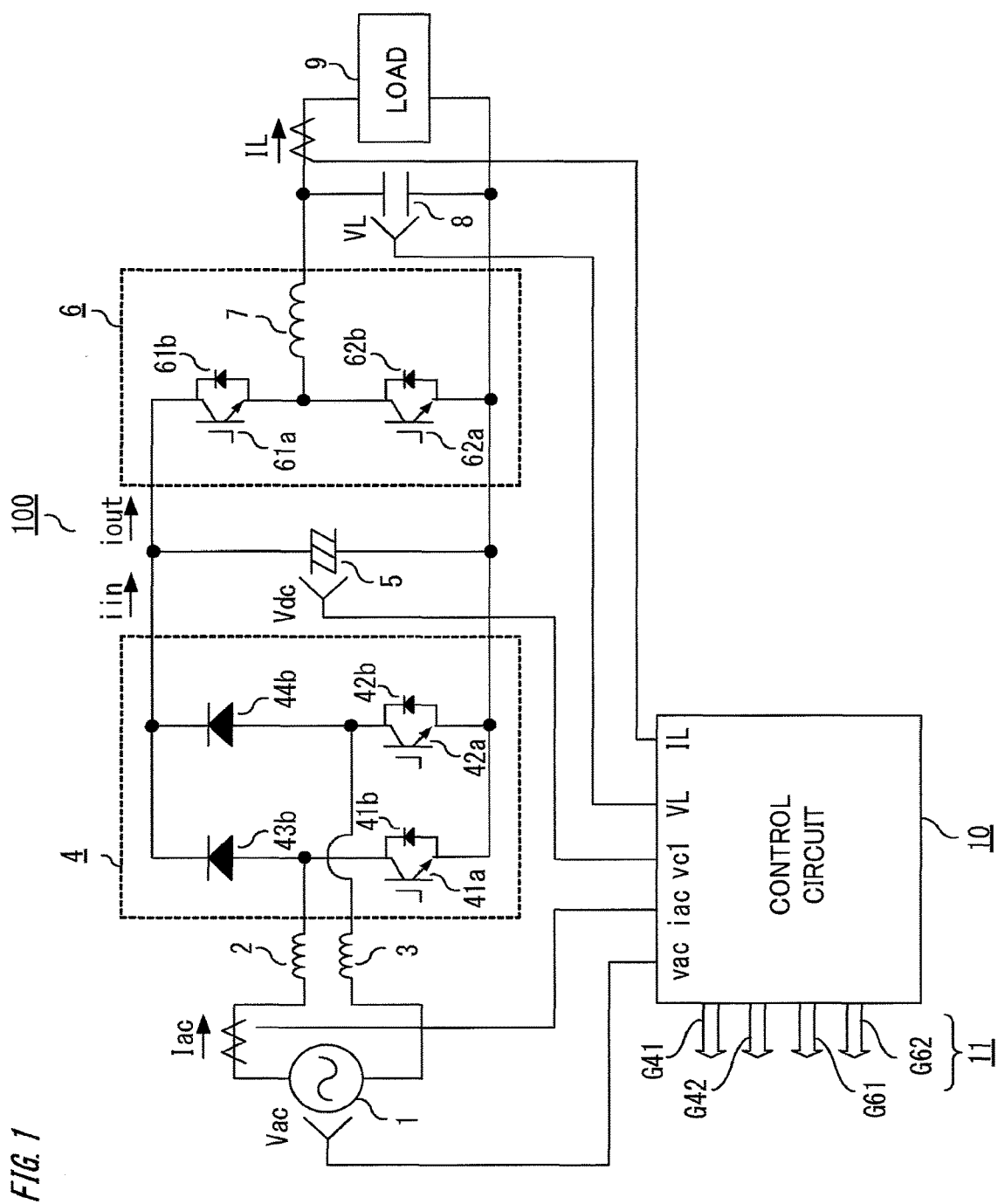
FIG. 1 is a configuration diagram of a power conversion device according to embodiment 1 of the present invention.

Hereinafter, a power conversion device according to embodiment 1 of the present invention will be described. FIG. 1 is a schematic configuration diagram of the power conversion device according to embodiment 1 of the present invention.

As shown in FIG. 1, the power conversion device 100 includes: a main circuit for converting AC power from a single-phase AC power supply 1 (hereinafter, simply referred to as an AC power supply 1), to DC power, and outputting the DC power to a load 9; and a control circuit 10.

The main circuit includes: an AC/DC converter 4 for performing power factor correction control for the AC power supply 1 and converting AC power to DC power; a DC/DC converter 6 which is connected to the DC side of the AC/DC converter 4 and performs voltage conversion of the DC power; and a DC capacitor 5 connected between DC buses between the AC/DC converter 4 and the DC/DC converter 6. In addition, reactors 2 and 3 for current limitation are provided on the input side, and a smoothing capacitor 8 is provided on the output side.

In this case, the AC/DC converter 4 is configured as a semi-bridgeless circuit, and includes semiconductor switching elements 41a, 42a and diode elements 43b, 44b. The semiconductor switching elements 41a, 42a are formed from IGBTs (Insulated Gate Bipolar Transistors), to which diodes 41b, 42b are respectively connected in antiparallel.

In this case, the DC/DC converter 6 is configured as a step-down chopper circuit of a non-isolation type, and includes semiconductor switching elements 61a, 62a, and a reactor 7 for current control. The semiconductor switching elements 61a, 62a are formed from IGBTs, to which diodes 61b, 62b are respectively connected in antiparallel.

It is noted that, instead of IGBTs, the semiconductor switching elements 41a, 42a, 61a, 62a may be MOSFETs (Metal Oxide Semiconductor Field Effect Transistors) including diodes between the sources and drains, or may be semiconductor switching elements such as thyristors. In the case of using MOSFETs, the included diodes may be used as the diodes 41b, 42b, 61b, 62b.

A P-side terminal of the DC capacitor 5 is connected to a P terminal of the DC output side of the AC/DC converter 4, and a P terminal on the DC input side of the DC/DC converter 6. An N-side terminal of the DC capacitor 5 is connected to an N terminal on the DC output side of the AC/DC converter 4, and an N terminal on the DC input side of the DC/DC converter 6.

The DC capacitor 5 has an energy buffer function, and smooths the difference between power inputted from the AC/DC converter 4 and power outputted from the DC/DC converter 6. The DC capacitor 5 may be formed from an aluminum electrolytic capacitor, a film capacitor, a ceramic capacitor, a tantalum capacitor, an EDLC (electric double layered capacitor), or the like. Alternatively, the DC capacitor 5 may be formed by a battery such as a lithium ion battery.

The load 9 may be an electric apparatus driven with DC voltage, or a power storage element such as a battery or a capacitor.

AC voltage vac of the AC power supply 1, voltage vc1 of the DC capacitor 5, and load voltage VL which is voltage of the smoothing capacitor 8, are detected by voltage sensors (not shown), and the detected voltages are inputted to the control circuit 10. Further, AC current iac of the AC power supply 1 and load current IL are detected by current sensors, and the detected currents are inputted to the control circuit 10. The control circuit 10 generates gate signals 11 (gate signals G41, G42, G61, G62 for the semiconductor switching elements 41a, 42a, 61a, 62a) on the basis of the inputted voltage current information, to perform output control for the AC/DC converter 4 and the DC/DC converter 6.

It is noted that Vac indicates a voltage effective value of the AC power supply 1, Iac indicates a current effective value of the AC power supply 1, Vdc indicates a DC voltage component of the DC capacitor 5, iin indicates input current of the DC capacitor 5, and iout indicates output current of the DC capacitor 5.

The operation of the power conversion device 100 configured as described above will be described below.

Figure 2:
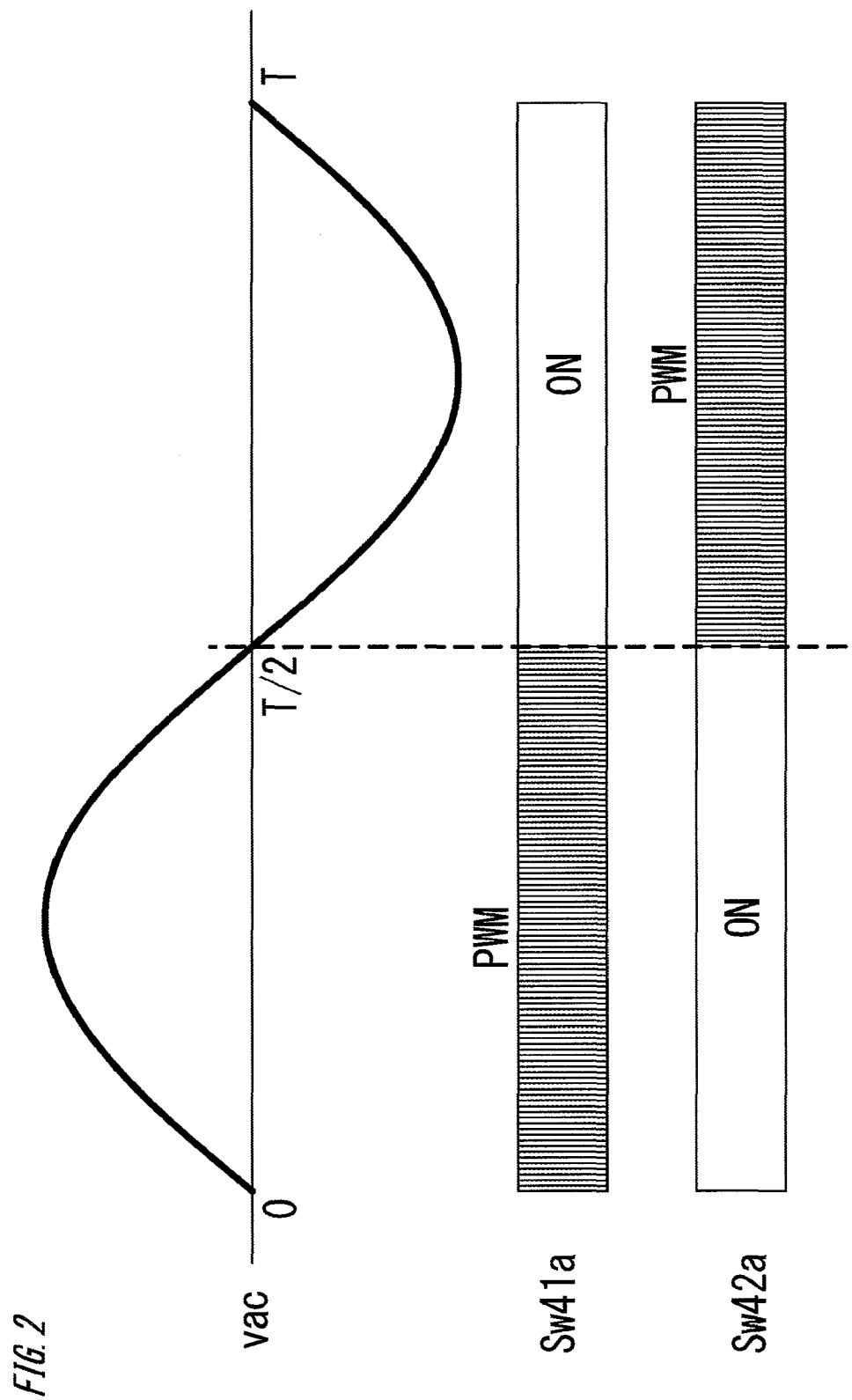
FIG. 2 is a diagram illustrating operation of an AC/DC converter according to embodiment 1 of the present invention.

FIG. 2 is a diagram illustrating operation of the AC/DC converter 4. In FIG. 2, Sw41a and Sw42a indicate the switching states of the semiconductor switching elements 41a and 42a.

One cycle of the AC power supply 1 is denoted by T. During the period from time 0 to time T/2, voltage vac of the AC power supply 1 has a positive polarity, and the control circuit 10 turns on the semiconductor switching element 42a and performs PWM control for the semiconductor switching element 41a, to perform control so that the input power factor from the AC power supply 1 becomes substantially 1, that is, to control current iac at a high power factor. During the period from time T/2 to time T, voltage vac of the AC power supply 1 has a negative polarity, and the control circuit 10 turns on the semiconductor switching element 41a and performs PWM control for the semiconductor switching element 42a, to perform control so that the input power factor from the AC power supply 1 becomes substantially 1, that is, to control current iac at a high power factor.

FIG. 3 to FIG. 6 are current route diagrams illustrating operation of the AC/DC converter 4.

Figure 3:
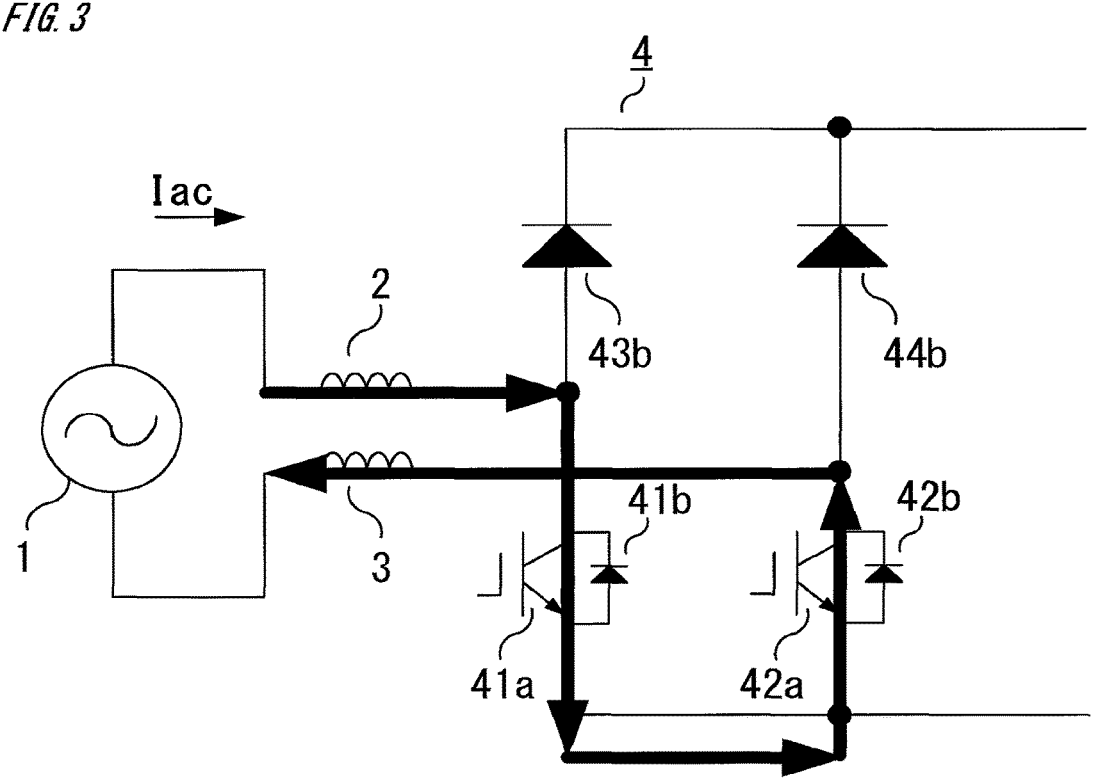
FIG. 3 is a current route diagram illustrating operation of the AC/DC converter according to embodiment 1 of the present invention.
Figure 4:
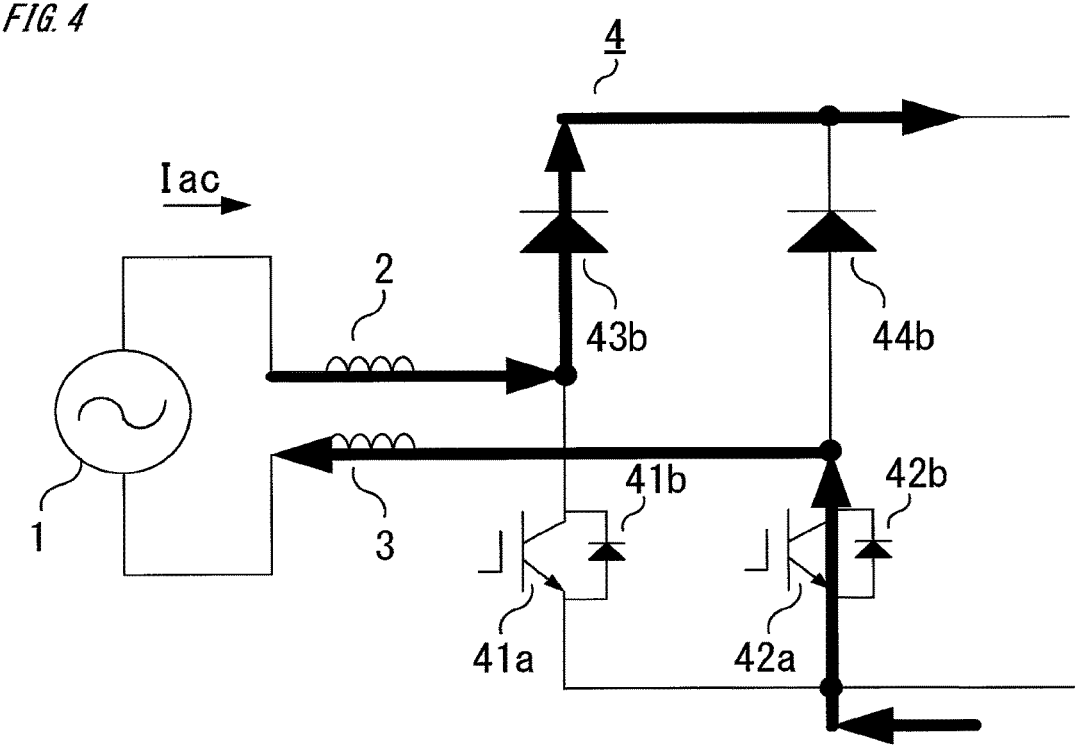
FIG. 4 is a current route diagram illustrating operation of the AC/DC converter according to embodiment 1 of the present invention.

During the period from time 0 to time T/2, the semiconductor switching element 42a is kept in an ON state, and when the semiconductor switching element 41a is turned on, the input current is short-circuited via the reactors 2 and 3, and the reactor 2 and the reactor 3 are excited, so that the current increases in the positive direction (FIG. 3). Then, when the semiconductor switching element 41a is turned off, excitation energy accumulated in the reactor 2 and the reactor 3 is outputted to the DC capacitor 5 side via the diode 43b. At this time, the current in the reactors 2 and 3 decreases (FIG. 4).

Figure 5:
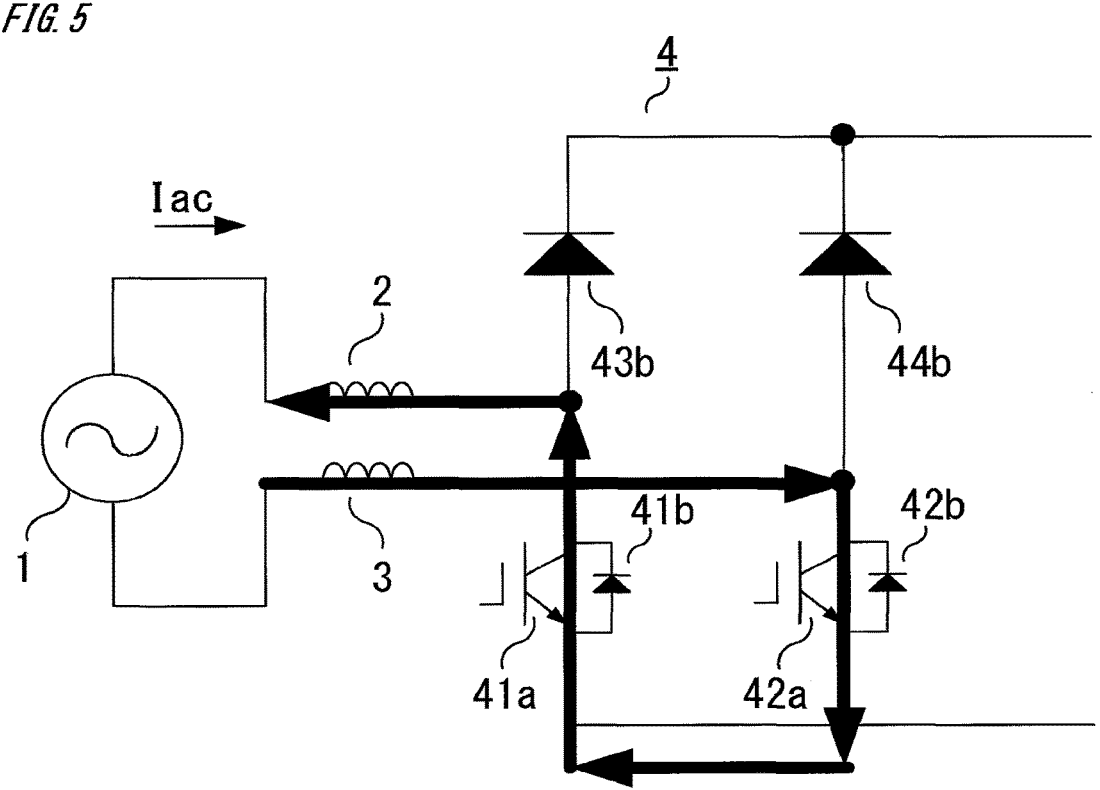
FIG. 5 is a current route diagram illustrating operation of the AC/DC converter according to embodiment 1 of the present invention.
Figure 6:
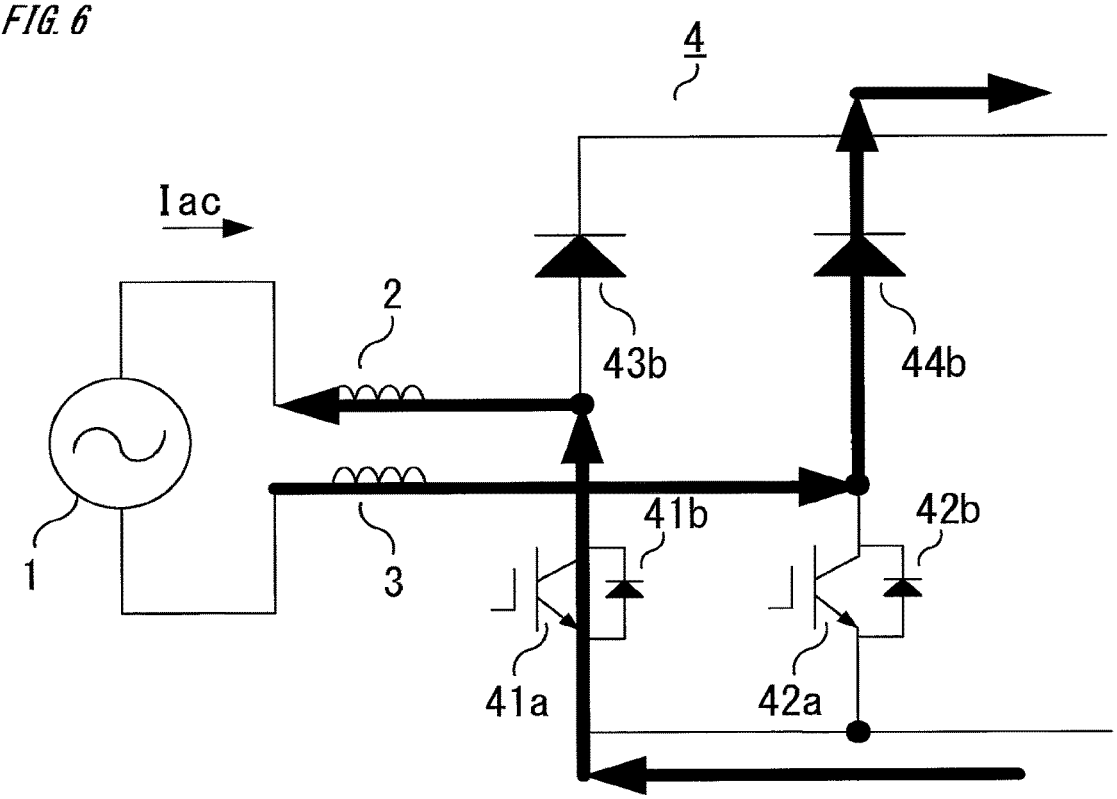
FIG. 6 is a current route diagram illustrating operation of the AC/DC converter according to embodiment 1 of the present invention.

During the period from time T/2 to time T, the semiconductor switching element 41a is kept in an ON state, and when the semiconductor switching element 42a is turned on, the input current is short-circuited via the reactors 2 and 3, and the reactor 2 and the reactor 3 are excited, so that the current increases in the negative direction (FIG. 5). Then, when the semiconductor switching element 42a is turned off, excitation energy accumulated in the reactor 2 and the reactor 3 is outputted to the DC capacitor 5 side via the diode 44b. At this time, the current in the reactors 2 and 3 decreases (FIG. 6).

The control circuit 10 performs high power factor control for the inputted AC current iac by performing ON/OFF control for the semiconductor switching elements 41a, 42a as described above. It is noted that ideally, the semiconductor switching element 41a and the semiconductor switching element 42a are driven with the same duty cycle.

Here, a theoretical duty cycle D41 for the semiconductor switching element 41a when the current iac is controlled at a high power factor is shown in the following expression (1). In this case, a duty cycle D43 for the diode 43b is represented by expression (2) on the basis of expression (1). It is noted that voltage vac of the AC power supply 1 is defined by expression (3). Therefore, current iin flowing into the DC capacitor 5 can be calculated by expression (4).

It is noted that it is assumed that there is no loss between the AC power supply 1 and the DC capacitor 5.

$$D41 = (Vdc - vac)/Vdc \quad (1)$$

$$D43 = vac/Vdc \quad (2)$$

$$vac = (\sqrt{2})Vac \cdot \sin \omega t \quad (3)$$

$$iin = (vac/Vdc)iac = (2Vac \cdot Iac/Vdc)\sin^2 \omega t \quad (4)$$

Next, operation of the DC/DC converter 6 will be described.

A step-down chopper circuit is used for the DC/DC converter 6. The control circuit 10 performs ON/OFF control for the semiconductor switching elements 61a, 62a, thereby causing the DC capacitor 5 to output DC power and controlling current IL and voltage VL to the load 9, to be desired values.

Figure 7:
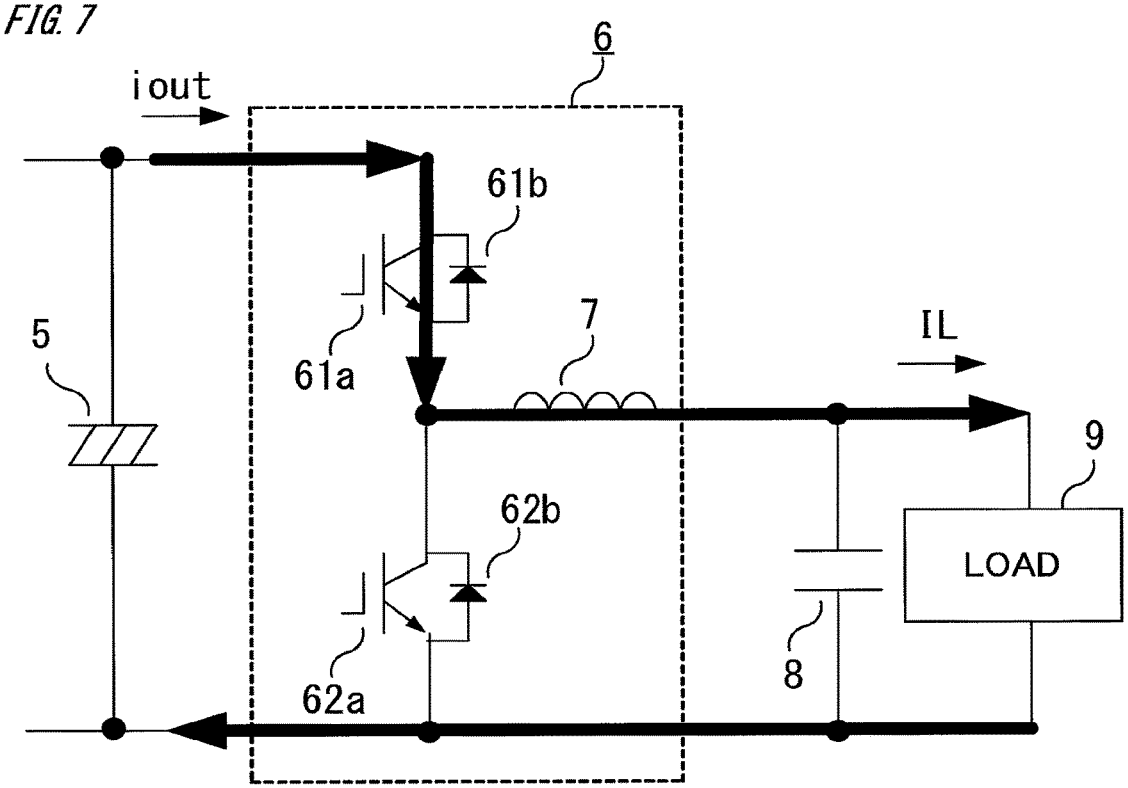
FIG. 7 is a current route diagram illustrating operation of a DC/DC converter according to embodiment 1 of the present invention.
Figure 8:
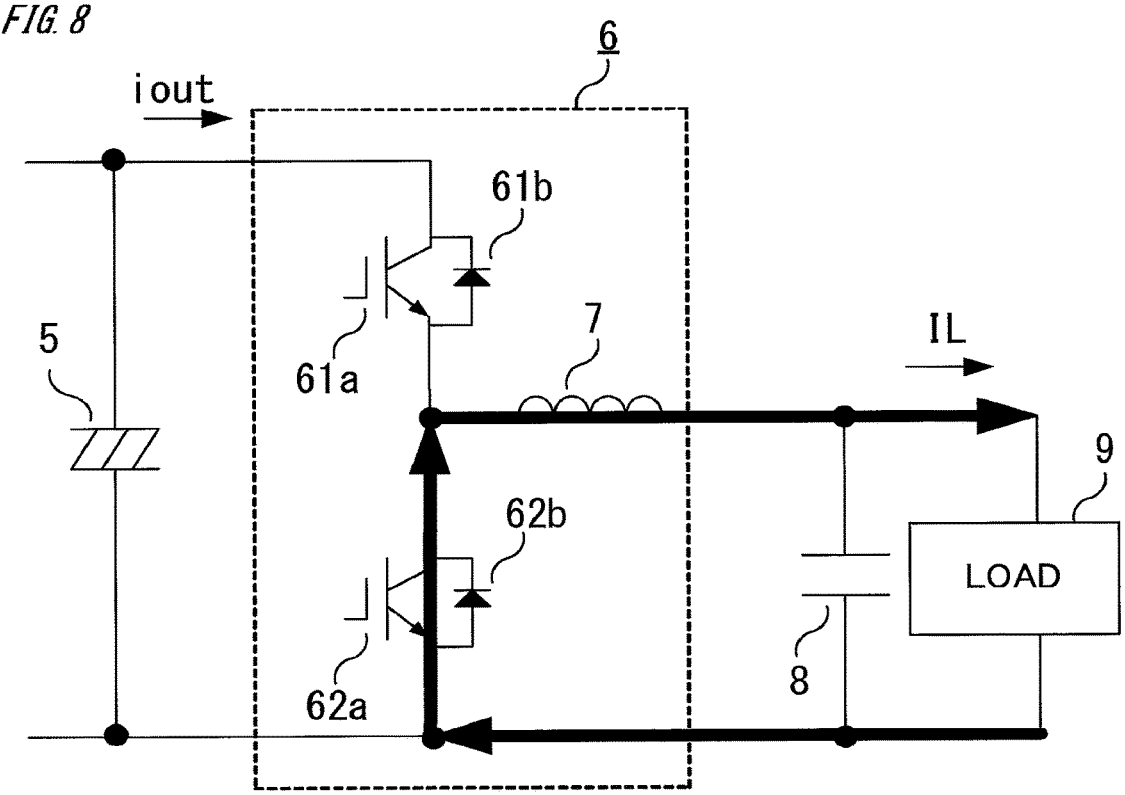
FIG. 8 is a current route diagram illustrating operation of the DC/DC converter according to embodiment 1 of the present invention.

FIG. 7 and FIG. 8 are current route diagrams illustrating operation of the DC/DC converter 6.

During a period in which the semiconductor switching element 61a is turned on, the semiconductor switching element 62a is turned off, and current flows from the DC capacitor 5 to the semiconductor switching element 61a, the reactor 7, and the load 9 (FIG. 7). During a period in which the semiconductor switching element 62a is turned on, the semiconductor switching element 61a is turned off. When the semiconductor switching element 62a is turned on and the semiconductor switching element 61a is turned off from the state in FIG. 7, current circulates through the semiconductor switching element 62a and the reactor 7 to the load 9, due to the current continuity of the reactor 7 (FIG. 8).

For the DC/DC converter 6 which operates as described above, the control circuit 10 adjusts the duty cycle of the semiconductor switching element 61a and the semiconductor switching element 62a, thereby adjusting power supplied to the load 9, in this case, adjusting the load current IL. The DC/DC converter 6 supplies the current IL to the load 9 at the DC voltage VL, thereby supplying DC power to the load 9.

The current iout outputted from the DC capacitor 5 is discontinuous with respect to the switching cycles of the semiconductor switching elements 61a, 62a, but can be considered to be current that is continuous, on average, with respect to the cycle T of the AC power supply 1. Output current iout of the DC capacitor 5 is assumed to be DC current Idc. In this case, the voltage relational expression of the DC capacitor 5 can be represented by the following expression (5). Here, Cdc is the electrostatic capacitance of the DC capacitor 5, and vc2 is an AC voltage component (ripple voltage) of the DC capacitor 5. Under the assumption that the inputted AC current iac is subjected to high power factor control, the inputted AC current iac is represented by expression (6). By solving expression (5) for AC voltage component vc2 of the DC capacitor 5, expression (7) is derived.

$$Cdc(dvc2/dt) = iin - iout = (2Vac \cdot Iac/Vdc)\sin^2 \omega t - Idc \quad (5)$$

$$iac = (\sqrt{2})Iac \cdot \sin \omega t \quad (6)$$

$$vc2 = (2Vac \cdot Iac/2\omega Cdc \cdot Vdc)\sin(2\omega t) \quad (7)$$

Figure 9:
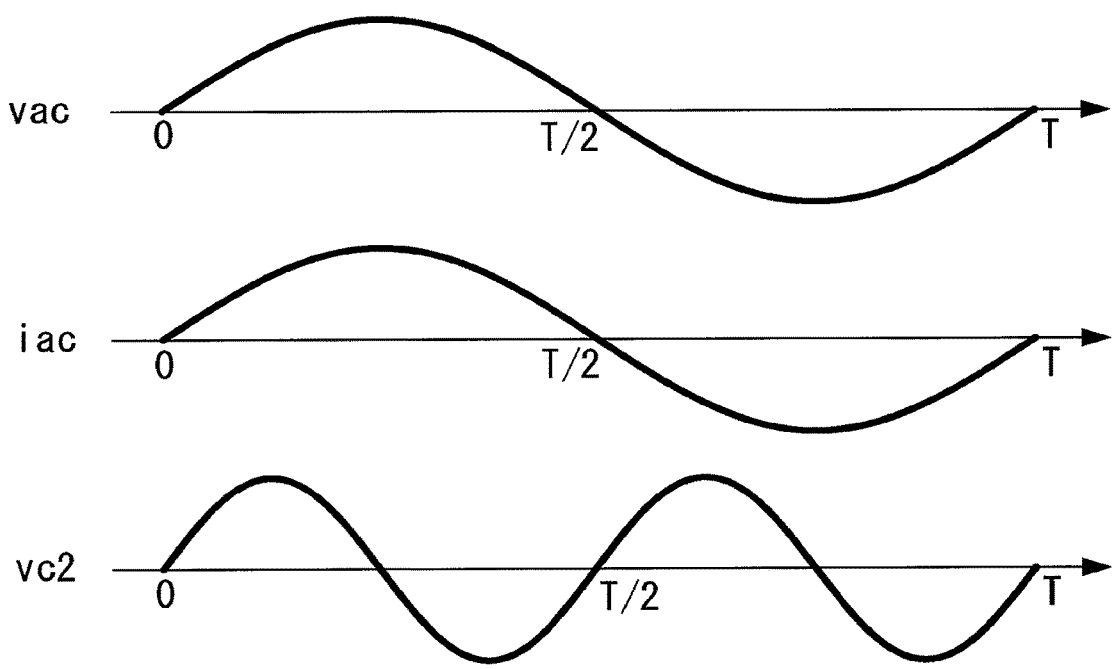
FIG. 9 is a waveform diagram showing voltage and current of an AC power supply and ripple voltage of a DC capacitor in a reference example of embodiment 1 of the present invention.

Expression (7) indicates that, if output current iout of the DC capacitor 5 is DC current, the ripple voltage vc2 that has a frequency twice as high as the frequency of the AC power supply 1 necessarily occurs on the DC capacitor 5, by the high power factor control performed in the AC/DC converter 4 connected to the AC power supply 1. FIG. 9 shows a waveform diagram of such ripple voltage vc2, and the voltage vac and current iac of the AC power supply 1, as a reference example of the present embodiment. As shown in FIG. 9, the ripple voltage vc2 greatly varies at a frequency twice as high as the frequency of the AC power supply 1.

In the present embodiment, in order to suppress the ripple voltage vc2 occurring on the DC capacitor 5, the control circuit 10 intentionally superimposes an AC current component (ripple current) irp onto output current iout of the DC capacitor 5. Specifically, the DC/DC converter 6 is controlled so that an AC current component (ripple current) is generated in current IL outputted to the load 9, thereby generating ripple current irp in output current iout of the DC capacitor 5.

Figure 10:
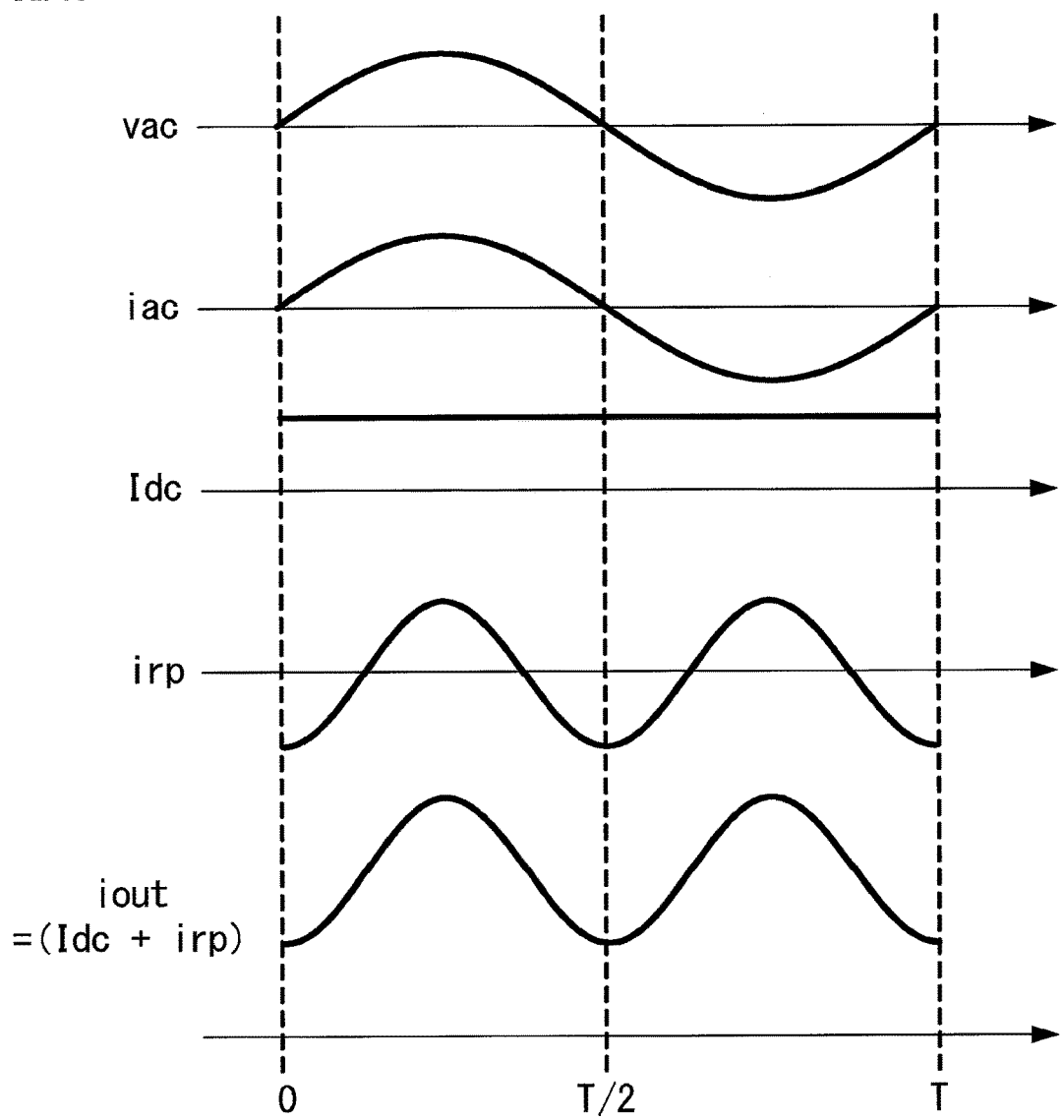
FIG. 10 is a waveform diagram showing each component contained in output current of the DC capacitor according to embodiment 1 of the present invention.

FIG. 10 is a waveform diagram showing voltage vac and current iac of the AC power supply 1 and components contained in output current iout of the DC capacitor 5. The output current iout of the DC capacitor 5 is current obtained by superimposing ripple current irp onto the DC current component Idc, and the ripple current irp to be superimposed is sinewave current having a frequency twice as high as the frequency of voltage vac of the AC power supply 1. The initial phase of the ripple current irp is set such that the ripple current irp has the minimum value at the zero cross phase of the AC power supply 1 and has the maximum value at the peak phase thereof.

If voltage vac of the AC power supply 1 shown in FIG. 10 is defined as shown by the above expression (3) and AC current iac controlled at a power factor of 1 is defined as shown by the above expression (6), ripple current irp of the DC capacitor 5 is represented by the following expression (8), and output current iout is represented by the following expression (9). Here, Irp is the effective value of ripple current irp.

$$irp = -(\sqrt{2})Irp \cdot \cos(2\omega t) \quad (8)$$

$$iout = Idc - (\sqrt{2})Irp \cdot \cos(2\omega t) \quad (9)$$

Figure 11:
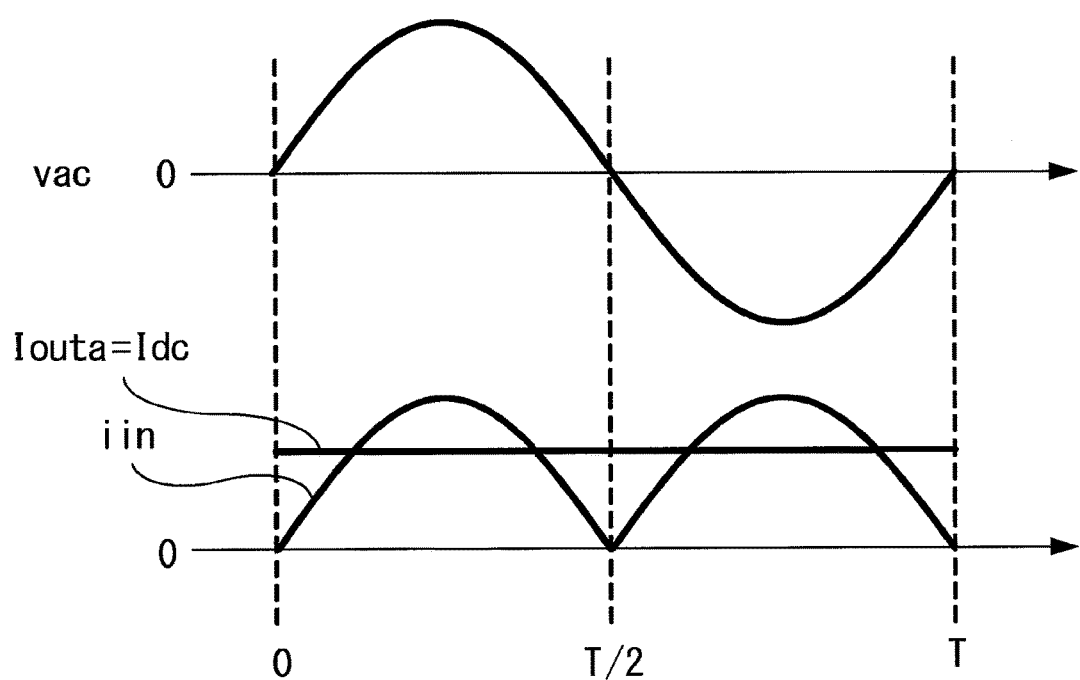
FIG. 11 is a waveform diagram showing input and output currents of the DC capacitor in a comparative example of embodiment 1 of the present invention.

FIG. 11 is a waveform diagram showing input and output currents of the DC capacitor 5 in the case where the DC capacitor 5 outputs only DC current, as a comparative example. In this case, output current iouta of the DC capacitor 5 becomes the DC current Idc.

As shown in FIG. 11, at the zero cross phase of the AC power supply 1, since input current iin to the DC capacitor 5 is almost zero, charge/discharge current (iin−iouta) compensated by the DC capacitor 5 becomes almost (−Idc), that is, the DC capacitor 5 mostly bears the outputted DC current Idc. On the other hand, at the peak phase, since input current iin has the maximum value, the charge/discharge current (iin−iouta) compensated by the DC capacitor 5 becomes surplus for charging, so that the surplus current flows into the DC capacitor 5 and charges the DC capacitor 5.

Figure 12:
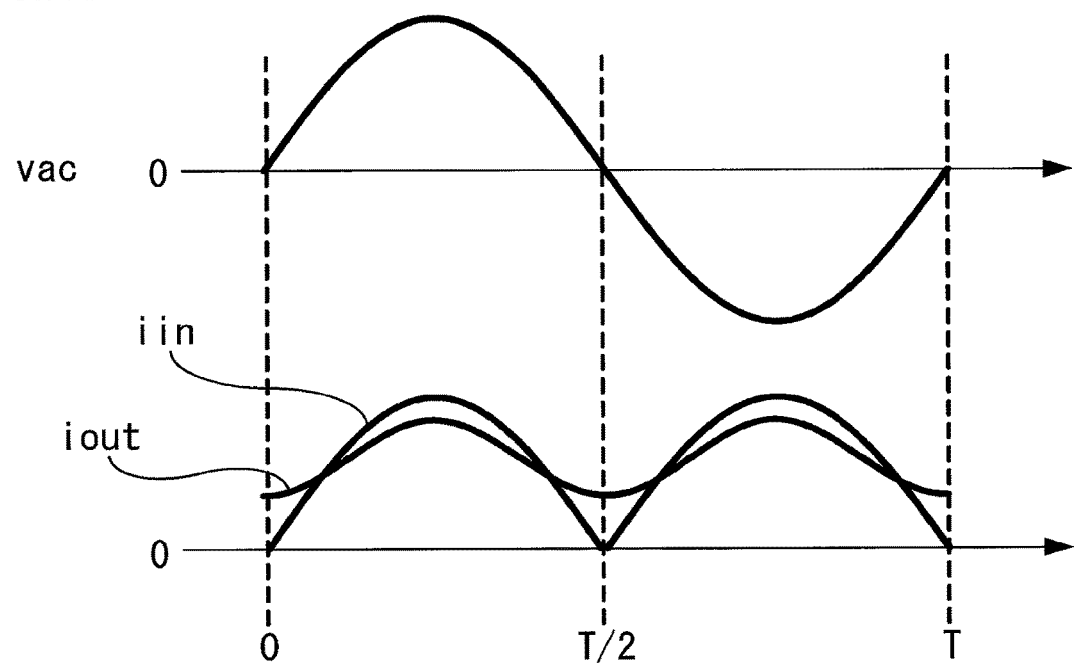
FIG. 12 is a waveform diagram showing input and output currents of the DC capacitor according to embodiment 1 of the present invention.

In the present embodiment, output current iout of the DC capacitor 5 includes the ripple current irp superimposed thereon as described above. FIG. 12 is a waveform diagram showing input and output currents of the DC capacitor 5.

As shown in FIG. 12, at the zero cross phase of the AC power supply 1, output current iout becomes the minimum value along with input current iin of the DC capacitor 5 becoming almost zero. At the peak phase, output current iout becomes the maximum value along with input current iin becoming the maximum value. Thus, the charge/discharge current (iin−iout), which is ripple current, compensated by the DC capacitor 5 can be suppressed, and the ripple voltage vc2 and the ripple current effective value of the DC capacitor 5 can be suppressed.

Since the DC capacitor 5 outputs the output current iout shown by the above expression (9), the voltage relational expression of the DC capacitor 5 can be represented by the following expression (10). By solving expression (10) for ripple voltage vc2 of the DC capacitor 5, expression (11) is derived.

$$Cdc(dvc2/dt) = iin - iout \quad (10)$$
$$= (2Vac \cdot Iac/Vdc)\sin^2 \omega t -$$
$$(Idc - (\sqrt{2})Irp \cdot \cos(2\omega t))$$

$$vc2 = ((Vac \cdot Iac - Vdc \cdot (\sqrt{2})Irp)/2\omega Cdc \cdot Vdc) \cdot \sin(2\omega t) \quad (11)$$

As shown in the above expression (11), when the peak value ($\sqrt{2}$)Irp of ripple current irp superimposed on output current iout of the DC capacitor 5 increases, ripple voltage vc2 occurring on the DC capacitor 5 decreases.

An amplitude ΔVdc of ripple voltage vc2 which is an AC voltage component of the DC capacitor 5 is defined by the following expression (12) on the basis of the above expression (11).

$$\Delta Vdc = ((Vac \cdot Iac - Vdc \cdot (\sqrt{2})Irp)/2\omega Cdc \cdot Vdc) \quad (12)$$

Input current iin flowing into the DC capacitor 5 can be represented by the following expression (13). Since output current iout flowing out from the DC capacitor 5 is represented by the above expression (9), charge/discharge current (iin−iout) of the DC capacitor 5 is represented by the following expression (14).

Expression (13) and expression (14) can be represented by expression (13a) and expression (14a) using load voltage VL and load current IL. Here, IL* is a command value for load current IL, and ILrp is the effective value of the ripple current to be generated in the load current IL.

$$iin = (Vac \cdot Iac/Vdc) \cdot (1 + \cos(2\omega t - \pi)) \quad (13)$$
$$= (VL \cdot IL/Vdc) \cdot (1 + \cos(2\omega t - \pi)) \quad (13a)$$
$$iin - iout = (Idc - (\sqrt{2})Irp) \cdot \cos(2\omega t - \pi) \quad (14)$$
$$= (VL/Vdc) \cdot (IL^* - (\sqrt{2})ILrp) \cdot \cos(2\omega t - \pi) \quad (14a)$$

As shown by the above expression (14a), it is found that charge/discharge current (iin−iout) of the DC capacitor 5 becomes a component having a frequency twice as high as the frequency of voltage vac of the AC power supply 1. In addition, the charge/discharge current (iin−iout) decreases when the peak value ($\sqrt{2}$)Irp of ripple current irp superimposed on output current iout increases, or the ripple current peak value ($\sqrt{2}$)ILrp generated in load current IL increases.

An amplitude ΔIrp of charge/discharge current (iin−iout) of the DC capacitor 5 is defined by the following expression (15) on the basis of the above expression (14a).

$$\Delta Irp = (VL/Vdc) \cdot (IL^* - (\sqrt{2})ILrp) \quad (15)$$

By the way, a current component having a carrier frequency of the AC/DC converter 4 and the DC/DC converter 6 flows into or from the DC capacitor 5. The charge/discharge current of the DC capacitor 5 is actually defined by the total sum including other frequency components such as the carrier frequency component, as well as the one shown by the above expression (14a). In particular, the carrier frequency is dominant and is greatly higher than the power supply frequency of the AC power supply 1, and the current component having the carrier frequency, which flows into or from the DC capacitor 5, is constant without depending on the frequency component twice as high as the frequency of the AC power supply 1. That is, of the charge/discharge current of the DC capacitor 5, the current component shown by expression (14a) varies but the current component having the carrier frequency is constant. Therefore, in the present embodiment, the current component shown by expression (14a) is suppressed, and the ripple current converges to the current component having the carrier frequency.

As described above, by the DC capacitor 5 outputting ripple current irp shown by the above expression (8), ripple voltage vc2 occurring on the DC capacitor 5 can be suppressed on the basis of the above expression (11), and charge/discharge current (iin−iout) compensated by the DC capacitor 5 can be suppressed on the basis of the above expression (14a). The ripple current irp outputted from the DC capacitor 5 is sinewave current having a frequency twice as high as the frequency of voltage vac of the AC power supply 1, and the initial phase of the ripple current irp is set such that the ripple current irp has the minimum value at the zero cross phase and has the maximum value at the peak phase. The DC/DC converter 6 causes the DC capacitor 5 to output such ripple current irp.

Next, control for the AC/DC converter 4 and the DC/DC converter 6 by the control circuit 10 will be described.

Figure 13:
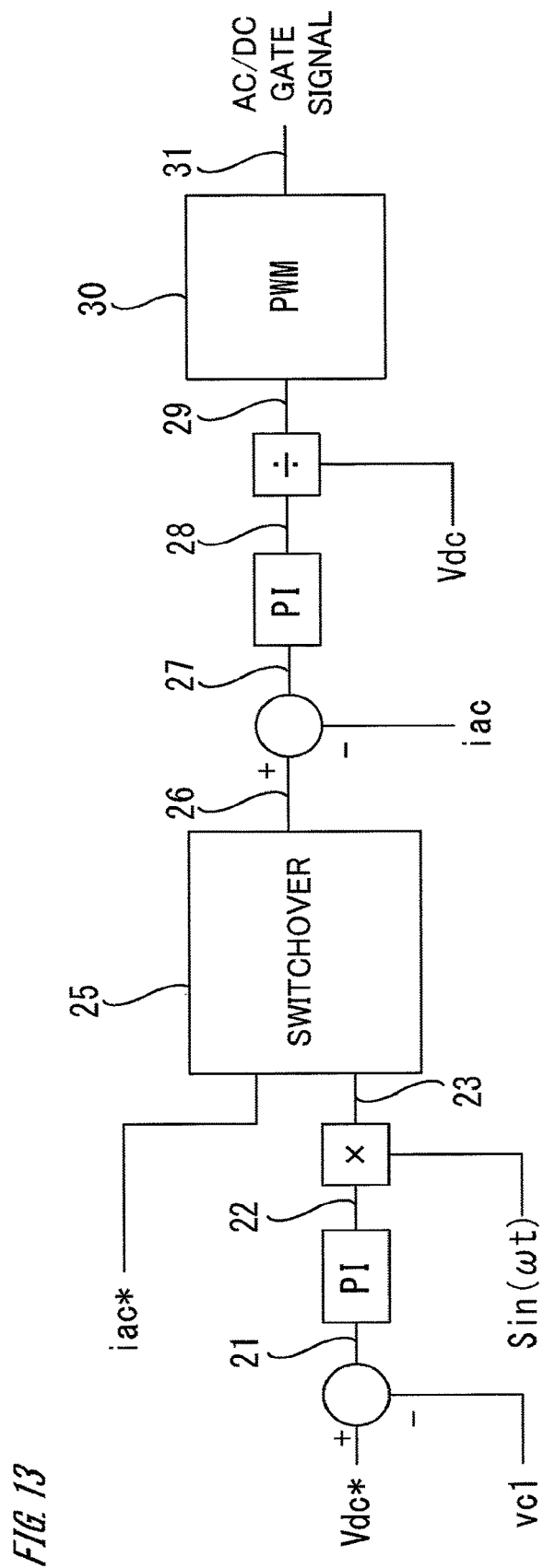
FIG. 13 is a control block diagram showing generation of a gate signal for the AC/DC converter according to embodiment 1 of the present invention.

FIG. 13 is a control block diagram showing generation of a gate signal for the AC/DC converter 4, in the control circuit 10. In control for the AC/DC converter 4, the control circuit 10 controls current iac inputted from the AC power supply 1, at a power factor of 1 with respect to voltage vac of the AC power supply 1. Further, the control circuit 10 selectively performs voltage control for the DC capacitor 5.

In the case where the control circuit 10 performs constant voltage control for controlling voltage vc1 of the DC capacitor 5 to be constant, a deviation 21 between a DC voltage command value Vdc* and detected voltage vc1 is subjected to PI control, to generate a current command amplitude 22. Then, the current command amplitude 22 is multiplied by a sinewave signal sin ωt having the same phase as voltage vac of the AC power supply 1, to calculate a current command 23.

On the other hand, in control for the AC/DC converter 4, in the case where the control circuit 10 performs only high power factor control for current iac without performing constant voltage control for voltage vc1 of the DC capacitor 5, a current command iac* is prepared.

A switchover device 25 selects one of the current command 23 and the current command iac* as a current command 26, in accordance with whether or not to perform constant voltage control for the DC capacitor 5. Next, a deviation 27 between the current command 26 and detected current iac is subjected to PI control, to calculate a voltage command value 28, and the voltage command value 28 is divided by the DC voltage component Vdc of the DC capacitor 5, thereby calculating a duty cycle 29. Then, a PWM circuit 30 generates a gate signal 31 for performing PWM control for the AC/DC converter 4, on the basis of the duty cycle 29. In the PWM circuit 30, the carrier frequency can be arbitrarily adjusted, and a triangle wave, a saw-tooth wave, or the like is used as the carrier wave.

Figure 14:
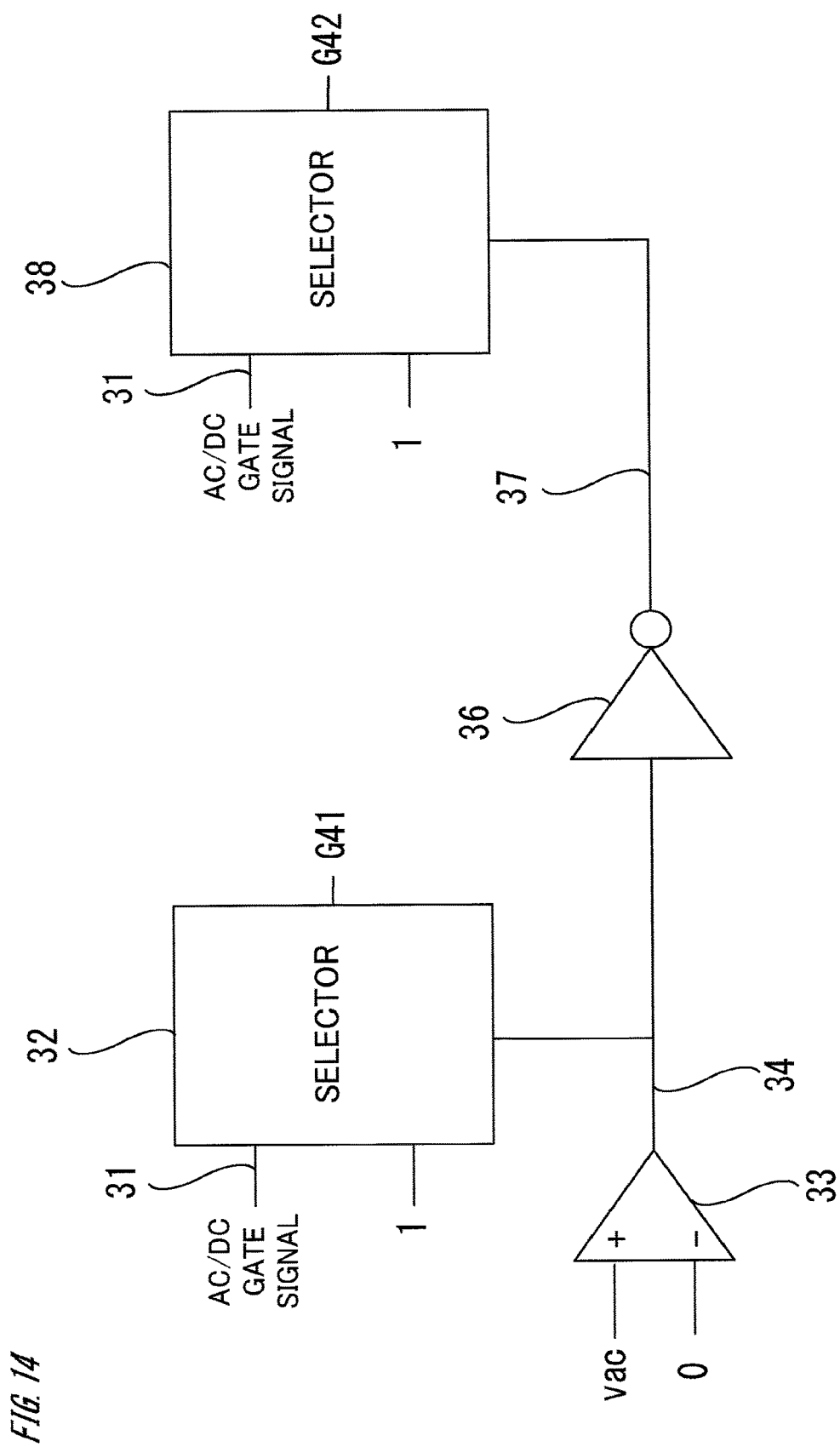
FIG. 14 is a control block diagram showing generation of gate signals for the AC/DC converter according to embodiment 1 of the present invention.

FIG. 14 is a control block diagram showing generation of gate signals G41, G42 for the respective semiconductor switching elements 41a, 42a in the AC/DC converter 4, in the control circuit 10.

The gate signal 31 is inputted to a selector 32 for the semiconductor switching element 41a, and a selector 38 for the semiconductor switching element 42a. A polarity determination device 33 determines the polarity of voltage vac of the AC power supply 1, and outputs a signal 34 which indicates 1 when the voltage vac is positive, and indicates 0 when the voltage vac is negative.

On the basis of the signal 34 from the polarity determination device 33, the selector 32 selects the gate signal 31 when the voltage vac is positive, and selects 1, i.e., an ON signal, when the voltage vac is negative, thus obtaining the gate signal G41. Meanwhile, on the basis of a signal 37 obtained by an inversion device 36 inverting the signal 34, the selector 38 selects the gate signal 31, or 1. That is, the selector 38 selects the gate signal 31 when the voltage vac is negative, and selects 1, i.e., an ON signal, when the voltage vac is positive, thus obtaining the gate signal G42.

Thus, in accordance with the control shown in FIG. 13, the control circuit 10 generates the duty cycle 29 to perform high power factor control for current iac, and as necessary, perform constant voltage control for the DC capacitor 5, and thereby generates the gate signal 31 for the AC/DC converter 4. Then, in accordance with the control shown in FIG. 14, the control circuit 10 selects one of the semiconductor switching elements 41a, 42a in response to the polarity of voltage vac of the AC power supply 1, to apply the gate signal 31 to the selected element and control the same, and turns on the other element.

Figure 15:
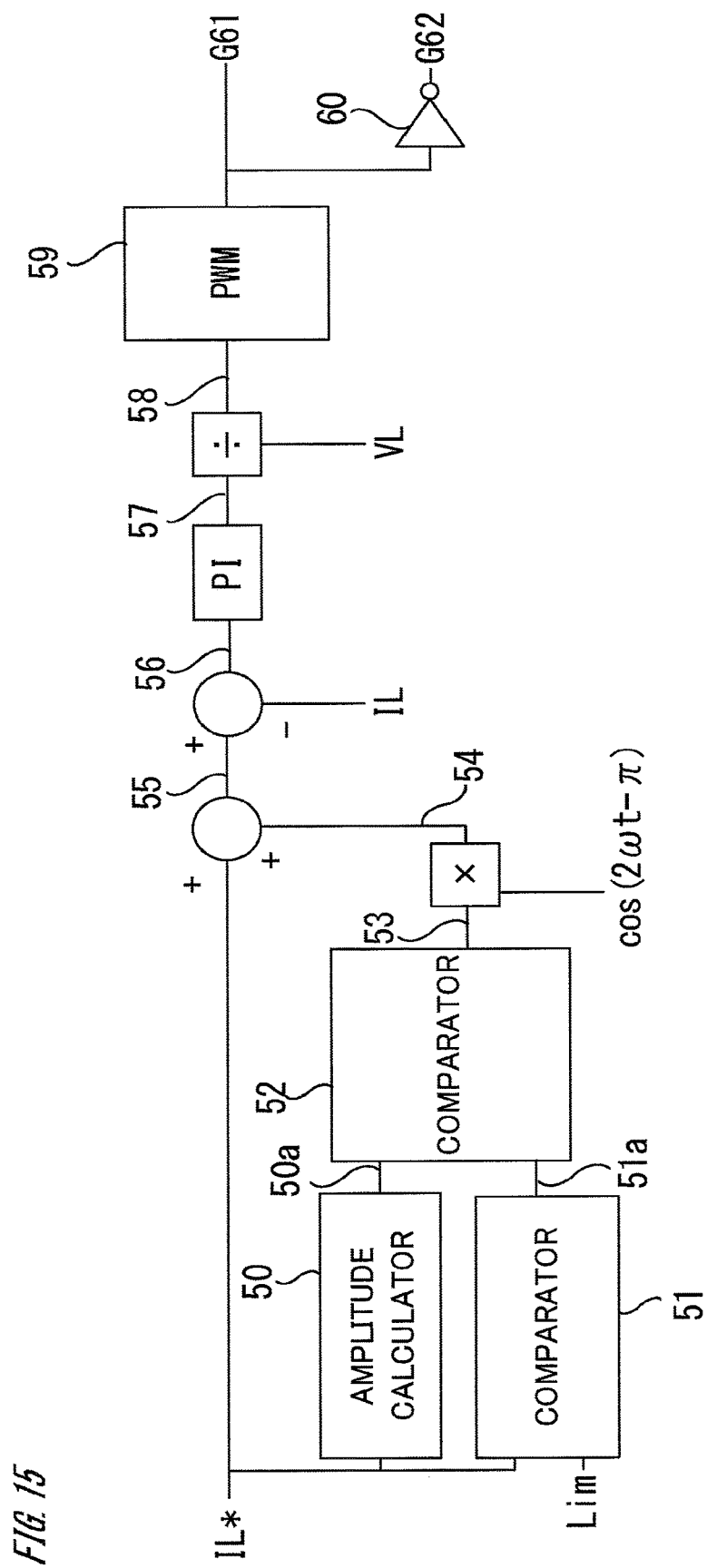
FIG. 15 is a control block diagram showing generation of gate signals for the DC/DC converter according to embodiment 1 of the present invention.

FIG. 15 is a control block diagram showing generation of gate signals G61, G62 for the respective semiconductor switching elements 61a, 62a in the DC/DC converter 6, in the control circuit 10.

A command value IL* for load current IL outputted to the load 9 is a DC current command having only a DC component, and FIG. 15 shows constant current control for supplying constant DC current IL to the load 9.

As shown in FIG. 15, an amplitude calculator 50 calculates a ripple current peak value 50a on the basis of the command value IL*.

The above expression (11) is a reduction theoretical expression for ripple voltage vc2 of the DC capacitor 5, and the ripple current peak value 50a is calculated using the expression (11). By deforming the above expression (12) obtained from expression (11), the ripple current peak value ($\sqrt{2}$)Irp can be calculated on the basis of the amplitude ΔVdc of ripple voltage vc2 of the DC capacitor 5. A command value (($\sqrt{2}$)Irp)* for this ($\sqrt{2}$) Irp can be calculated from the following expression (16) using an amplitude target value ΔVdc* for ripple voltage vc2, and the (($\sqrt{2}$)Irp)* is used as the ripple current peak value 50a. In this case, theoretically, the ripple current peak value 50a is a target peak value for ripple current irp to be superimposed onto output current iout of the DC capacitor 5.

$$\left(\left(\sqrt{2}\right)Irp\right)^* = (Vac \cdot Iac - 2\omega Cdc \cdot Vdc \cdot \Delta Vdc^*)/Vdc \qquad (16)$$
$$= (VL/Vdc)IL^* - 2\omega Cdc \cdot \Delta Vdc^*$$

It is noted that the ripple current peak value 50a may be calculated using the above expression (14a) which is a reduction theoretical expression for charge/discharge current of the DC capacitor 5. In this case, by deforming expression (15) which is based on expression (14a), the peak value ($\sqrt{2}$)ILrp of the ripple current to be generated in the load current IL can be calculated on the basis of the amplitude ΔIrp of charge/discharge current of the DC capacitor 5. A command value (($\sqrt{2}$)ILrp)* for this ($\sqrt{2}$)ILrp can be calculated from the following expression (17) using an amplitude target value ΔIrp* for charge/discharge current of the DC capacitor 5, and the (($\sqrt{2}$)ILrp)* is used as the ripple current peak value 50a. In this case, theoretically, the ripple current peak value 50a is a target peak value for the ripple current to be generated in the load current IL.

$$((\sqrt{2})ILrp)^* = IL^* - (Vdc/VL) \cdot \Delta Irp^* \qquad (17)$$

A limitation value 51a is provided for the ripple current peak value 50a. A comparator 51 compares the command value IL* for load current IL and a limitation value Lim set in advance for the load 9, and outputs the lower value as the limitation value 51a. The reason for limitation by the command value IL* is to prevent the instantaneous value of current supplied to the load 9 from becoming smaller than 0 A, so as not to cause a discontinuous mode. The limitation value Lim set for the load 9 is, for example, in the case where the load 9 is assumed to be a battery, a value prescribed from lifetime deterioration due to heat generation of the battery caused by increase in the AC component.

A comparator 52 compares the ripple current peak value 50a and the limitation value 51a, and the comparator 52 outputs the lower value as an amplitude 53 of an AC current command. The control circuit 10 multiplies the amplitude 53 by a function P shown by the following expression (18) using w as the angular frequency of AC voltage vac shown by the above expression (3), thereby calculating a ripple current command 54 as the AC current command.

$$P = \cos(2\omega t - \pi) \qquad (18)$$

It is noted that the function P by which the amplitude 53 of the AC current command is multiplied may be a function representing a sinewave having the minimum value at the zero cross phase of AC voltage vac and having the maximum value at the peak phase thereof. That is, the function P can be represented by the following expression (19) using an angular frequency (2(2n−1)ω). It is noted that n is a natural number, and in the case of n=1, the angular frequency is 2ω and the function P becomes the above expression (18).

That is, the ripple current command 54 generated by multiplying the amplitude 53 by the function P is generated with the phase thereof lagging by (π/2) relative to a fundamental sinewave having a frequency 2×(2n−1) times as high as the fundamental frequency of the AC power supply 1.

$$P = \cos(2(2n-1)\omega t - \pi) \qquad (19)$$

The control circuit 10 adds the calculated ripple current command 54 to the command value IL* for load current IL, thereby generating a current command value 55 containing ripple current, as an output current command for the DC/DC converter 6.

Next, the current command value 55 is compared with detected load current IL, and the resultant deviation 56 is subjected to PI control, to calculate a voltage command value 57. The voltage command value 57 is divided by DC voltage VL of the load 9, to calculate a duty cycle 58. Then, on the basis of the duty cycle 58 and using a carrier signal, a PWM circuit 59 generates a gate signal G61 for the semiconductor switching element 61a in the DC/DC converter 6. An inversion device 60 inverts the gate signal G61, to generate a gate signal G62 for the semiconductor switching element 62a.

Although it is not necessary to provide a dead time for the semiconductor switching elements 41a, 42a in the AC/DC converter 4, a dead time may be provided for the semiconductor switching elements 61a, 62a in the DC/DC converter 6.

In the present embodiment, the semiconductor switching element 62a may be controlled to be constantly OFF. In this case, it is not necessary to set a dead time.

Only the diode 62b may be provided without providing the semiconductor switching element 62a.

As described above, in the present embodiment, the control circuit 10 performs current control for the DC/DC converter 6, using the current command value 55 obtained by superimposing, onto the DC current command (command value IL*) for DC current to be supplied to the load 9, the ripple current command 54 which has a frequency 2×(2n−1) times as high as the frequency of the AC power supply 1 and has the minimum value at the zero cross phase and the maximum value at the peak phase. The amplitude 53 of the ripple current command 54 is determined on the basis of the amplitude target value for ripple voltage or ripple current (charge/discharge current) of the DC capacitor 5.

Thus, charge/discharge power of the DC capacitor 5 is reduced, and the ripple voltage, in the DC capacitor 5, which has a frequency component twice as high as the frequency of the AC power supply 1 is reduced in accordance with the above expression (11). In addition, the ripple current, in the DC capacitor 5, which has a frequency component twice as high as the frequency of the AC power supply 1 is reduced in accordance with the above expression (14a).

Further, owing to the reduction in the ripple voltage, a necessary capacitance for the DC capacitor 5 can be reduced, and owing to the reduction in the ripple current, a necessary rated ripple current for the DC capacitor 5 can be reduced. Thus, it becomes possible to reduce the size of the DC capacitor 5 and reduce the size and the cost of the power conversion device 100.

Figure 16:
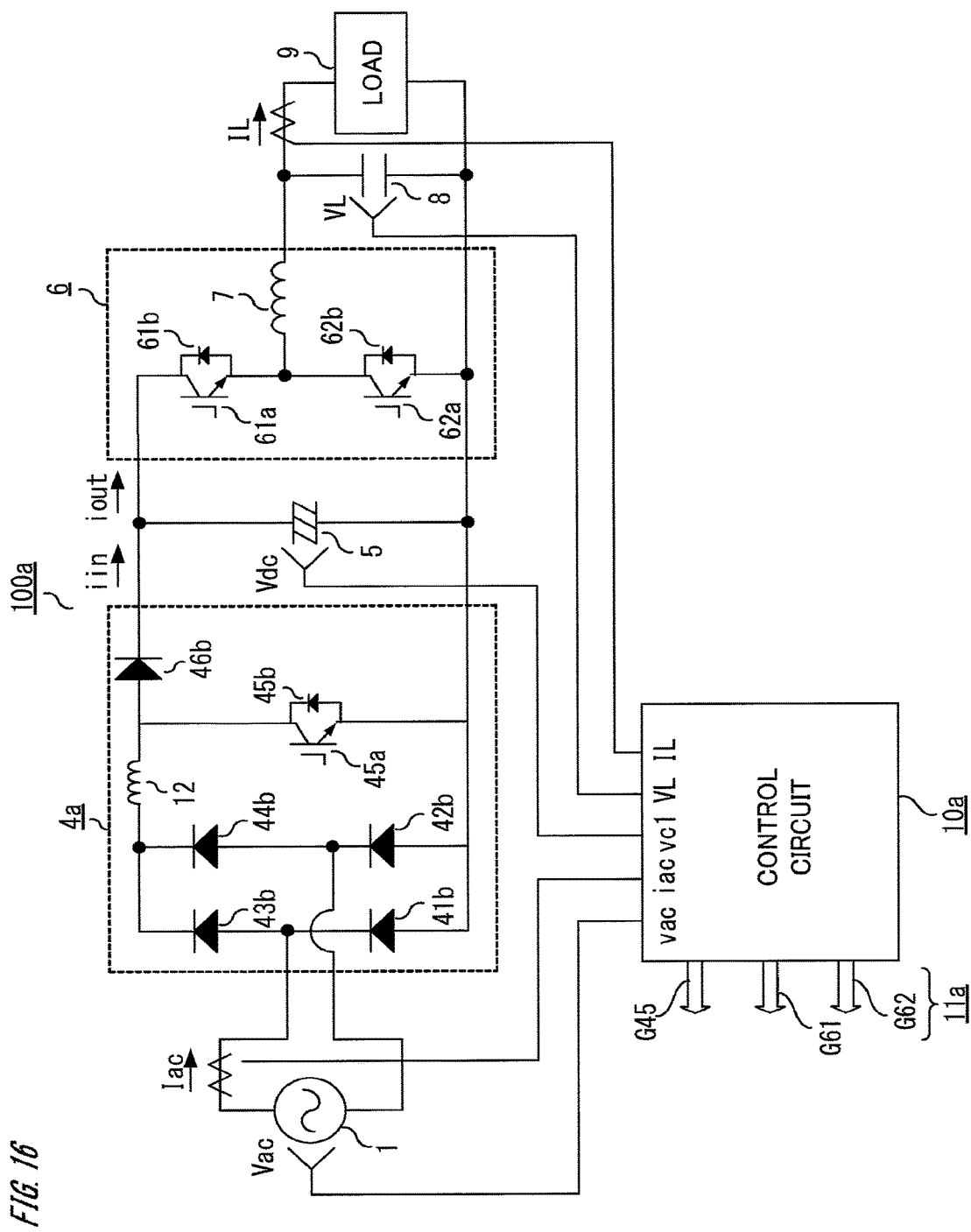
FIG. 16 is a configuration diagram of a power conversion device in another example of embodiment 1 of the present invention.

In the above embodiment 1, the AC/DC converter 4 is a semi-bridgeless circuit type, but is not limited thereto. In a power conversion device 100a shown in FIG. 16, as a general AC/DC converter, for example, an AC/DC converter 4a configured from a one-transistor power factor correction (PFC) circuit is used. The AC/DC converter 4a is composed of bridge diodes 41b to 44b, a reactor 12, a semiconductor switching element 45a for current control, and a step-up diode 46b. A diode 45b is connected in antiparallel to the semiconductor switching element 45a. In this case, a control circuit 10a generates gate signals 11a (gate signals G45, G61, G62 for the semiconductor switching elements 45a, 61a, 62a) on the basis of the inputted voltage current information, to perform output control for the AC/DC converter 4a and the DC/DC converter 6. The other configuration is the same as that of the power conversion device 100 according to the above embodiment 1. Also in this case, the same effect can be provided through the same control as in the power conversion device 100 according to the above embodiment 1.

Figure 17:
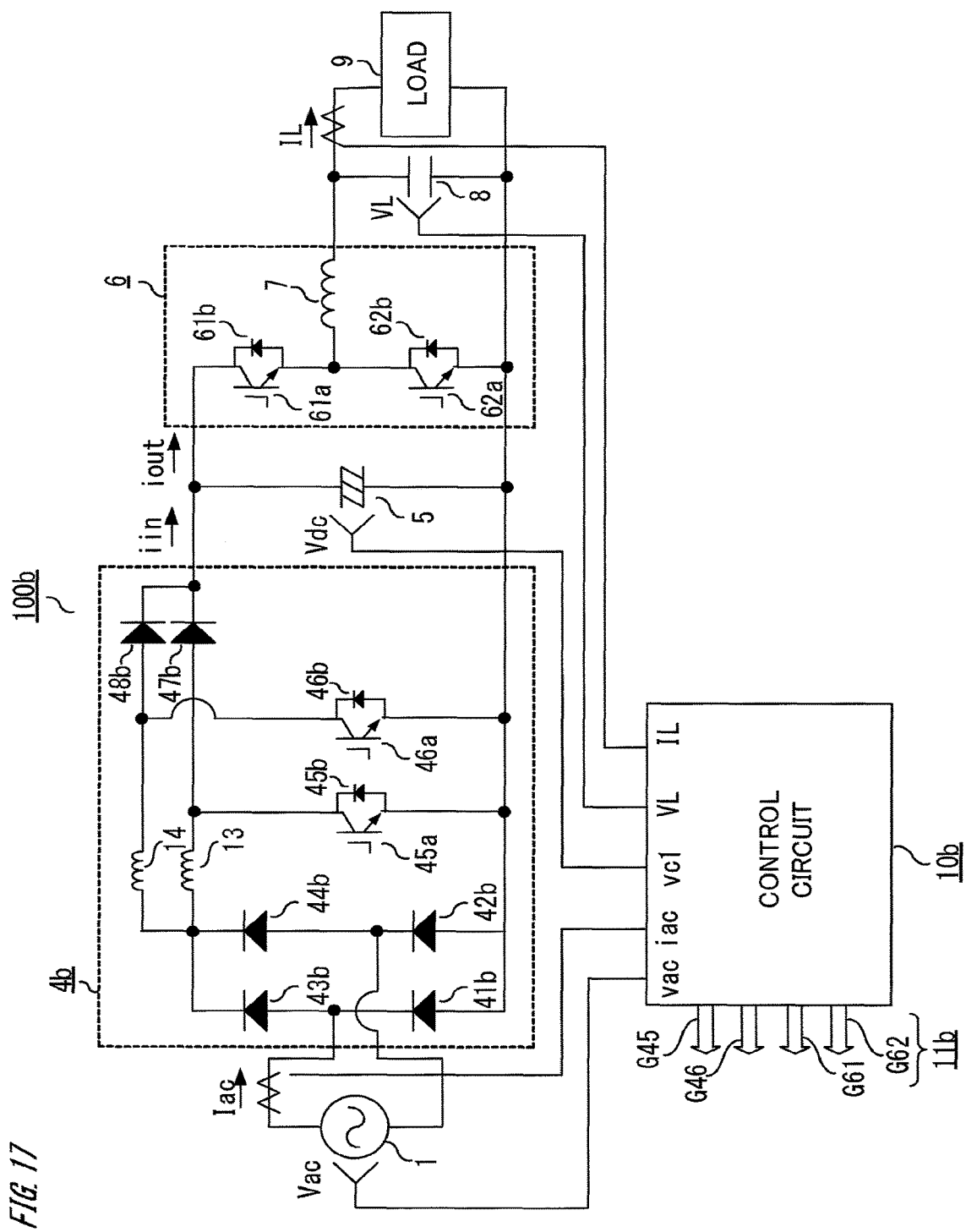
FIG. 17 is a configuration diagram of a power conversion device in still another example of embodiment 1 of the present invention.

FIG. 17 is a configuration diagram showing a power conversion device 100b using an interleave-type AC/DC converter 4b in which one-transistor power factor correction (PFC) circuits are connected in parallel and the phases are shifted from each other by 180 degrees. As shown in FIG. 17, the AC/DC converter 4b is composed of bridge diodes 41b to 44b and two one-transistor PFC circuits. The first one-transistor PFC circuit is composed of a reactor 13, the semiconductor switching element 45a for current control, and a step-up diode 47b. The second one-transistor PFC circuit is composed of a reactor 14, a semiconductor switching element 46a for current control, and a step-up diode 48b. Diodes 45b, 46b are respectively connected in antiparallel to the semiconductor switching elements 45a, 46a. In this case, a control circuit 10b generates gate signals 11b (gate signals G45, G46, G61, G62 for semiconductor switching elements 45a, 46a, 61a, 62a) on the basis of the inputted voltage current information, to perform output control for the AC/DC converter 4b and the DC/DC converter 6. The other configuration is the same as that of the power conversion device 100 according to the above embodiment 1. Also in this case, the same effect can be provided through the same control as in the power conversion device 100 according to the above embodiment 1.

In the above embodiment, the amplitude 53 of the ripple current command 54 is determined on the basis of the amplitude target value for ripple voltage or ripple current (charge/discharge current) of the DC capacitor 5. However, the amplitude 53 may be determined on the basis of an electrostatic capacitance target value for the DC capacitor 5. By deforming the above expression (12), the ripple current peak value ($\sqrt{2}$)Irp can be calculated on the basis of the electrostatic capacitance Cdc of the DC capacitor 5. That is, the command value (($\sqrt{2}$)Irp)* for the ripple current peak value can be calculated using the electrostatic capacitance target value, and the calculated value is used as the ripple current peak value 50a in the control block diagram shown in FIG. 15. Also in this case, ripple voltage and ripple current of the DC capacitor 5 can be reduced, and thus the same effect can be obtained.

With reference to the above expression (12) and expression (15), in the case where the ripple current peak values ($\sqrt{2}$)Irp and ($\sqrt{2}$)ILrp are uniquely determined, when DC voltage Vdc of the DC capacitor 5 changes, ripple voltage and ripple current (charge/discharge current) of the DC capacitor 5 change. Therefore, in the case where the amplitude 53 of the ripple current command 54 is uniquely determined, DC voltage Vdc of the DC capacitor 5 is adjusted so that ripple voltage and ripple current of the DC capacitor 5 are reduced. Thus, ripple voltage and ripple current of the DC capacitor 5 can be reduced.

Embodiment 2

Figure 18:
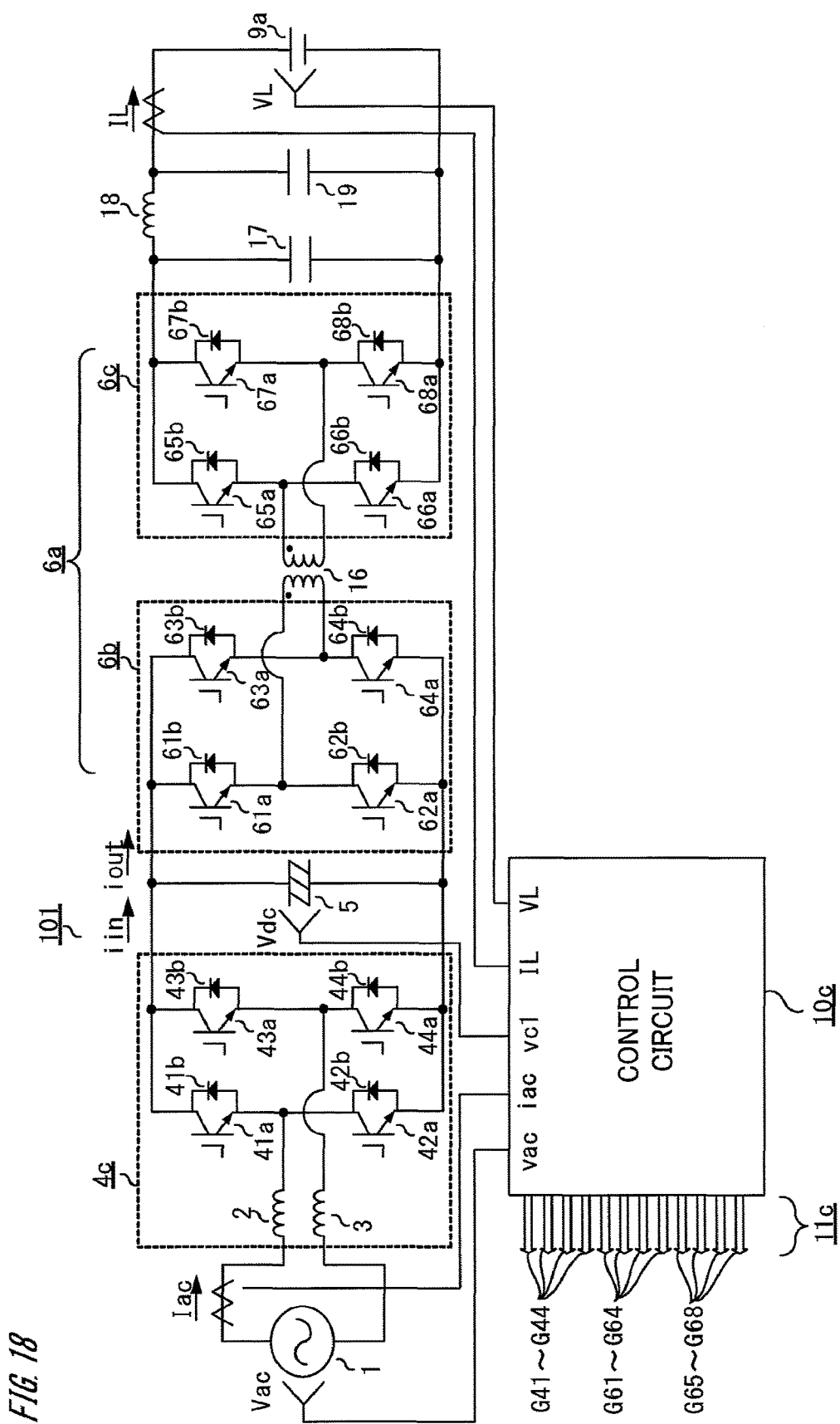
FIG. 18 is a configuration diagram of a power conversion device according to embodiment 2 of the present invention.

Hereinafter, a power conversion device according to embodiment 2 of the present invention will be described. FIG. 18 is a schematic configuration diagram of the power conversion device according to embodiment 2 of the present invention.

As shown in FIG. 18, the power conversion device 101 includes: a main circuit for converting AC power from the AC power supply 1, to DC power, and outputting the DC power to a load 9a which is a battery load; and a control circuit 10c.

The main circuit includes: an AC/DC converter 4c for performing power factor correction control for the AC power supply 1 and converting AC power to DC power; a DC/DC converter 6a which is connected to the DC side of the AC/DC converter 4c and performs voltage conversion of the DC power; and the DC capacitor 5 connected between DC buses between the AC/DC converter 4c and the DC/DC converter 6a.

In the present embodiment 2, the DC/DC converter 6a is configured as an isolation-type DC/DC converter, and the load 9a is formed from a battery. In accordance with change in load voltage VL which is the battery voltage, voltage Vdc of the DC capacitor 5 which is a link portion between the AC/DC converter 4c and the DC/DC converter 6a can be changed, or power can be regenerated from the load 9a to the AC power supply 1.

In this case, the AC/DC converter 4c has a regeneration function, and the power conversion device 101 is capable of bidirectional power transmission between the AC power supply 1 and the load 9. The control circuit 10c has two operation modes which are a power-running mode for performing power-running operation and a regeneration mode for performing regeneration operation, to control the DC/DC converter 6a and the AC/DC converter 4c.

As shown in FIG. 18, the AC/DC converter 4c is configured from a full-bridge circuit, and the reactors 2 and 3 for current limitation are provided on the AC side. The AC/DC converter 4c includes semiconductor switching elements 41a to 44a, and the semiconductor switching elements 41a to 44a are formed from IGBTs to which the diodes 41b to 44b are connected in antiparallel, respectively.

If the AC/DC converter 4c is not provided with a regeneration function, the AC/DC converter 4c may be configured as a semi-bridge circuit type, a one-transistor PFC circuit, or an interleave type, as in the above embodiment 1.

In order to perform bidirectional operation, the DC/DC converter 6a includes a first full-bridge circuit 6b, a second full-bridge circuit 6c, and a transformer 16 connected between the first full-bridge circuit 6b and the second full-bridge circuit 6c. The first full-bridge circuit 6b includes semiconductor switching elements 61a to 64a, and the semiconductor switching elements 61a to 64a are formed from IGBTs to which diodes 61b to 64b are connected in antiparallel, respectively. The second full-bridge circuit 6c includes semiconductor switching elements 65a to 68a, and the semiconductor switching elements 65a to 68a are formed from IGBTs to which diodes 65b to 68b are connected in antiparallel, respectively.

It is noted that, instead of IGBTs, the semiconductor switching elements 41a to 44a, 61a to 64a, 65a to 68a may be MOSFETs including diodes between the sources and drains, or may be semiconductor switching elements such as thyristors. In the case of using MOSFETs, the included diodes may be used as the diodes 41b to 44b, 61b to 64b, 65b to 68b.

In addition, a smoothing capacitor 17, a smoothing reactor 18, and a smoothing capacitor 19 are connected at a stage subsequent to the DC/DC converter 6a, thereby smoothing load current IL flowing to the load 9a.

A P-side terminal of the DC capacitor 5 is connected to a P terminal of the DC output side of the AC/DC converter 4c, and a P terminal on the DC input side of the first full-bridge circuit 6b of the DC/DC converter 6a. An N-side terminal of the DC capacitor 5 is connected to an N terminal on the DC output side of the AC/DC converter 4c, and an N terminal on the DC input side of the first full-bridge circuit 6b of the DC/DC converter 6a.

The DC capacitor 5 has an energy buffer function, and smooths the difference between power inputted from the AC/DC converter 4c and power outputted from the first full-bridge circuit 6b. The DC capacitor 5 may be formed by an aluminum electrolytic capacitor, a film capacitor, a ceramic capacitor, a tantalum capacitor, an EDLC (electric double layered capacitor), or the like. Alternatively, the DC capacitor 5 may be formed by a battery such as a lithium ion battery.

AC voltage vac of the AC power supply 1, voltage vc1 of the DC capacitor 5, and load voltage VL which is voltage of the smoothing capacitor 8, are detected by voltage sensors (not shown), and the detected voltages are inputted to the control circuit 10c. Further, AC current iac of the AC power supply 1 and load current IL are detected by current sensors, and the detected currents are inputted to the control circuit 10c. The control circuit 10c generates gate signals 11c (gate signals G41 to G44, G61 to G64, G65 to G68 for the semiconductor switching elements 41a to 44a, 61a to 64a, 65a to 68a) on the basis of the inputted voltage current information, to perform output control for the AC/DC converter 4c and the DC/DC converter 6a.

The operation of the power conversion device 101 configured as described above will be described below.

Figure 19:
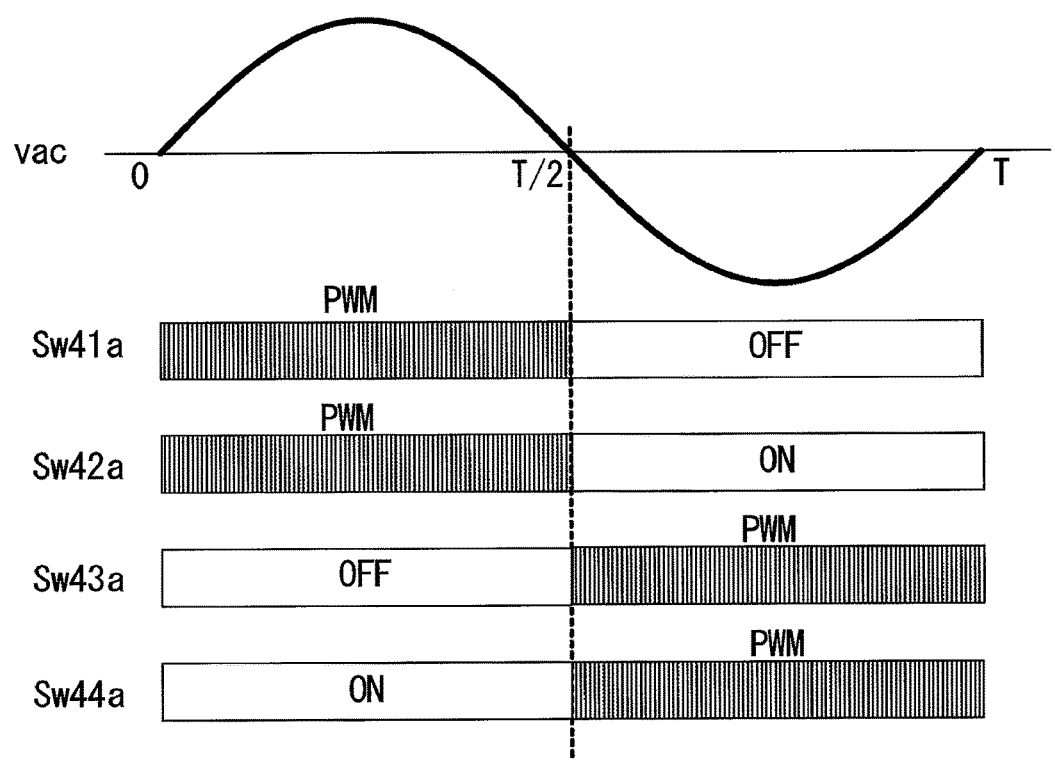
FIG. 19 is a diagram illustrating operation of an AC/DC converter according to embodiment 2 of the present invention.

FIG. 19 is a diagram illustrating operation of the AC/DC converter 4c. In FIG. 19, Sw41a to Sw44a indicate the switching states of the semiconductor switching elements 41a to 44a, respectively.

One cycle of the AC power supply 1 is denoted by T. During the period from time 0 to time T/2, voltage vac of the AC power supply 1 has a positive polarity. The control circuit 10c turns on the semiconductor switching element 44a and performs PWM control for the semiconductor switching elements 41a, 42a, to control excitation and reset of excitation of the reactors 2 and 3. The semiconductor switching element 41a and the semiconductor switching element 42a are in a relationship in which ON and OFF are inverted from each other, that is, when the semiconductor switching element 41a is turned on, the semiconductor switching element 42a is turned off, and when the semiconductor switching element 42a is turned on, the semiconductor switching element 41a is turned off.

During the period from time T/2 to time T, voltage vac of the AC power supply 1 has a negative polarity. The control circuit 10c turns on the semiconductor switching element 42a and performs PWM control for the semiconductor switching elements 43a, 44a, to control excitation and reset of excitation of the reactors 2 and 3. The semiconductor switching element 43a and the semiconductor switching element 44a are in a relationship in which ON and OFF are inverted from each other, that is, when the semiconductor switching element 43a is turned on, the semiconductor switching element 44a is turned off, and when the semiconductor switching element 44a is turned on, the semiconductor switching element 43a is turned off.

It is noted that dead times may be provided at a gate timing between the semiconductor switching element 41a and the semiconductor switching element 42a, and at a gate timing between the semiconductor switching element 43a and the semiconductor switching element 44a.

FIG. 20 to FIG. 23 are current route diagrams illustrating operation of the AC/DC converter 4c.

Figure 20:
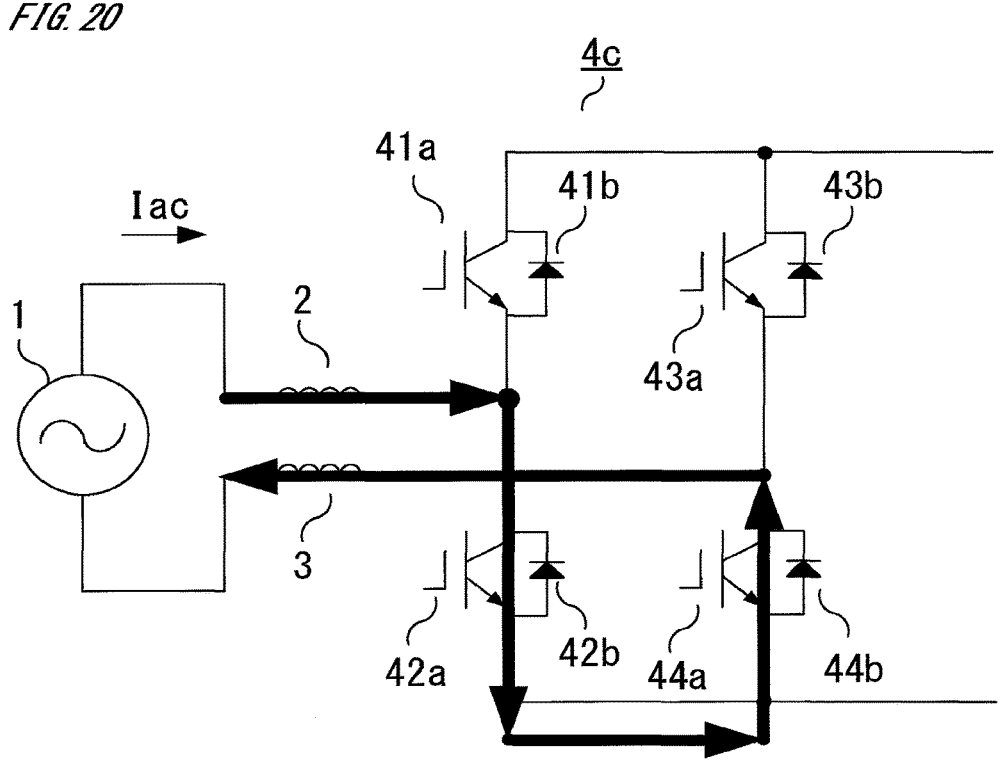
FIG. 20 is a current route diagram illustrating operation of the AC/DC converter according to embodiment 2 of the present invention.
Figure 21:
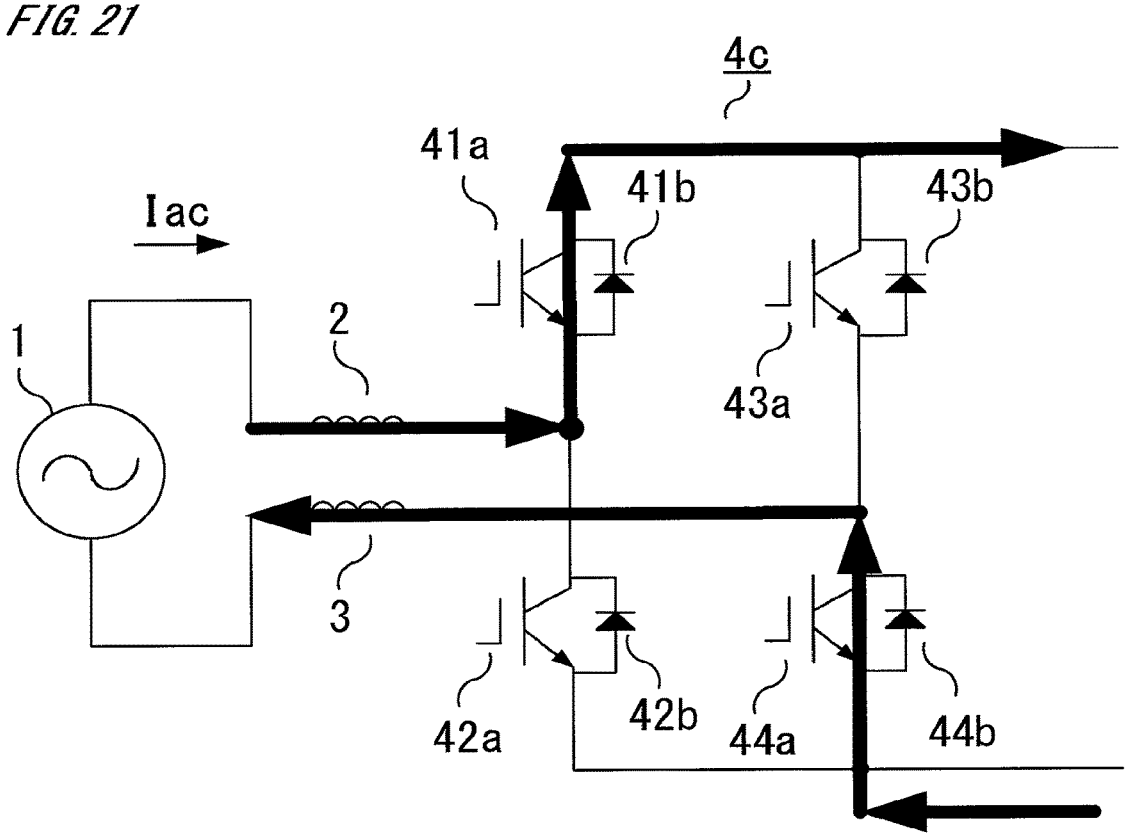
FIG. 21 is a current route diagram illustrating operation of the AC/DC converter according to embodiment 2 of the present invention.

During the period from time 0 to time T/2, the semiconductor switching element 44a is kept in an ON state, and when the semiconductor switching element 42a is turned on, the input current is short-circuited via the reactors 2 and 3, and the reactor 2 and the reactor 3 are excited, so that the current increases in the positive direction (FIG. 20). Then, when the semiconductor switching element 42a is turned off and the semiconductor switching element 41a is turned on, excitation of the reactor 2 and the reactor 3 is reset and the accumulated excitation energy is outputted to the DC capacitor 5 side. At this time, the current in the reactors 2 and 3 decreases (FIG. 21).

Figure 22:
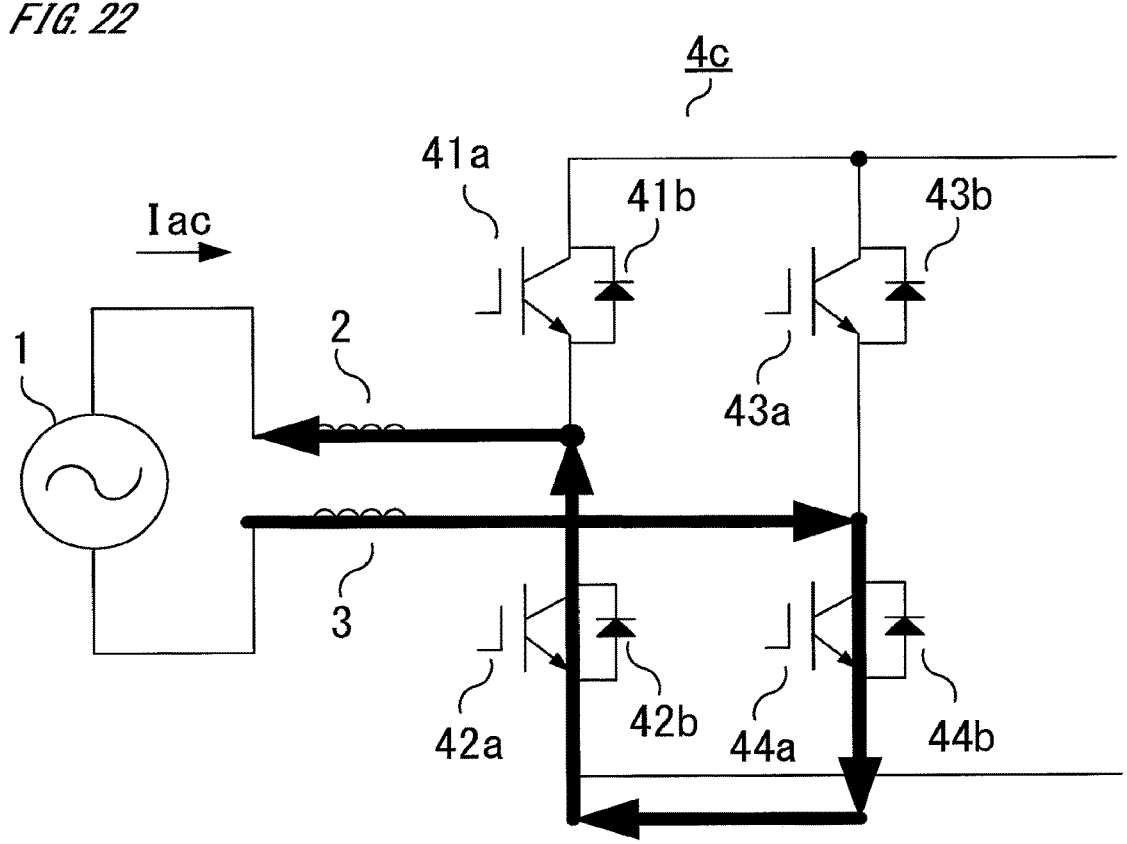
FIG. 22 is a current route diagram illustrating operation of the AC/DC converter according to embodiment 2 of the present invention.
Figure 23:
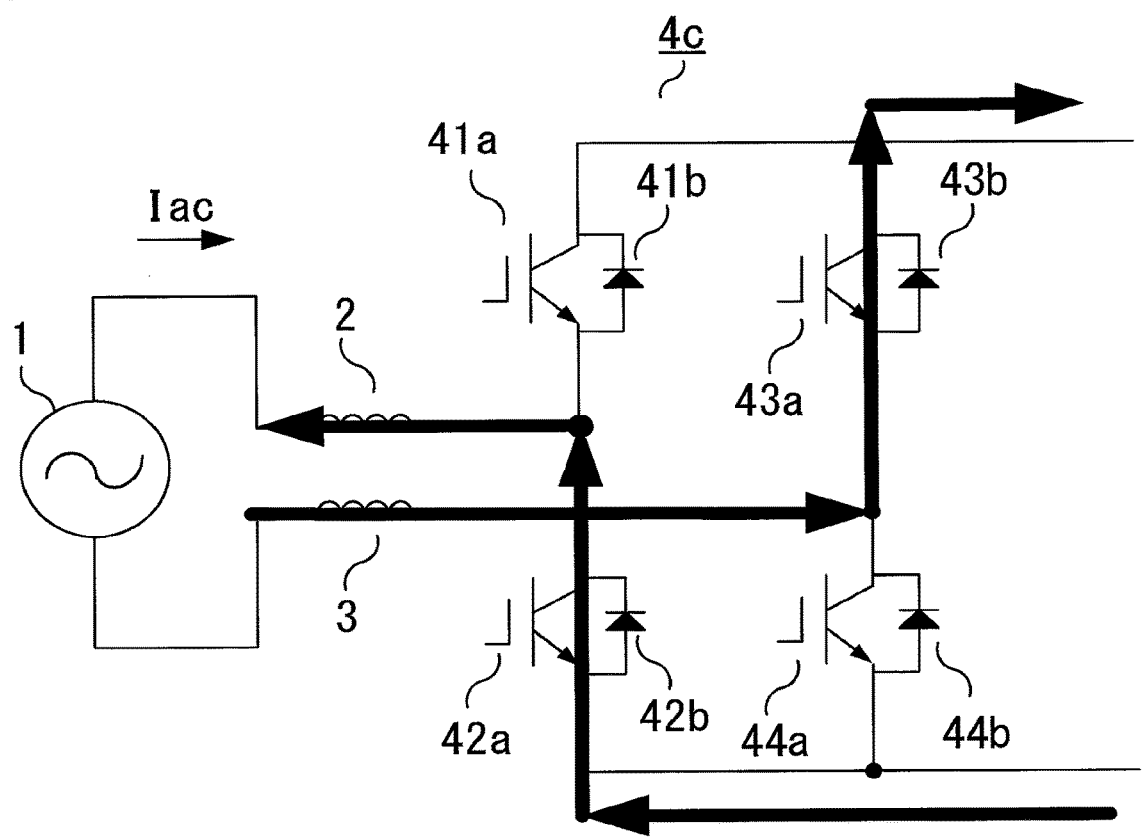
FIG. 23 is a current route diagram illustrating operation of the AC/DC converter according to embodiment 2 of the present invention.

During the period from time T/2 to time T, the semiconductor switching element 42a is kept in an ON state, and when the semiconductor switching element 44a is turned on, the input current is short-circuited via the reactors 2 and 3, and the reactor 2 and the reactor 3 are excited, so that the current increases in the negative direction (FIG. 22). Then, when the semiconductor switching element 44a is turned off and the semiconductor switching element 43a is turned on, excitation of the reactor 2 and the reactor 3 is reset and the accumulated excitation energy is outputted to the DC capacitor 5 side. At this time, the current in the reactors 2 and 3 decreases (FIG. 23).

The control circuit 10c performs ON/OFF control for the semiconductor switching elements 41a to 44a as described above, to perform high power factor control for AC current iac. In power-running operation in which power is transmitted from the AC power supply 1 to the DC capacitor 5, AC current iac is controlled by adjusting the period of each operation mode shown in FIG. 20 to FIG. 23 so that the power factor becomes 1 with respect to voltage vac of the AC power supply 1. In regeneration operation in which power is transmitted from the DC capacitor 5 to the AC power supply 1, AC current iac is controlled by adjusting the period of each operation mode shown in FIG. 20 to FIG. 23 so that the power factor becomes −1 with respect to voltage Vac of the AC power supply 1.

Figure 24:
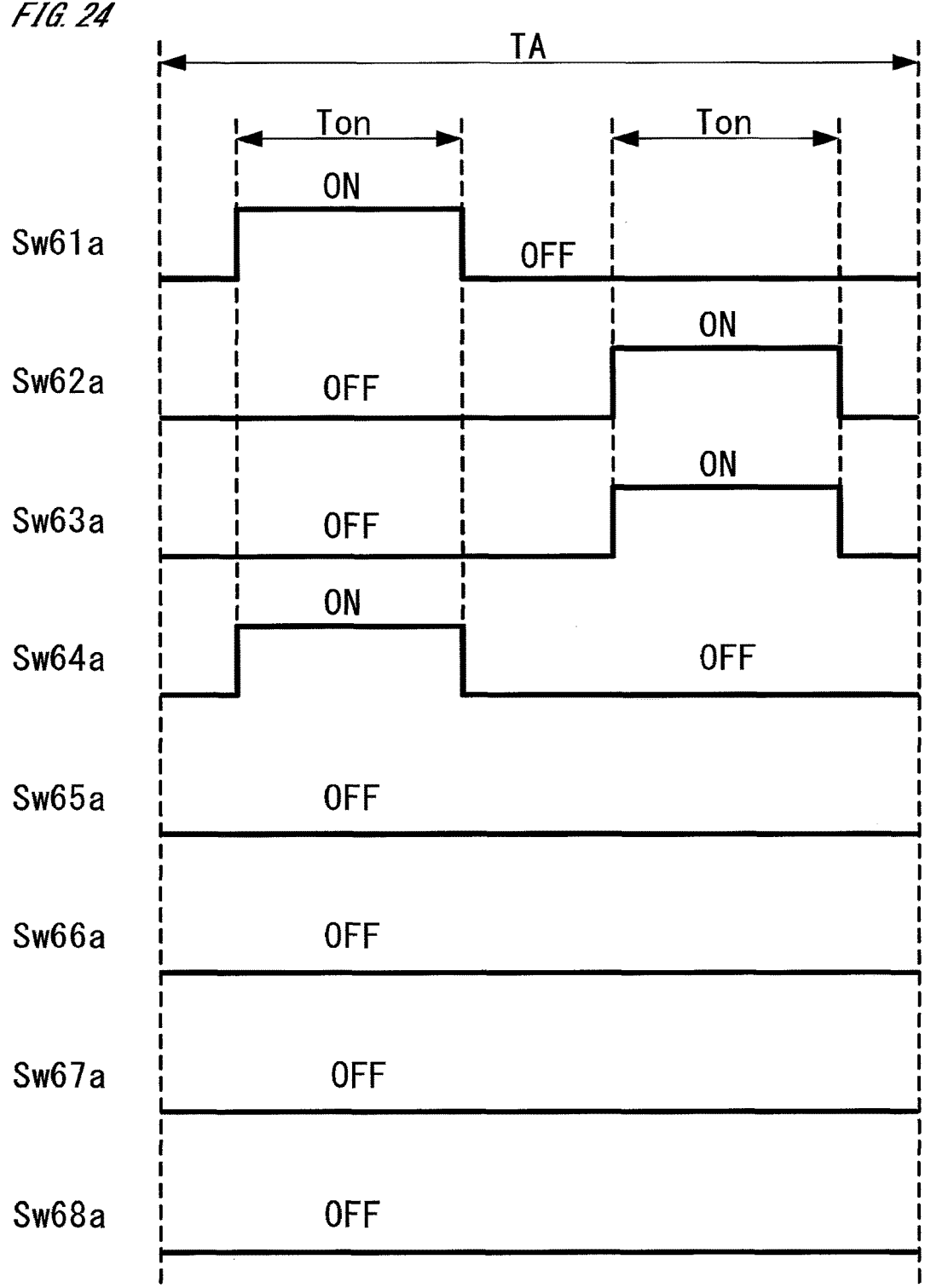
FIG. 24 is a waveform diagram illustrating power-running operation of a DC/DC converter according to embodiment 2 of the present invention.

Next, operation of the DC/DC converter 6a composed of the first full-bridge circuit 6b, the second full-bridge circuit 6c, and the transformer 16 will be described. FIG. 24 is a waveform diagram illustrating power-running operation of the DC/DC converter 6a.

In power-running operation in which power is transmitted from the DC capacitor 5 to the load 9a, the control circuit 10c performs PWM control for the first full-bridge circuit 6b, to adjust a power transmission period Ton of power transmission to the transformer 16 and adjust the transmitted power. The period during which the semiconductor switching elements 61a, 64a are turned on at the same time, or the period during which the semiconductor switching elements 62a, 63a are turned on at the same time, is the power transmission period Ton. In power-running operation, all the switching elements of the second full-bridge circuit 6c are turned off to perform rectification in a diode rectification mode.

Figure 25:
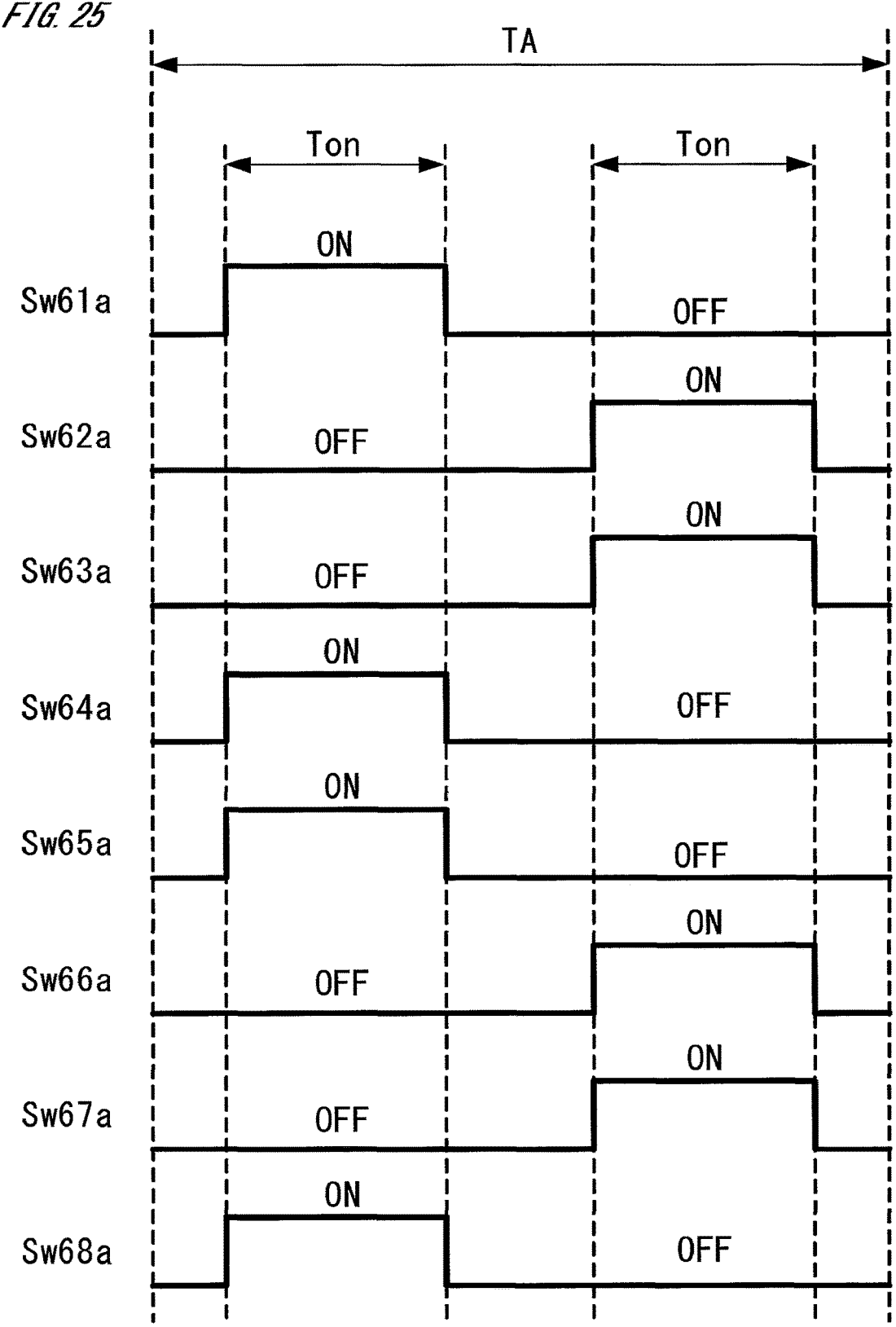
FIG. 25 is a waveform diagram illustrating another example of power-running operation of the DC/DC converter according to embodiment 2 of the present invention.

As shown in FIG. 25, for the second full-bridge circuit 6c, the control circuit 10c may perform ON/OFF control for the semiconductor switching elements 65a to 68a to perform rectification in a synchronous rectification mode. In this case, the ON/OFF control is performed such that the semiconductor switching element 65a is synchronized with the semiconductor switching element 61a, the semiconductor switching element 66a is synchronized with the semiconductor switching element 62a, the semiconductor switching element 67a is synchronized with the semiconductor switching element 63a, and the semiconductor switching element 68a is synchronized with the semiconductor switching element 64a.

Figure 26:
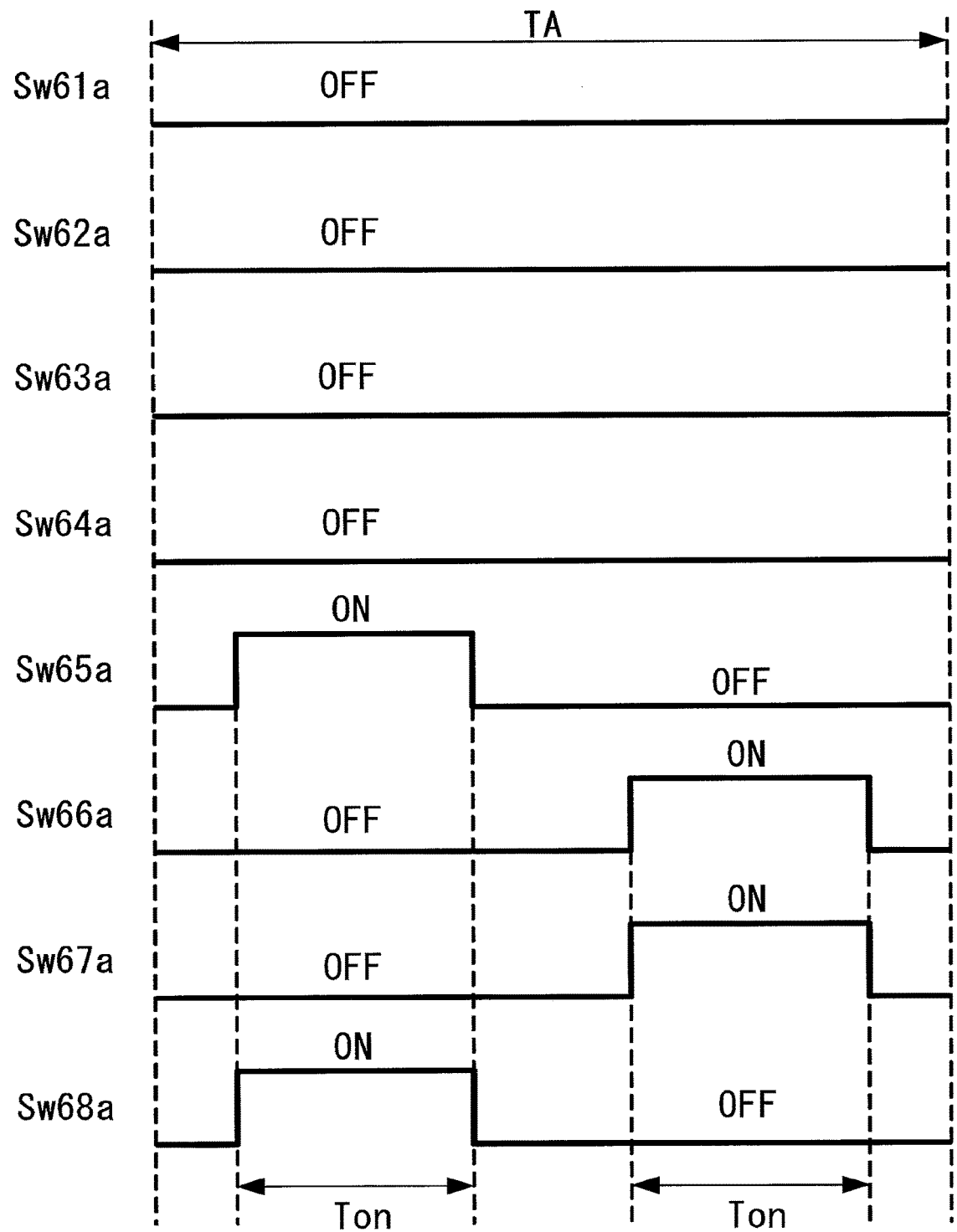
FIG. 26 is a waveform diagram illustrating regeneration operation of the DC/DC converter according to embodiment 2 of the present invention.

FIG. 26 is a waveform diagram illustrating regeneration operation of the DC/DC converter 6a.

In regeneration operation in which power is transmitted from the load 9a to the DC capacitor 5, the control circuit 10c performs PWM control for the second full-bridge circuit 6c, to adjust a power transmission period Ton of power transmission to the transformer 16 and adjust the transmitted power. The period during which the semiconductor switching elements 65a, 68a are turned on at the same time, or the period during which the semiconductor switching elements 66a, 67a are turned on at the same time, is the power transmission period Ton. In regeneration operation, all the switching elements of the first full-bridge circuit 6b are turned off to perform rectification in a diode rectification mode.

Figure 27:
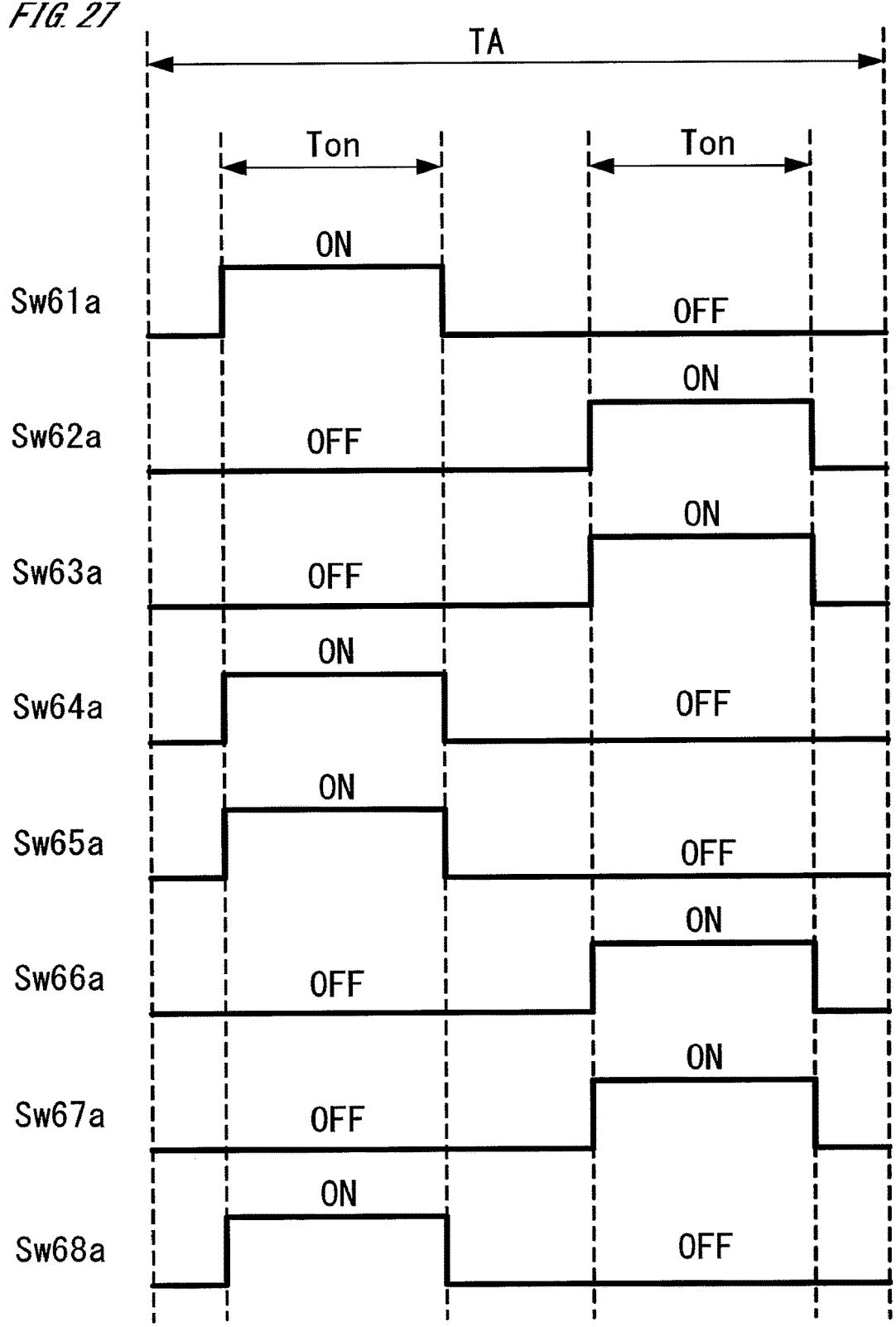
FIG. 27 is a waveform diagram illustrating still another example of regeneration operation of the DC/DC converter according to embodiment 2 of the present invention.

As shown in FIG. 27, for the first full-bridge circuit 6b, the control circuit 10c may perform ON/OFF control for the semiconductor switching elements 61a to 64a to perform rectification in a synchronous rectification mode. In this case, the ON/OFF control is performed such that the semiconductor switching element 61a is synchronized with the semiconductor switching element 65a, the semiconductor switching element 62a is synchronized with the semiconductor switching element 66a, the semiconductor switching element 63a is synchronized with the semiconductor switching element 67a, and the semiconductor switching element 64a is synchronized with the semiconductor switching element 68a.

The relational expression between DC voltage Vdc of the DC capacitor 5 and load voltage VL in power-running operation is represented by the following expression (20), and the relational expression therebetween in regeneration operation is represented by the following expression (21). Ton denotes the power transmission periods shown in FIG. 24 to FIG. 27, and TA denotes the switching cycle shown in FIG. 24 to FIG. 27. N1/N2 denotes the turns ratio of the transformer 16, N1 is the number of winding turns on the first full-bridge circuit 6b side, and N2 is the number of winding turns on the second full-bridge circuit 6c side.

$$VL = Vdc \cdot (Ton/(TA/2)) \cdot (N2/N1) \tag{20}$$

$$Vdc = VL \cdot (Ton/(TA/2)) \cdot (N1/N2) \tag{21}$$

In power-running operation, the condition expression for a lower limit value Vdcmin for DC voltage Vdc necessary for outputting the load voltage VL is represented by the following expression (22). Here, VLmax is the maximum value of load voltage VL, and Tonmax is the maximum value of the power transmission period Ton.

$$Vdcmin = VLmax \cdot ((TA/2)/Tonmax) \cdot (N1/N2) \tag{22}$$

An upper limit value for DC voltage Vdc of the DC capacitor 5 is determined from the withstand voltage of circuits parts composing the power conversion device 101, and DC voltage Vdc of the DC capacitor 5 is set between the upper limit value, and the lower limit value Vdcmin determined by the above expression (22).

Then, as in the above embodiment 1, the control circuit 10c adds the ripple current command as the AC current command, to the DC current command which is the command value IL* for load current IL, thereby generating a current command value containing ripple current and controlling the DC/DC converter 6a.

In power-running operation, as in embodiment 1, the ripple current command is a sinewave having a frequency 2×(2n−1) times as high as the frequency of the AC power supply 1 and having such an initial phase that the sinewave has the minimum value at the zero cross phase and the maximum value at the peak phase. The amplitude of the ripple current command is determined so as not to exceed the command value IL* for load current IL, on the basis of the amplitude target value for ripple voltage or ripple current (charge/discharge current) of the DC capacitor 5.

Thus, as in the above embodiment 1, ripple current irp is generated in output current iout of the DC capacitor 5, thereby reducing charge/discharge power of the DC capacitor 5 and reducing ripple voltage and ripple current, in the DC capacitor 5, which have frequency components twice as high as the frequency of the AC power supply 1 (see FIG. 10 to FIG. 12).

The ripple current command to be added in the regeneration operation is a sinewave having a frequency 2×(2n−1) times as high as the frequency of the AC power supply 1 and having such an initial phase that the sinewave has the maximum value at the zero cross phase and the minimum value at the peak phase. The amplitude of the ripple current command is the same as in the case of power-running operation.

In this case, the function P by which the amplitude is multiplied can be represented by the following expression (23).

$$P=-\cos(2(2n-1)\omega t-\pi) \quad (23)$$

That is, the ripple current command generated by multiplying the amplitude by the function P is a command obtained by inverting the polarity of the ripple current command in power-running operation while keeping the amplitude and the initial phase thereof.

It is noted that the DC current command (command value IL*) in regeneration operation is a command obtained by inverting the polarity of the DC current command in power-running operation.

Also in regeneration operation, the DC/DC converter 6a is controlled so that an AC current component (ripple current) is generated in current IL outputted to the load 9a, thereby generating ripple current irp in output current iout of the DC capacitor 5.

Figure 28:
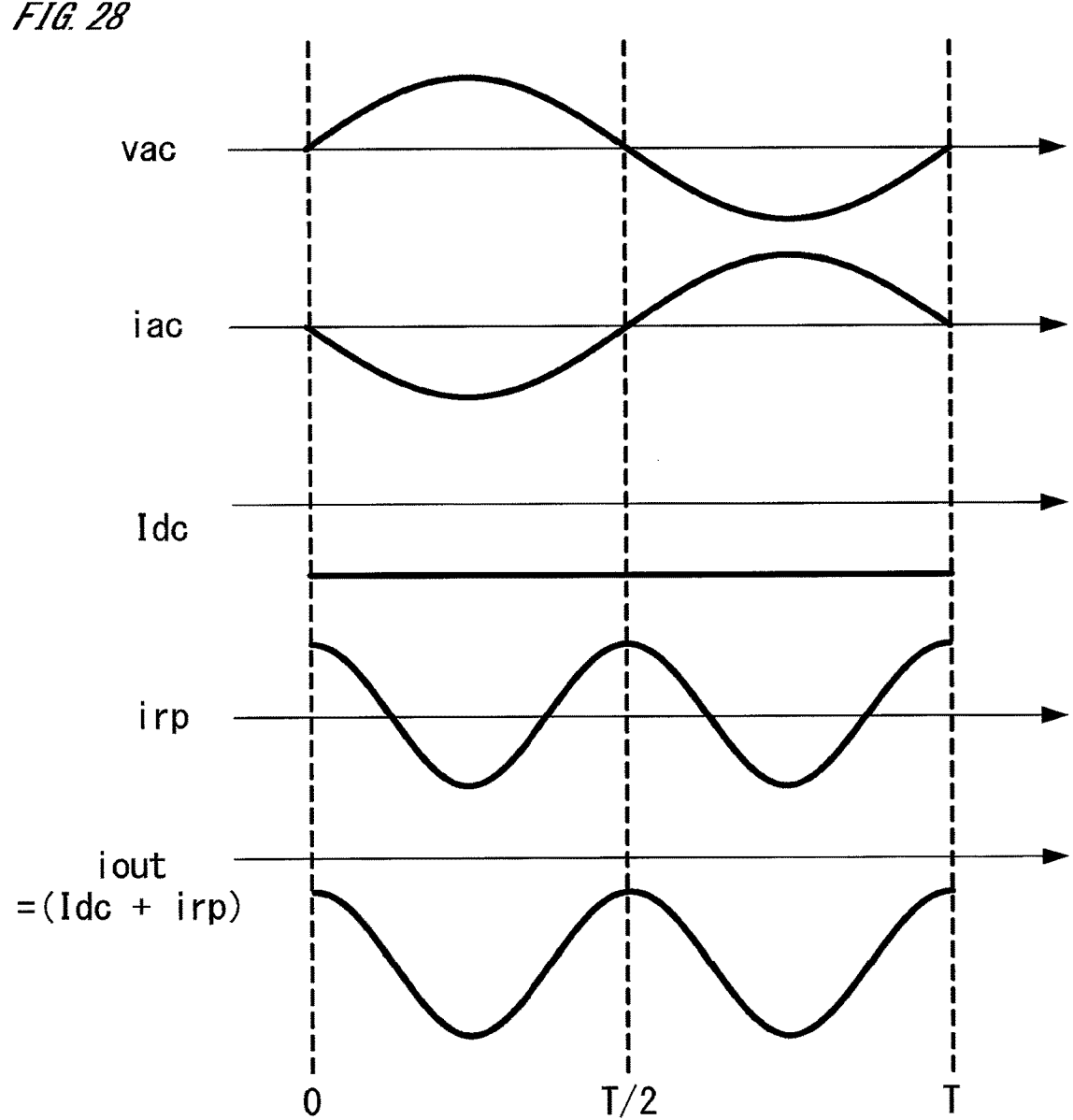
FIG. 28 is a waveform diagram showing each component of output current of a DC capacitor in regeneration operation of the power conversion device according to embodiment 2 of the present invention.

FIG. 28 is a waveform diagram showing voltage vac and current iac of the AC power supply 1 and components contained in output current iout of the DC capacitor 5, in regeneration operation. The output current iout of the DC capacitor 5 is current obtained by superimposing ripple current irp onto the DC current component Idc, and the ripple current irp to be superimposed is sinewave current having a frequency twice as high as the frequency of voltage vac of the AC power supply 1. The initial phase of the ripple current irp is set such that the ripple current irp has the maximum value at the zero cross phase of the AC power supply 1 and has the minimum value at the peak phase thereof.

If voltage vac of the AC power supply 1 shown in FIG. 28 is defined as shown by the above expression (3) and AC current iac controlled at a power factor of −1 is defined as shown by the following expression (24), ripple current irp of the DC capacitor 5 is represented by the following expression (25), and output current iout is represented by the following expression (26). Here, Irp is the effective value of ripple current irp. Output current iout in regeneration operation shown by expression (26) is current obtained by inverting the polarity of output current iout in power-running operation shown in the above expression (9).

$$iac=-(\sqrt{2})Iac \cdot \sin \omega t \quad (24)$$

$$irp=(\sqrt{2})Irp \cdot \cos(2\omega t) \quad (25)$$

$$iout=-Idc+(\sqrt{2})Irp \cdot \cos(2\omega t) \quad (26)$$

Figure 29:
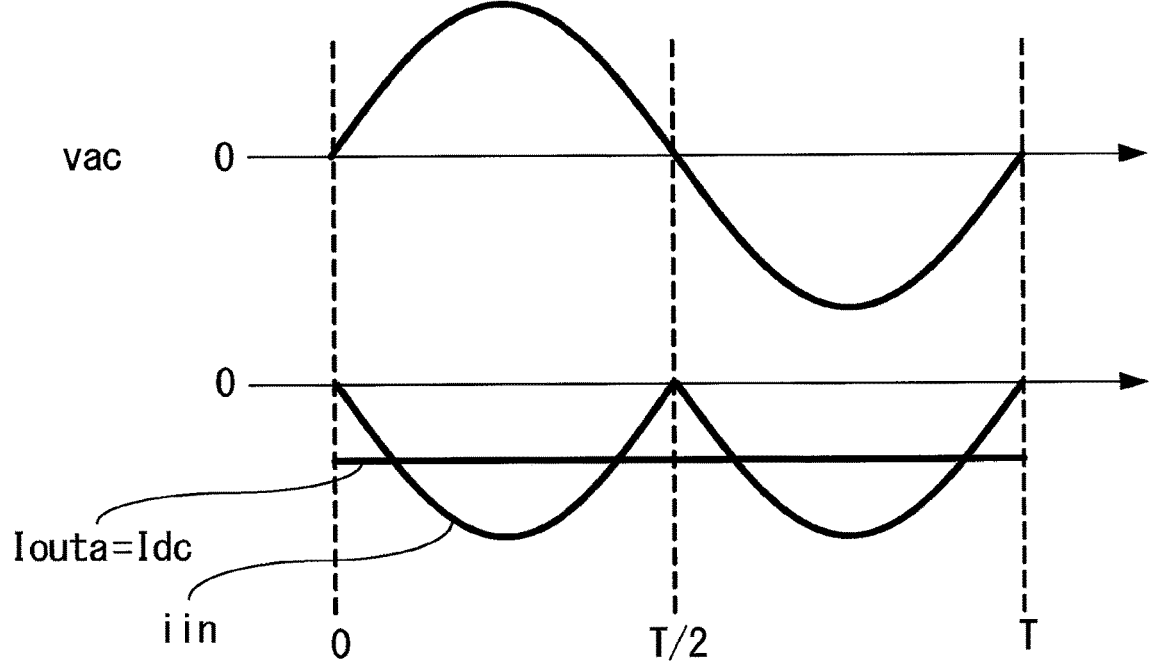
FIG. 29 is a waveform diagram showing input and output currents of the DC capacitor in regeneration operation of the power conversion device in a comparative example of embodiment 2 of the present invention.

FIG. 29 is a waveform diagram showing input and output currents of the DC capacitor 5 in regeneration operation in the case where the DC capacitor 5 outputs only DC current, as a comparative example. In this case, output current iouta of the DC capacitor 5 becomes the DC current Idc.

As shown in FIG. 29, at the zero cross phase of the AC power supply 1, since input current iin to the DC capacitor 5 is almost zero, charge/discharge current (iin−iouta) compensated by the DC capacitor 5 becomes almost (−Idc), that is, the charge/discharge current (iin−iouta) compensated by the DC capacitor 5 becomes surplus for charging, so that the surplus current flows into the DC capacitor 5 and charges the DC capacitor 5. On the other hand, at the peak phase, since the absolute value of input current iin having a negative polarity is maximum, the DC capacitor 5 bears and compensates charge/discharge current (iin−iouta).

Figure 30:
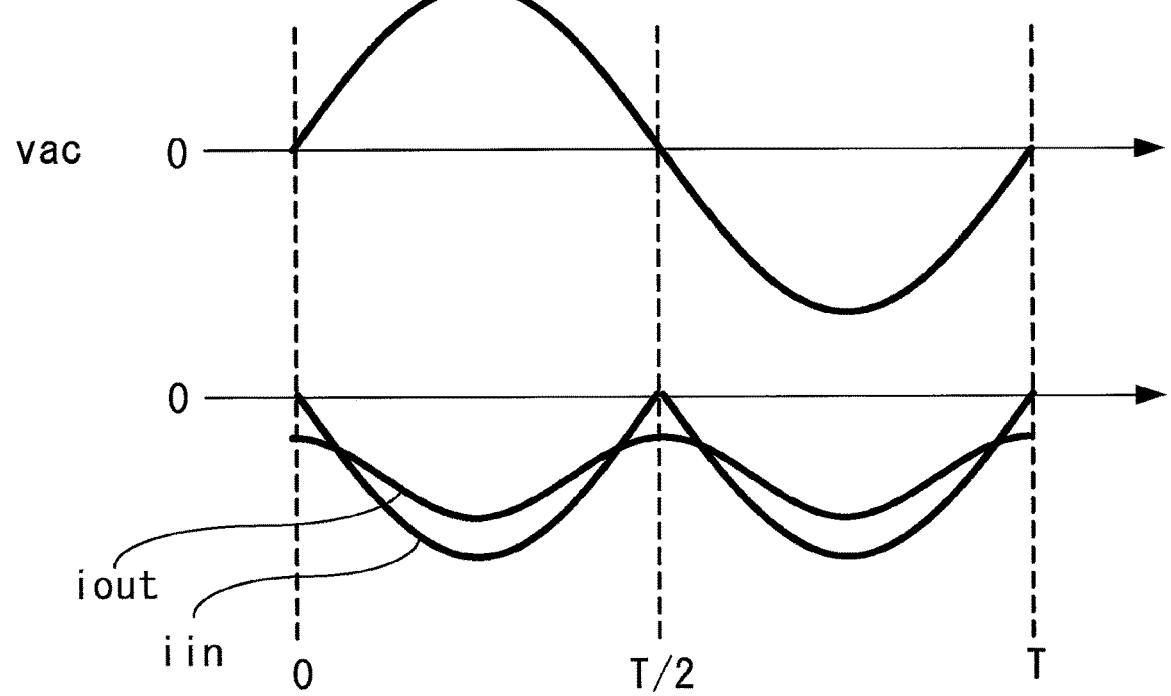
FIG. 30 is a waveform diagram showing input and output currents of the DC capacitor in regeneration operation of the power conversion device according to embodiment 2 of the present invention.

In the present embodiment, output current iout of the DC capacitor 5 includes the ripple current irp superimposed thereon as described above. FIG. 30 shows a waveform diagram of input and output currents of the DC capacitor 5 in regeneration operation.

As shown in FIG. 30, at the zero cross phase of the AC power supply 1, the absolute value of output current iout becomes minimum along with input current iin of the DC capacitor 5 becoming almost zero. At the peak phase, the absolute value of output current iout becomes maximum along with the absolute value of input current iin becoming maximum. Thus, the charge/discharge current (iin−iout), which is ripple current, compensated by the DC capacitor 5 can be suppressed, and the ripple voltage vc2 and the ripple current effective value of the DC capacitor 5 can be suppressed.

In power-running operation, as in the above embodiment 1, in accordance with the above expression (11), ripple voltage vc2, in the DC capacitor 5, which has a frequency component twice as high as the frequency of the AC power supply 1 is reduced.

In regeneration operation, since the current polarity is inverted, ripple voltage vc2 is represented by the following expression (27). It is noted that expression (27) serves as a reduction theoretical expression for ripple voltage vc2 of the DC capacitor 5 in regeneration operation.

$$vc2=((-Vac \cdot Iac+Vdc \cdot (\sqrt{2})Irp)/2\omega Cdc \cdot Vdc) \cdot \sin(2\omega t) \quad (27)$$

As shown by the above expression (27), when the peak value ($\sqrt{2}$)Irp of ripple current irp superimposed on output current iout of the DC capacitor 5 increases, ripple voltage vc2 occurring on the DC capacitor 5 decreases. In addition, an amplitude ΔVdc of ripple voltage vc2 is defined by the following expression (28) on the basis of the above expression (27).

$$\Delta Vdc=((-Vac \cdot Iac+Vdc \cdot (\sqrt{2})Irp)/2\omega Cdc \cdot Vdc) \quad (28)$$

In power-running operation, as in the above embodiment 1, charge/discharge current (iin−iout) in the DC capacitor 5 which is ripple current having a frequency component twice as high as the frequency of the AC power supply 1 is reduced in accordance with the above expression (14a).

In regeneration operation, since the current polarity is inverted, charge/discharge current (iin−iout) of the DC capacitor 5 is represented by the following expression (29). It is noted that expression (29) serves as a reduction theoretical expression for ripple current (charge/discharge current) of the DC capacitor 5 in regeneration operation.

$$iin - iout = \left(-Idc + (\sqrt{2})Irp\right) \cdot \cos(2\omega t - \pi) \quad (29)$$

$$= (VL/Vdc) \cdot \left(-IL^* + (\sqrt{2})ILrp\right) \cdot \cos(2\omega t - \pi)$$

As shown by the above expression (29), it is found that charge/discharge current (iin−iout) of the DC capacitor 5 is a component having a frequency twice as high as the frequency of voltage vac of the AC power supply 1. In addition, the charge/discharge current (iin−iout) decreases when the peak value ($\sqrt{2}$)Irp of ripple current irp superimposed on output current iout or the ripple current peak value ($\sqrt{2}$)ILrp generated in load current IL increases.

From the above expression (29), in the case where an amplitude ΔIrp of charge/discharge current (iin−iout) of the DC capacitor 5 is defined by the above expression (15) as in the case of power-running operation, expression (29) can be represented by the following expression (30) using the amplitude ΔIrp.

$$iin-iout = \Delta Irp \cdot (-\cos(2\omega t - \pi)) \tag{30}$$

As in the above embodiment 1, a current component having a carrier frequency of the AC/DC converter 4c and the DC/DC converter 6a flows into or from the DC capacitor 5, and the charge/discharge current of the DC capacitor 5 is actually defined by the total sum including other frequency components such as the carrier frequency component. In particular, the carrier frequency is dominant and is greatly higher than the power supply frequency of the AC power supply 1, and the current component having the carrier frequency, which flows into or from the DC capacitor 5, is constant without depending on the frequency component twice as high as the frequency of the AC power supply 1. Therefore, in the present embodiment, the current component shown by expression (30) is suppressed, and the ripple current converges to the current component having the carrier frequency.

Control for the AC/DC converter 4c and the DC/DC converter 6a by the control circuit 10c in the power conversion device 101 which performs power-running operation and regeneration operation as described above, will be described.

In control for the AC/DC converter 4c, the control circuit 10c controls the power factor of the input current iac of the AC power supply 1 to be a high power factor of 1 or −1 and controls DC voltage Vdc of the DC capacitor 5 to be constant. In control for the DC/DC converter 6a, the control circuit 10c controls current transmitted to the load 9a or current transmitted from the load 9a, to be constant, and further, suppresses ripple voltage and ripple current of the DC capacitor 5.

Figure 31:
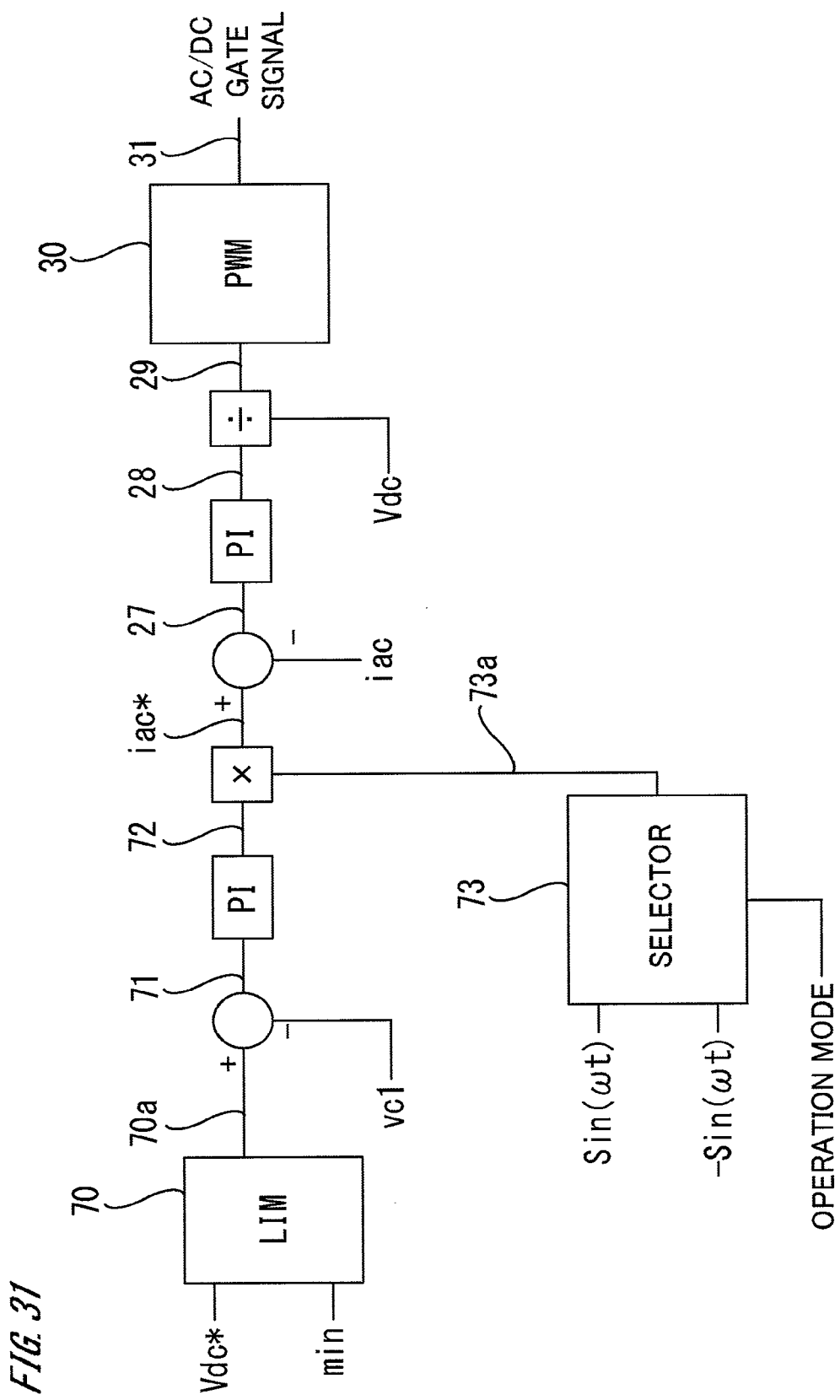
FIG. 31 is a control block diagram showing generation of a gate signal for the AC/DC converter according to embodiment 2 of the present invention.

FIG. 31 is a control block diagram showing generation of a gate signal for the AC/DC converter 4c, in the control circuit 10c.

A limiter 70 limits the DC voltage command value Vdc* for the DC capacitor 5, by a lower limit value min. As the lower limit value min, the load voltage VL is used. A deviation 71 between a voltage command value 70a for the DC capacitor 5 generated by the limiter 70, and detected voltage vc1, is subjected to PI control, to calculate a current command amplitude 72. An operation mode type, i.e., the power-running mode or the regeneration mode, is inputted to a selector 73. The selector 73 selects sin ωt in the case of power-running mode, and −sin ωt in the case of regeneration mode, and outputs the selected one as a sinewave signal 73a. Then, the current command amplitude 72 is multiplied by the sinewave signal 73a, to calculate a current command iac*.

Next, as in the above embodiment 1, a deviation 27 between the current command iac* and detected current iac is subjected to PI control, to calculate a voltage command value 28, and the voltage command value 28 is divided by the DC voltage component Vdc of the DC capacitor 5, thereby calculating a duty cycle 29. Then, the PWM circuit 30 generates a gate signal 31 for performing PWM control for the AC/DC converter 4, on the basis of the duty cycle 29. In the PWM circuit 30, the carrier frequency can be arbitrarily adjusted, and a triangle wave, a saw-tooth wave, or the like is used as the carrier wave.

Figure 32:
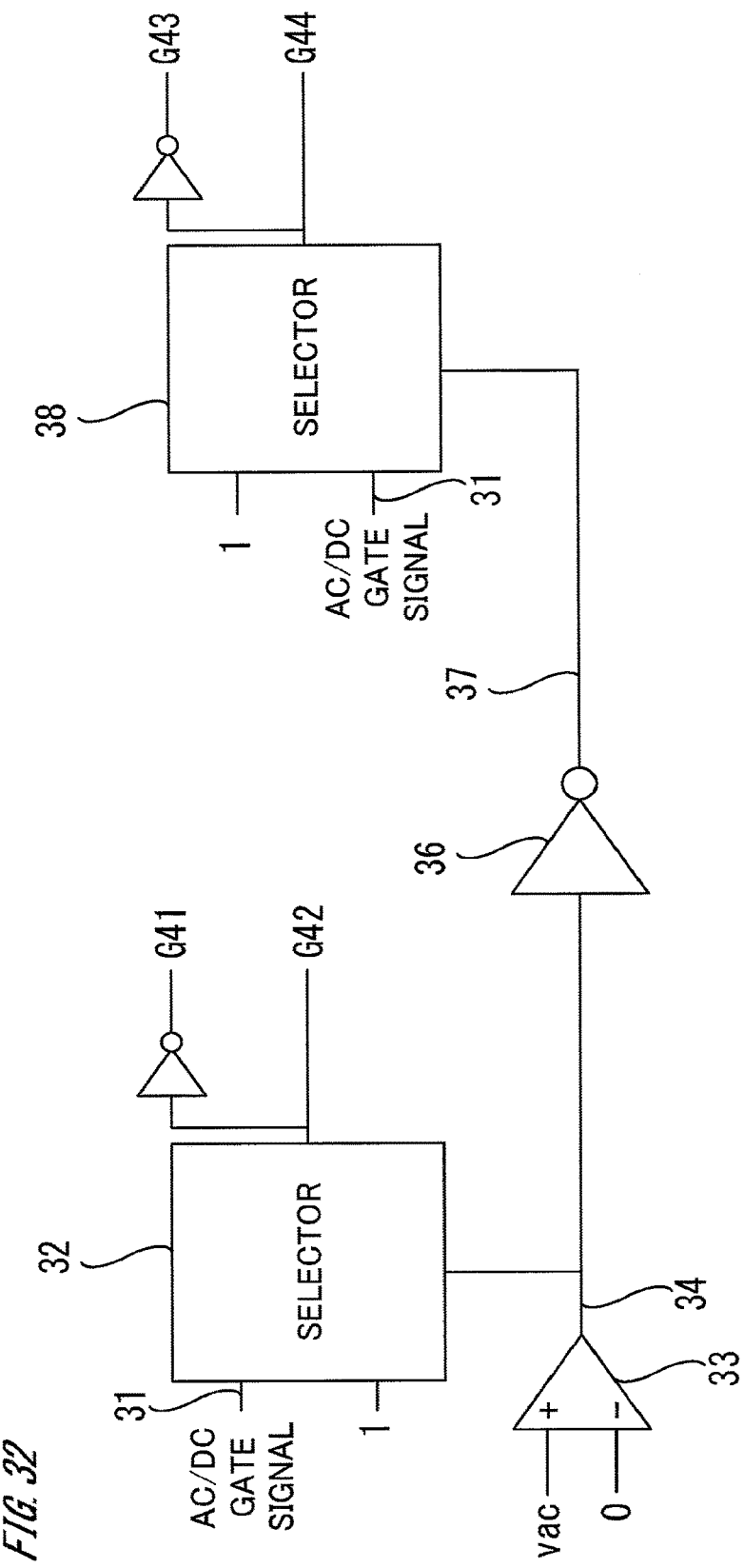
FIG. 32 is a control block diagram showing generation of gate signals for the AC/DC converter according to embodiment 2 of the present invention.

FIG. 32 is a control block diagram showing generation of gate signals G41 to G44 for the respective semiconductor switching elements 41a to 44a in the AC/DC converter 4c, in the control circuit 10c.

The gate signal 31 is respectively inputted to a selector 32 for the semiconductor switching elements 41a and 42a, and a selector 38 for the semiconductor switching elements 43a and 44a. A polarity determination device 33 determines the polarity of voltage vac of the AC power supply 1, and outputs a signal 34 which indicates 1 when the voltage vac is positive, and indicates 0 when the voltage vac is negative.

On the basis of the signal 34 from the polarity determination device 33, the selector 32 selects the gate signal 31 when the voltage vac is positive, and selects 1, i.e., an ON signal, when the voltage vac is negative, thus obtaining the gate signal G42. In addition, the gate signal G42 is inverted to obtain the gate signal G41.

On the basis of a signal 37 obtained by an inversion device 36 inverting the signal 34, the selector 38 selects the gate signal 31, or 1. That is, the selector 38 selects the gate signal 31 when the voltage vac is positive, and selects 1, i.e., an ON signal, when the voltage vac is negative, thus obtaining the gate signal G44. In addition, the gate signal G44 is inverted to obtain the gate signal G43.

Figure 33:
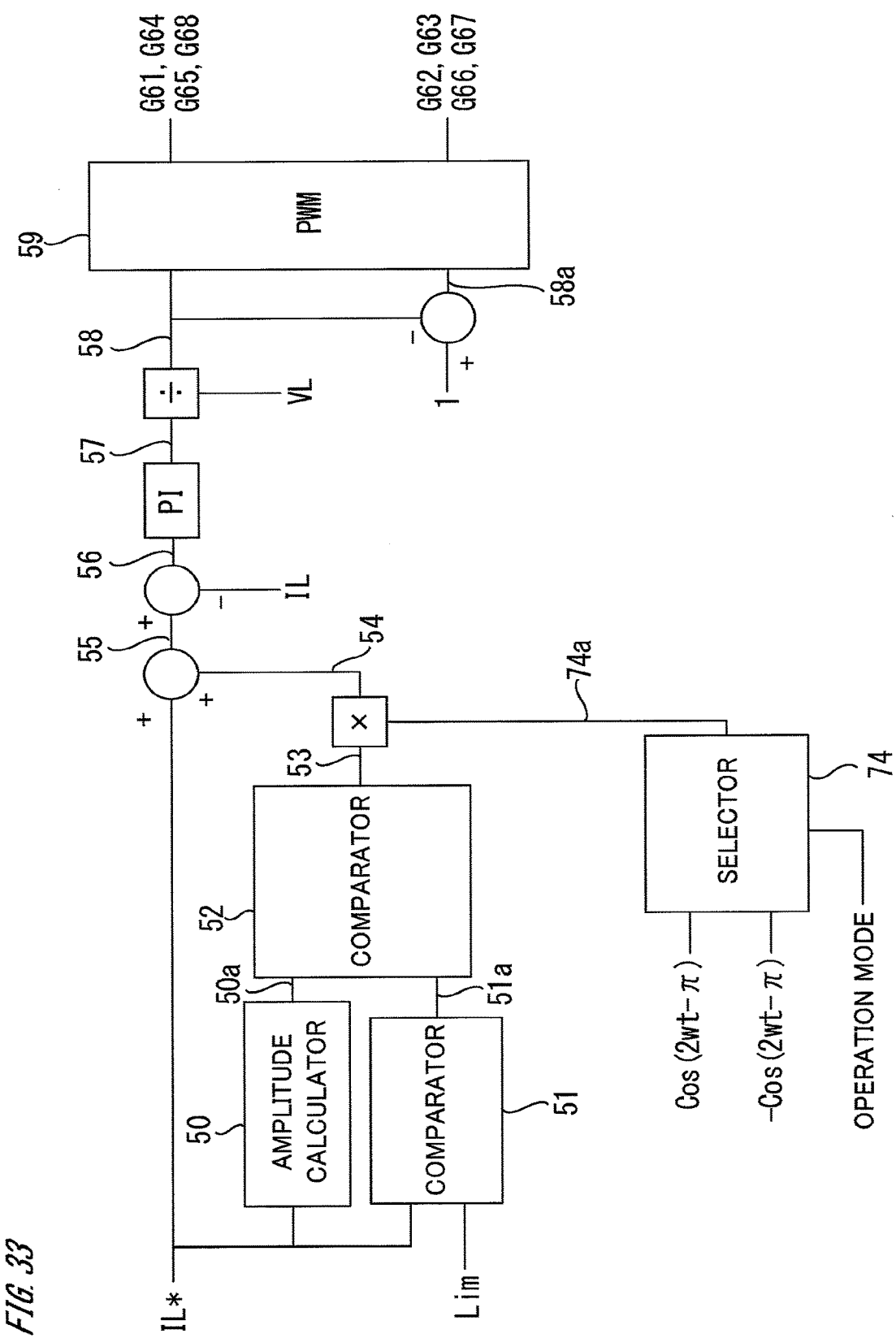
FIG. 33 is a control block diagram showing generation of gate signals for the DC/DC converter according to embodiment 2 of the present invention.

FIG. 33 is a control block diagram showing generation of gate signals G61 to G68 for the respective semiconductor switching elements 61a to 68a in the DC/DC converter 6a, in the control circuit 10c.

A command value IL* for load current IL outputted to the load 9a is a DC current command having only a DC component, and becomes a positive command value in the case of power-running operation and becomes a negative command value in the case of regeneration operation. As in the above embodiment 1, an amplitude calculator 50 calculates a ripple current peak value 50a on the basis of the command value IL*. That is, using a reduction theoretical expression for ripple voltage vc2 of the DC capacitor 5, calculation can be performed from the above expression (16) on the basis of the amplitude target value ΔVdc* for ripple voltage vc2, and (($\sqrt{2}$)Irp)* is used as the ripple current peak value 50a.

It is noted that the ripple current peak value 50a may be calculated using the above expressions (14a), (29) which are reduction theoretical expressions for charge/discharge current of the DC capacitor 5. The peak value ($\sqrt{2}$)ILrp of the ripple current to be generated in the load current IL can be calculated on the basis of the amplitude ΔIrp of charge/discharge current of the DC capacitor 5. A command value (($\sqrt{2}$)ILrp)* for this ($\sqrt{2}$)ILrp can be calculated from the above expression (17) using an amplitude target value ΔIrp* for charge/discharge current of the DC capacitor 5, and the (($\sqrt{2}$)ILrp)* is used as the ripple current peak value 50a.

A limitation value 51a is provided for the ripple current peak value 50a. A comparator 51 compares the command value IL* for load current IL and a limitation value Lim set in advance for the load 9a, and outputs the lower value as the limitation value 51a. The reason for limitation by the command value IL* is to prevent the instantaneous value of current supplied to the load 9a from becoming smaller than 0 A, so as not to cause a discontinuous mode. The limitation value Lim set for the load 9a is a value prescribed from lifetime deterioration due to heat generation of the battery (load 9a) caused by increase in the AC component.

A comparator 52 compares the ripple current peak value 50a and the limitation value 51a, and the comparator 52 outputs the lower value as an amplitude 53 of an AC current command.

A selector 74 receives an operation mode type, i.e., the power-running mode or the regeneration mode. Using w as the angular frequency of AC voltage vac shown by the above expression (3), the selector 74 selects a function P shown by the above expression (18) in the case of power-running mode and selects a function P shown by the following expression (31) in the case of regeneration mode, and outputs the selected one as a sinewave signal 74a. The amplitude 53 is multiplied by the sinewave signal 74a, to calculate a ripple current command 54 as the AC current command.

$$P = -\cos(2\omega t - \pi) \quad (31)$$

It is noted that, in the power-running mode, the function P used as the sinewave signal 74a by which the amplitude 53 of the AC current command is multiplied may be a function representing a sinewave having the minimum value at the zero cross phase of AC voltage vac and having the maximum value at the peak phase thereof. In addition, in the regeneration mode, the function P may be a function representing a sinewave having the maximum value at the zero cross phase of AC voltage vac and having the minimum value at the peak phase thereof.

That is, using an angular frequency $(2(2n-1)\omega)$, the function P shown by the above expression (19) can be used in the power-running mode, and a function P shown by the following expression (32) can be used in the regeneration mode.

$$P = -\cos(2(2n-1)\omega t - \pi) \quad (32)$$

The control circuit 10c adds the calculated ripple current command 54 to the command value IL* for load current IL, thereby generating a current command value 55 containing ripple current, as an output current command for the DC/DC converter 6a.

Next, the current command value 55 is compared with detected load current IL, and the resultant deviation 56 is subjected to PI control, to calculate a voltage command value 57. The voltage command value 57 is divided by DC voltage VL of the load 9a, to calculate a duty cycle 58.

Then, on the basis of the duty cycle 58 and using a carrier signal, a PWM circuit 59 generates gate signals G61 to G68 for the semiconductor switching elements 61a to 68a in the first full-bridge circuit 6b and the second full-bridge circuit 6c of the DC/DC converter 6a.

In the power-running mode, the control circuit 10c calculates, from the duty cycle 58, a diagonal-ON duty for the semiconductor switching elements 61a, 64a, or a diagonal-ON duty for the semiconductor switching elements 62a, 63a, to control the first full-bridge circuit 6b. The semiconductor switching elements 61a, 62a constitute the same leg, and G61 and G62 are set to have the same duty cycle with their phases inverted from each other by 180 degrees. The semiconductor switching elements 63a, 64a constitute the same leg, and G63 and G64 are set to have the same duty cycle with their phases inverted from each other by 180 degrees. In this case, the control circuit 10c controls the semiconductor switching elements 65a to 68a of the second full-bridge circuit 6c in a synchronous rectification mode in the same manner as for the semiconductor switching elements 61a to 64a of the first full-bridge circuit 6b.

Therefore, the PWM circuit 59 generates the gate signals G61, G64 for the semiconductor switching elements 61a, 64a, from the duty cycle 58 and the carrier wave. In addition, the PWM circuit 59 generates the gate signals G62, G63 for the semiconductor switching elements 62a, 63a, from the carrier wave and a duty cycle 58a obtained by subtracting the duty cycle 58 from 1. The gate signals G65 to G68 for the semiconductor switching elements 65a to 68a are the same as the gate signal G61 to G64, respectively.

In the regeneration mode, the control circuit 10c calculates, from the duty cycle 58, a diagonal-ON duty for the semiconductor switching elements 65a, 68a, or a diagonal-ON duty for the semiconductor switching elements 66a, 67a, to control the second full-bridge circuit 6c. The semiconductor switching elements 65a, 66a constitute the same leg, and G65 and G66 are set to have the same duty cycle with their phases inverted from each other by 180 degrees. The semiconductor switching elements 67a, 68a constitute the same leg, and G67 and G68 are set to have the same duty cycle with their phases inverted from each other by 180 degrees. In this case, the control circuit 10c controls the semiconductor switching elements 61a to 64a of the first full-bridge circuit 6b in a synchronous rectification mode in the same manner as for the semiconductor switching elements 65a to 68a of the second full-bridge circuit 6c.

Therefore, the PWM circuit 59 generates the gate signals G65, G68 for the semiconductor switching elements 65a, 68a, from the duty cycle 58 and the carrier wave. In addition, the PWM circuit 59 generates the gate signals G66, G67 for the semiconductor switching elements 66a, 67a, from the carrier wave and the duty cycle 58a obtained by subtracting the duty cycle 58 from 1. The gate signal G61 to G64 for the semiconductor switching elements 61a to 64a are the same as the gate signals G65 to G68, respectively.

It is noted that, in the case of not using a synchronous rectification mode, in the power-running mode, all the semiconductor switching elements 65a to 68a of the second full-bridge circuit 6c are turned off, and in the regeneration mode, all the semiconductor switching elements 61a to 64a of the first full-bridge circuit 6b are turned off.

In addition, dead times may be provided for the semiconductor switching elements 41a, 42a and the semiconductor switching elements 43a, 44a in the AC/DC converter 4c, respectively. Further, dead times may be provided for the semiconductor switching elements 61a, 62a, the semiconductor switching elements 63a, 64a, the semiconductor switching elements 65a, 66a, and the semiconductor switching elements 67a, 68a in the DC/DC converter 6a, respectively.

As described above, in the present embodiment, the isolation-type DC/DC converter 6a using the transformer 16 is used, and the control circuit 10c performs current control for the DC/DC converter 6a, using the current command value 55 obtained by superimposing, onto the DC current command (command value IL*) for DC current to be supplied to the load 9a, the ripple current command 54 having a frequency 2×(2n−1) times as high as the frequency of the AC power supply 1 and having the minimum value at the zero cross phase and the maximum value at the peak phase. Thus, as in the above embodiment 1, ripple voltage and ripple current of the DC capacitor 5 can be reduced, and the same effect can be obtained.

In addition, since a battery is used as the load 9a, the permissible amount of ripple current is great unlike the case of a motor load or the like and therefore the control using the current command value 55 on which the ripple current command 54 is superimposed can be reliably performed, and it is possible to adapt to bidirectional power transmission.

In the present embodiment, the power conversion device 101 is configured to be capable of bidirectional power transmission, and in regeneration operation, the amplitude, the frequency, and the initial phase of the ripple current command 54 are kept as they are in power-running operation, and the polarities of the ripple current command 54 and the DC current command (command value IL*) are inverted from those in power-running operation. That is, the ripple current command 54 is set to be a sinewave having a frequency 2×(2n−1) times as high as the frequency of the AC power supply 1 and having the maximum value at the zero cross phase and the minimum value at the peak phase. Thus, in bidirectional operations, ripple voltage and ripple current of the DC capacitor 5 can be reduced, and size reduction of the DC capacitor 5 and size reduction and cost reduction of the power conversion device 101 can be achieved.

Switching between power-running operation and regeneration operation is performed by, in the AC/DC converter 4c, only inverting the polarity of the sinewave signal to be multiplied for generating the current command (iac*). In the DC/DC converter 6a, the switching is performed by only inverting the polarity of the sinewave signal to be multiplied for generating the ripple current command 54. Thus, the control for switching between power-running operation and regeneration operation can be easily achieved, and charge operation and discharge operation for the load 9a can be performed at a high speed and continuously.

In addition, since the voltage setting range for the DC capacitor 5 varies in response to variation in DC voltage VL of the load 9a which is a battery, the command value for DC voltage Vdc, which is necessary for reducing ripple voltage of the DC capacitor 5 in accordance with the above expression (11), can be set in accordance with the voltage setting range for the DC capacitor 5. Thus, the reliability of the control is improved, and ripple voltage and ripple current of the DC capacitor 5 can be effectively reduced.

Embodiment 3

Next, a power conversion device according to embodiment 3 of the present invention will be described.

In the above embodiments 1 and 2, the ripple current command 54 to be superimposed is a sinewave command. In the present embodiment 3, a full-wave rectified waveform obtained by folding up a sinewave is used as the ripple current command.

The circuit configuration of the power conversion device can be achieved by either the above embodiment 1 or embodiment 2. Here, the case of adopting the above embodiment 2 which includes bidirectional operations, i.e., power-running operation and regeneration operation, will be described. The high power factor control by the AC/DC converter 4c is the same as in the above embodiment 2.

Figure 34:
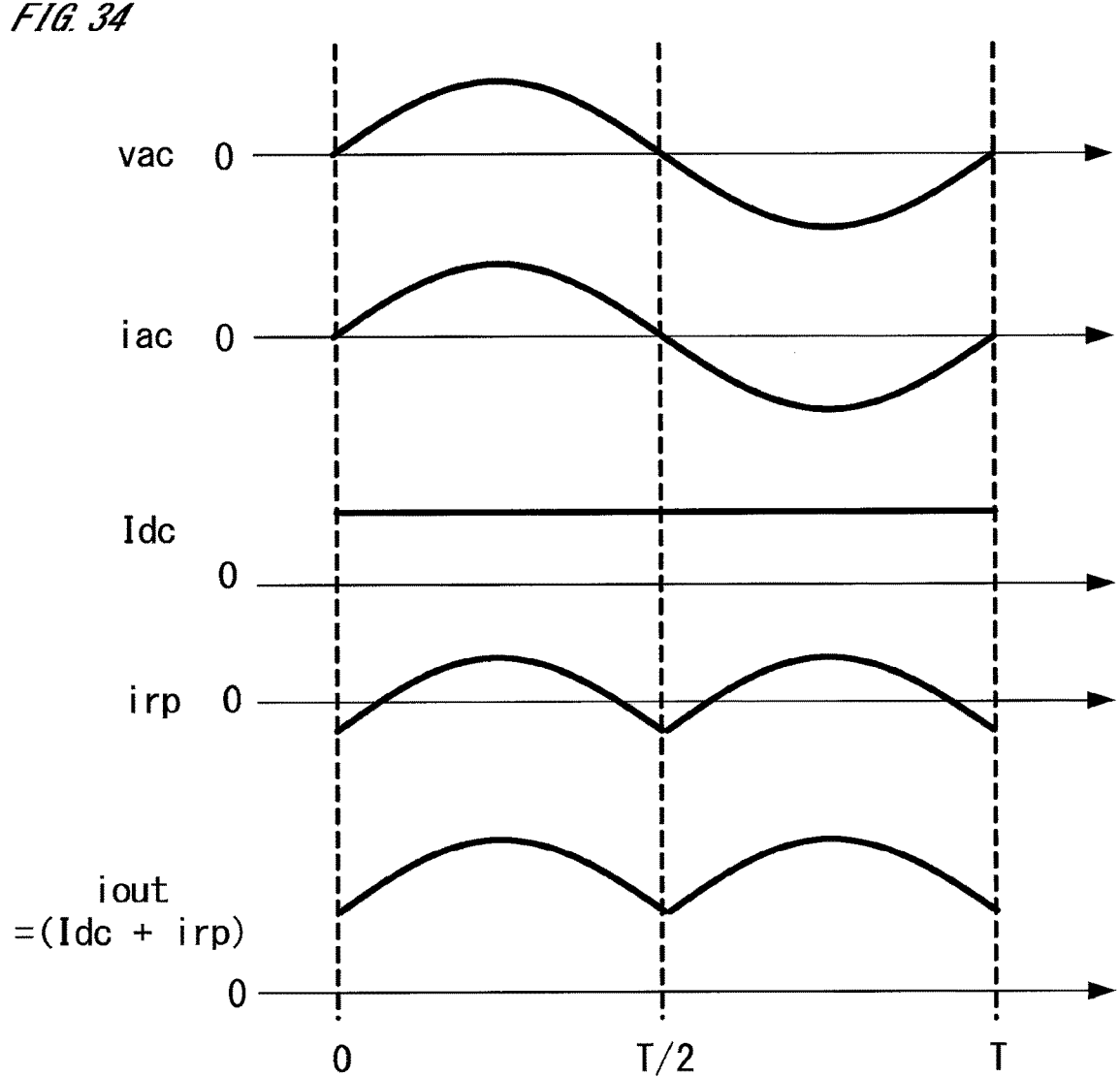
FIG. 34 is a waveform diagram showing each component of output current of a DC capacitor in power-running operation of a power conversion device according to embodiment 3 of the present invention.

FIG. 34 is a waveform diagram showing voltage vac and current iac of the AC power supply 1 and each component contained in output current iout of the DC capacitor 5, in power-running operation. Current iac is controlled at a power factor of 1. Output current iout of the DC capacitor 5 is current obtained by superimposing ripple current irp onto the DC current component Idc, and the ripple current irp to be superimposed has a full-wave rectified waveform of a sinewave synchronized with AC voltage vac. An offset amount (−Q) based on the following expression (33) is added to the ripple current irp so that the average value thereof becomes 0 A, and as a result, the theoretical expression of the ripple current irp is represented by the following expression (34). This ripple current irp has the minimum value at the zero cross phase of the AC power supply 1 and has the maximum value at the peak phase thereof.

[Mathematical 1]

Mathematical 1

$$Q = \frac{1}{T/2} \int_0^{T/2} \sqrt{2}\, Irp \sin\omega t\, dt = \frac{2\sqrt{2}}{\pi} Irp \quad (33)$$

$$irp = \sqrt{2}\, Irp|\sin\omega t| - \frac{2\sqrt{2}}{\pi} Irp \quad (34)$$

Figure 35:
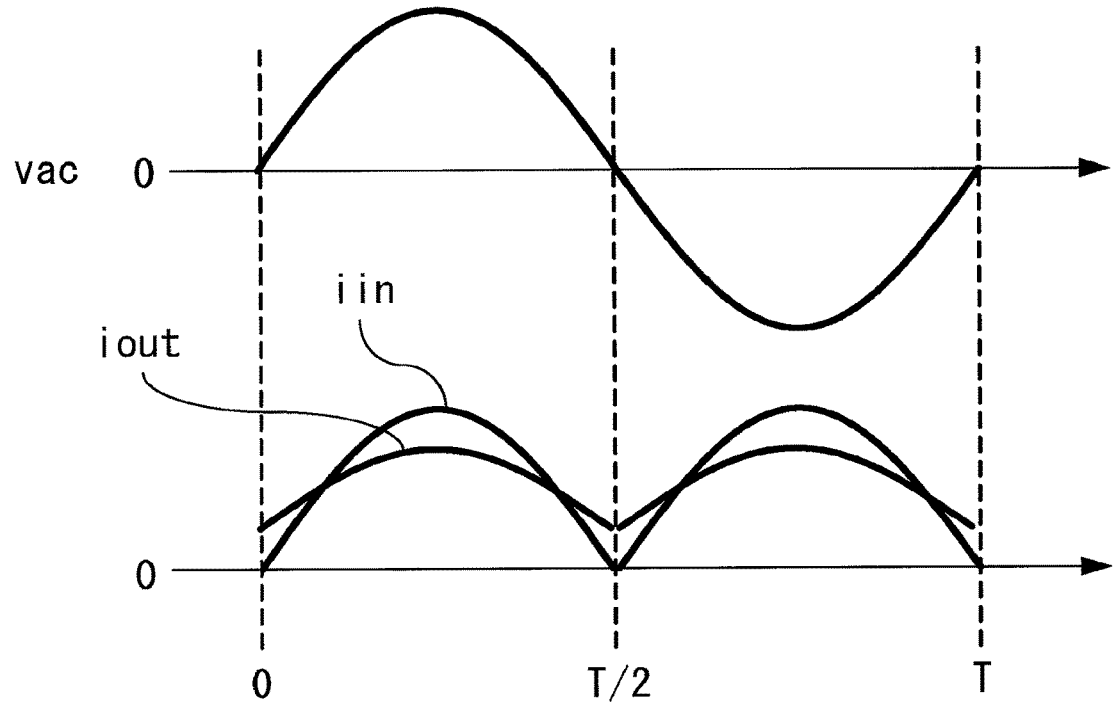
FIG. 35 is a waveform diagram showing input and output currents of the DC capacitor in power-running operation of the power conversion device according to embodiment 3 of the present invention.

FIG. 35 is a waveform diagram showing input and output currents of the DC capacitor 5 in power-running operation.

As shown in FIG. 35, at the zero cross phase of the AC power supply 1, output current iout becomes the minimum value along with input current iin of the DC capacitor 5 becoming almost zero. At the peak phase, output current iout becomes the maximum value along with input current iin becoming the maximum value. Thus, the charge/discharge current (iin−iout), which is ripple current, compensated by the DC capacitor 5 can be suppressed, and the ripple voltage vc2 and the ripple current effective value of the DC capacitor 5 can be suppressed.

Figure 36:
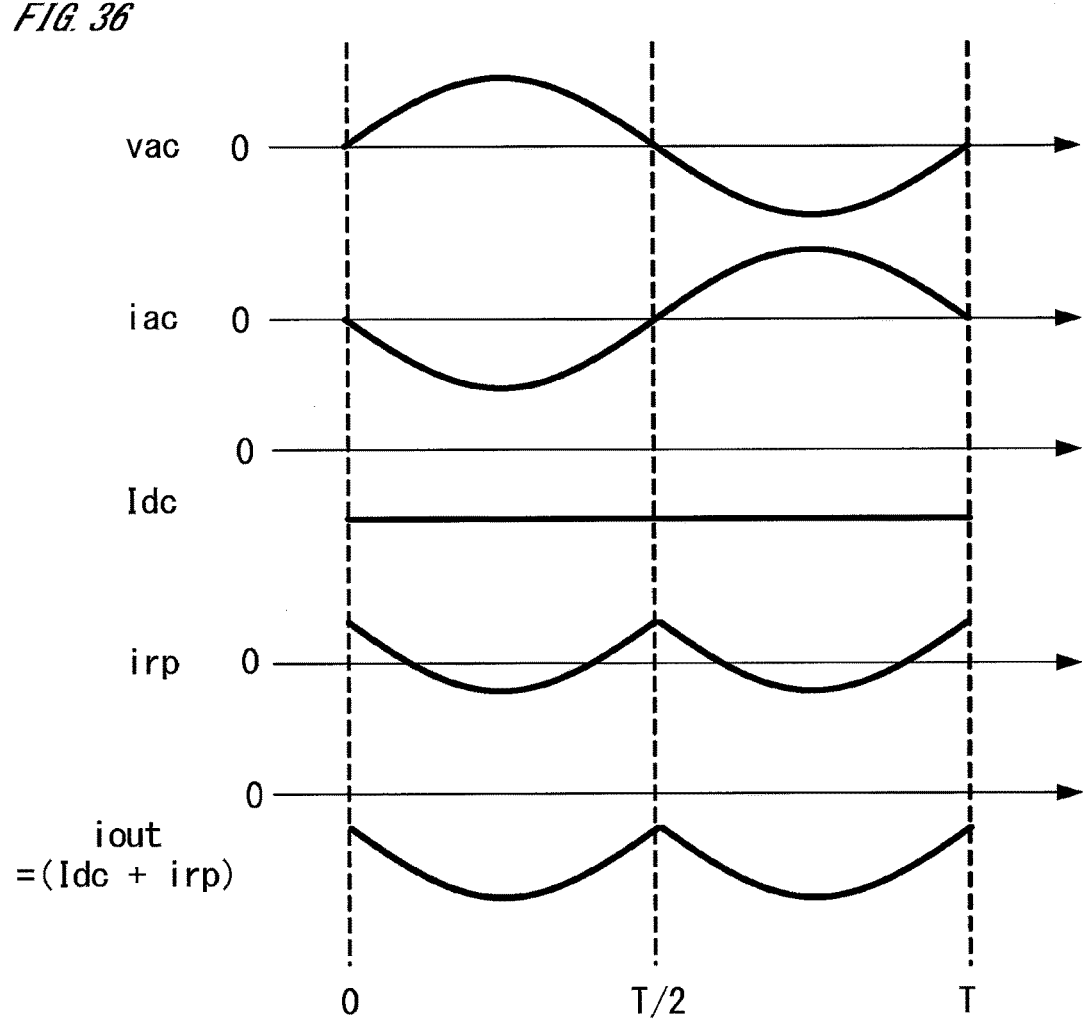
FIG. 36 is a waveform diagram showing each component of output current in the DC capacitor in regeneration operation of the power conversion device according to embodiment 3 of the present invention.

Next, FIG. 36 is a waveform diagram showing voltage vac and current iac of the AC power supply 1 and each component contained in output current iout of the DC capacitor 5, in regeneration operation. Current iac is controlled at a power factor of −1. Output current iout of the DC capacitor 5 is current obtained by superimposing ripple current irp onto the DC current component Idc, and the ripple current irp to be superimposed has a waveform obtained by inverting the polarity of a full-wave rectified waveform of a sinewave synchronized with AC voltage vac. An offset amount (−Q) based on the following expression (35) is added to the ripple current irp so that the average value thereof becomes 0 A, and as a result, the theoretical expression of the ripple current irp is represented by the following expression (36). This ripple current irp has the maximum value at the zero cross phase of the AC power supply 1 and has the minimum value at the peak phase thereof.

[Mathematical 2]

Mathematical 2

$$Q = \frac{1}{T/2} \int_0^{T/2} \sqrt{2}\, Irp \sin\omega t\, dt = \frac{2\sqrt{2}}{\pi} Irp \quad (35)$$

$$irp = -\sqrt{2}\, Irp|\sin\omega t| + \frac{2\sqrt{2}}{\pi} Irp \quad (36)$$

Figure 37:
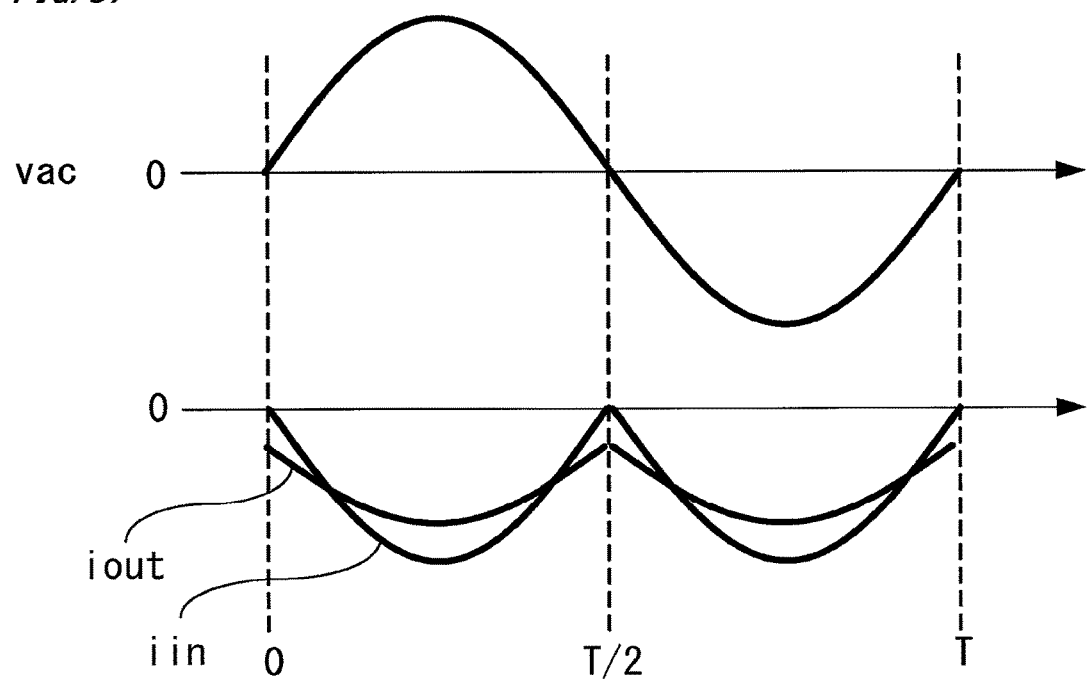
FIG. 37 is a waveform diagram showing input and output currents of the DC capacitor in regeneration operation of the power conversion device according to embodiment 3 of the present invention.

FIG. 37 is a waveform diagram showing input and output currents of the DC capacitor 5 in regeneration operation.

As shown in FIG. 37, at the zero cross phase of the AC power supply 1, the absolute value of output current iout becomes minimum along with input current iin of the DC capacitor 5 becoming almost zero. At the peak phase, the absolute value of output current iout becomes maximum along with the absolute value of input current iin becoming maximum. Thus, the charge/discharge current (iin−iout), which is ripple current, compensated by the DC capacitor 5 can be suppressed, and the ripple voltage vc2 and the ripple current effective value of the DC capacitor 5 can be suppressed.

Also in this case, the frequency component twice as high as the frequency of the AC power supply 1 is focused on, without considering a current component having a carrier frequency of the AC/DC converter 4c and the DC/DC converter 6a.

Figure 38:
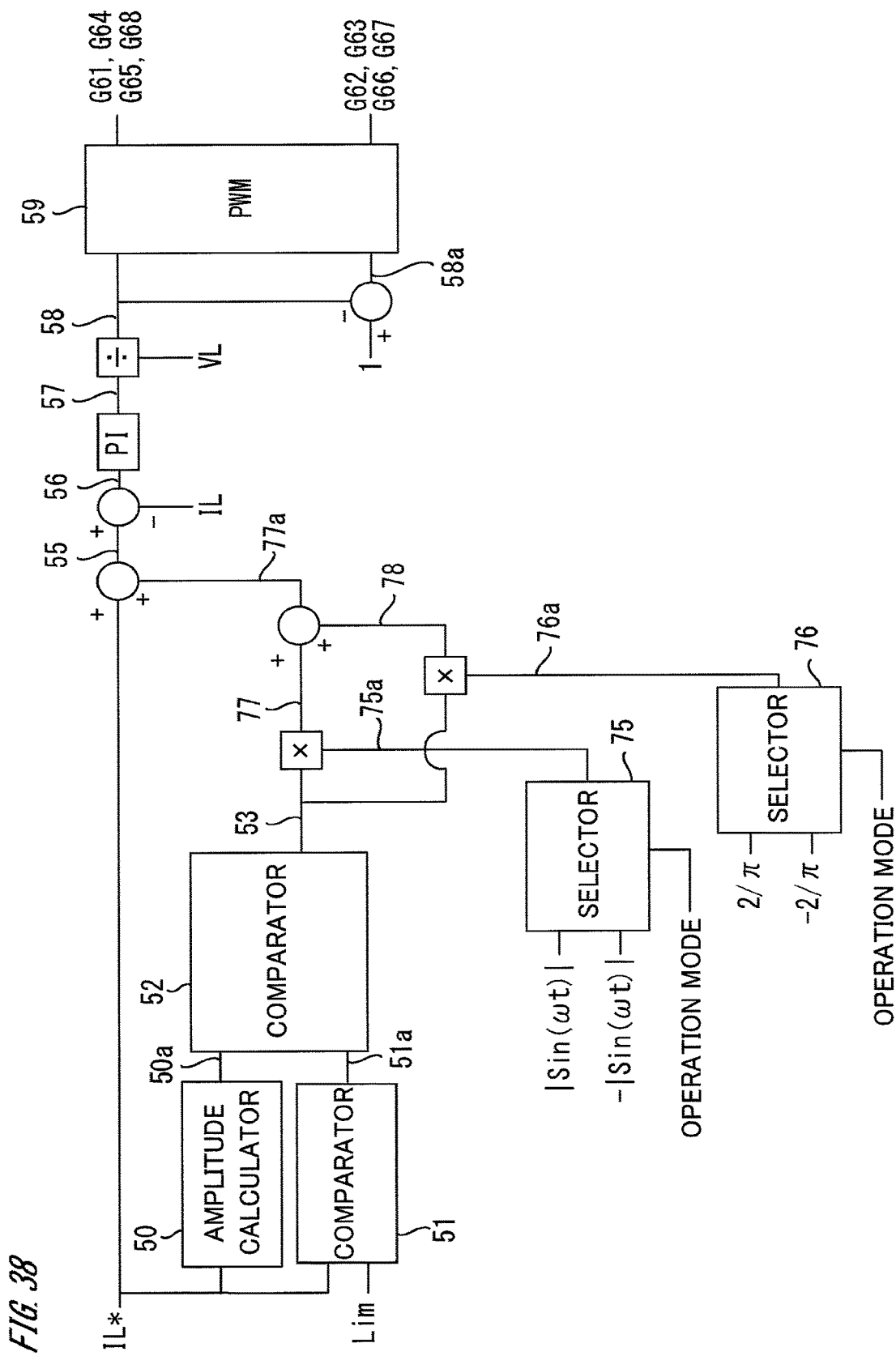
FIG. 38 is a control block diagram showing generation of gate signals for a DC/DC converter according to embodiment 3 of the present invention.

FIG. 38 is a control block diagram showing generation of gate signals G61 to G68 for the respective semiconductor switching elements 61a to 68a in the DC/DC converter 6a, in the control circuit 10c according to the present embodiment 3.

A command value IL* for load current IL outputted to the load 9a is a DC current command having only a DC component, and becomes a positive command value in the case of power-running operation and becomes a negative command value in the case of regeneration operation. As in the above embodiment 2, an amplitude calculator 50 calculates the ripple current peak value 50a on the basis of the command value IL*. A comparator 52 outputs an amplitude 53 on the basis of the ripple current peak value 50a.

A selector 75 receives an operation mode type, i.e., the power-running mode or the regeneration mode. The selector 75 selects |sin(ωt)| in the case of power-running mode and selects −|sin(ωt)| in the case of regeneration mode, and outputs the selected one as a sinewave rectification signal 75a. In addition, a selector 76 receives an operation mode type, i.e., the power-running mode or the regeneration mode, and outputs a coefficient 76a according to the operation mode. The amplitude 53 is multiplied by the coefficient 76a, to generate an offset amount 78.

Next, the control circuit 10c adds the offset amount 78 to a current command 77 obtained by multiplying the amplitude 53 by the sinewave rectification signal 75a, to calculate a ripple current command 77a as the AC current command.

The control circuit 10c adds the calculated ripple current command 77a to the command value IL* for load current IL, thereby generating a current command value 55 containing ripple current, as an output current command for the DC/DC converter 6a.

Thereafter, as in the above embodiment 2, the current command value 55 is compared with detected load current IL, and the resultant deviation 56 is subjected to PI control, to calculate a voltage command value 57. The voltage command value 57 is divided by DC voltage VL of the load 9a, thereby calculating a duty cycle 58.

Then, on the basis of the duty cycle 58 and using a carrier signal, a PWM circuit 59 generates gate signals G61 to G68 for the semiconductor switching elements 61a to 68a in the first full-bridge circuit 6b and the second full-bridge circuit 6c of the DC/DC converter 6a.

Also in the present embodiment, as in the above embodiments 1 and 2, ripple voltage and ripple current of the DC capacitor 5 can be reduced, and size reduction of the DC capacitor 5 and size reduction and cost reduction of the power conversion device 101 can be achieved.

Embodiment 4

Next, a power conversion device according to embodiment 4 of the present invention will be described.

In the above embodiment 3, a full-wave rectified waveform of a sinewave is used as the ripple current command. In the present embodiment 4, a triangle wave is used as the ripple current command.

The circuit configuration of the power conversion device can be achieved by either the above embodiment 1 or embodiment 2. Here, the case of adopting the above embodiment 2 which includes bidirectional operations, i.e., power-running operation and regeneration operation, will be described. The high power factor control by the AC/DC converter 4c is the same as in the above embodiment 2.

Figure 39:
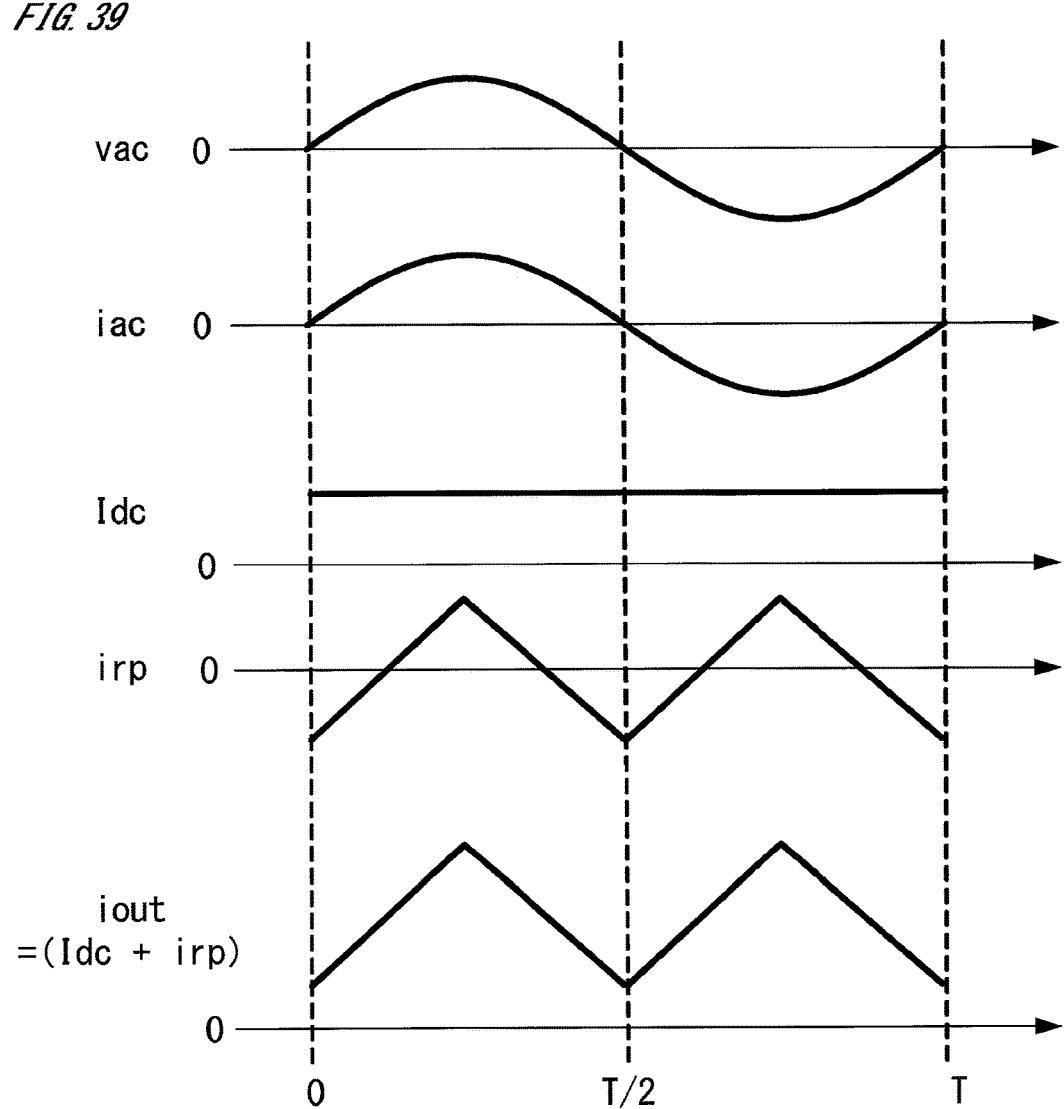
FIG. 39 is a waveform diagram showing each component of output current of a DC capacitor in power-running operation of a power conversion device according to embodiment 4 of the present invention.

FIG. 39 is a waveform diagram showing voltage vac and current iac of the AC power supply 1 and each component contained in output current iout of the DC capacitor 5, in power-running operation. Current iac is controlled at a power factor of 1. Output current iout of the DC capacitor 5 is current obtained by superimposing ripple current irp onto the DC current component Idc. The ripple current irp to be superimposed has a triangle waveform having a frequency twice as high as the frequency of AC voltage vac and having the minimum value at the zero cross phase of AC voltage vac and the maximum value at the peak phase thereof. In addition, the ripple current irp is set such that the minimum value and the maximum value are equally distant from the zero point so that the average value becomes 0 A.

Figure 40:
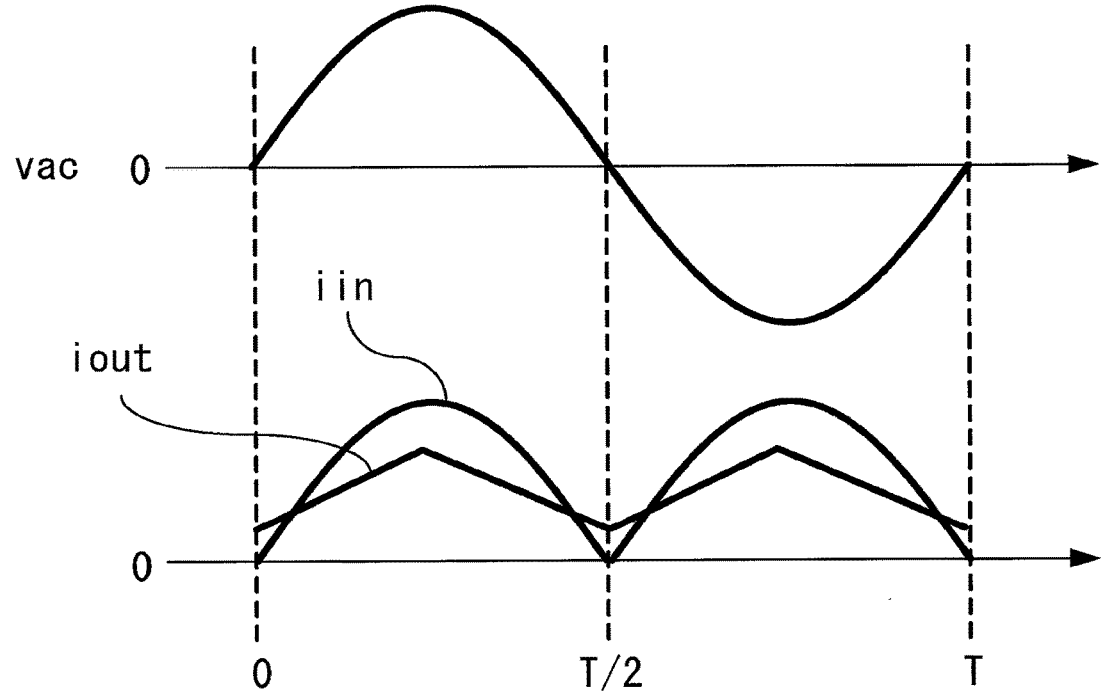
FIG. 40 is a waveform diagram showing input and output currents of the DC capacitor in power-running operation of the power conversion device according to embodiment 4 of the present invention.

FIG. 40 is a waveform diagram showing input and output currents of the DC capacitor 5 in power-running operation.

As shown in FIG. 40, at the zero cross phase of the AC power supply 1, output current iout becomes the minimum value along with input current iin of the DC capacitor 5 becoming almost zero. At the peak phase, output current iout becomes the maximum value along with input current iin becoming the maximum value. Thus, the charge/discharge current (iin−iout), which is ripple current, compensated by the DC capacitor 5 can be suppressed, and the ripple voltage vc2 and the ripple current effective value of the DC capacitor 5 can be suppressed.

Figure 41:
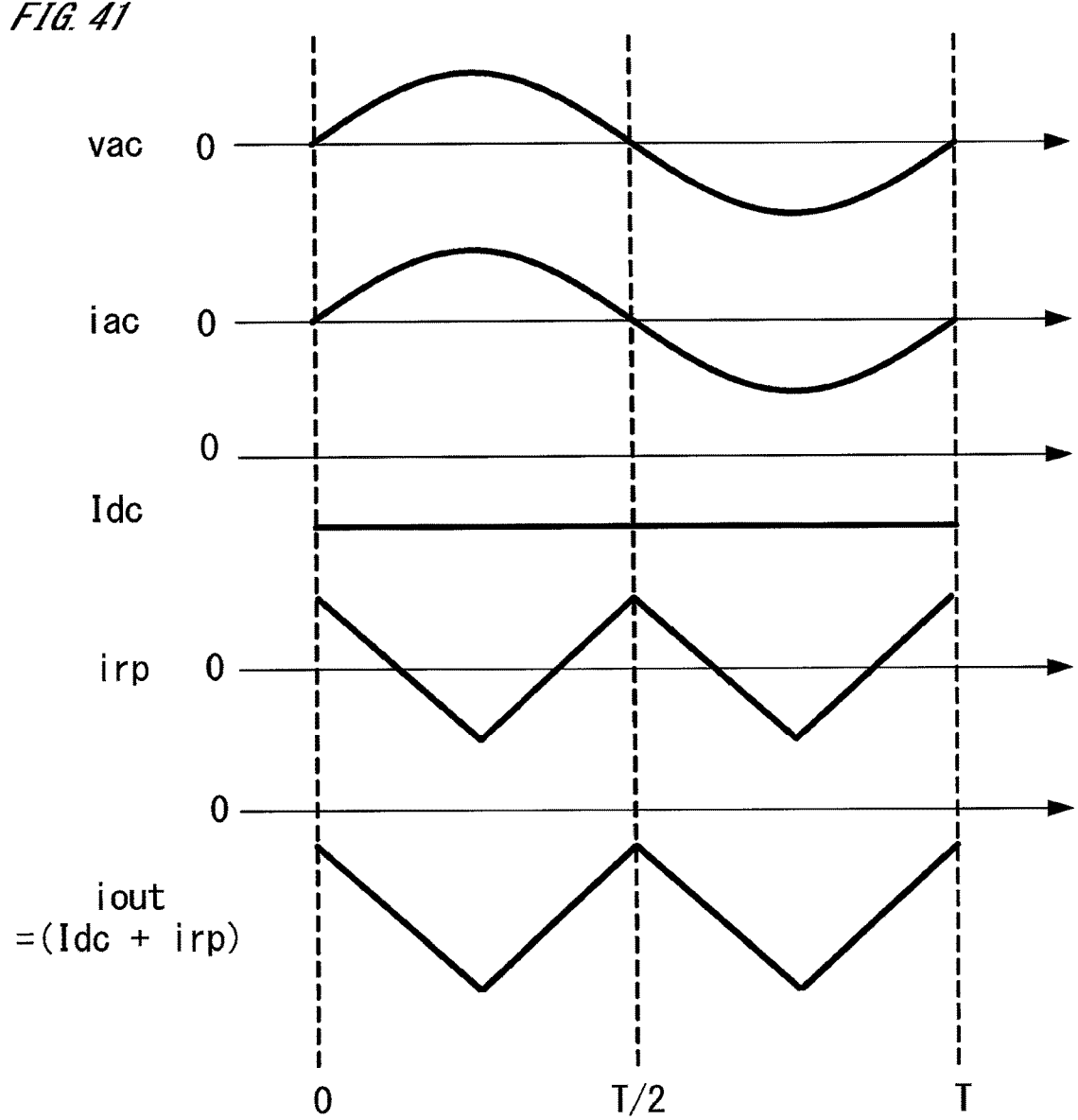
FIG. 41 is a waveform diagram showing each component of output current of the DC capacitor in regeneration operation of the power conversion device according to embodiment 4 of the present invention.

Next, FIG. 41 is a waveform diagram showing voltage vac and current iac of the AC power supply 1 and each component contained in output current iout of the DC capacitor 5, in regeneration operation. Current iac is controlled at a power factor of −1. Output current iout of the DC capacitor 5 is current obtained by superimposing ripple current irp onto the DC current component Idc. The ripple current irp to be superimposed has a triangle waveform having a frequency twice as high as the frequency of AC voltage vac and having the maximum value at the zero cross phase of AC voltage vac and the minimum value at the peak phase thereof. In addition, the ripple current irp is set such that the minimum value and the maximum value are equally distant from the zero point so that the average value becomes 0 A.

Figure 42:
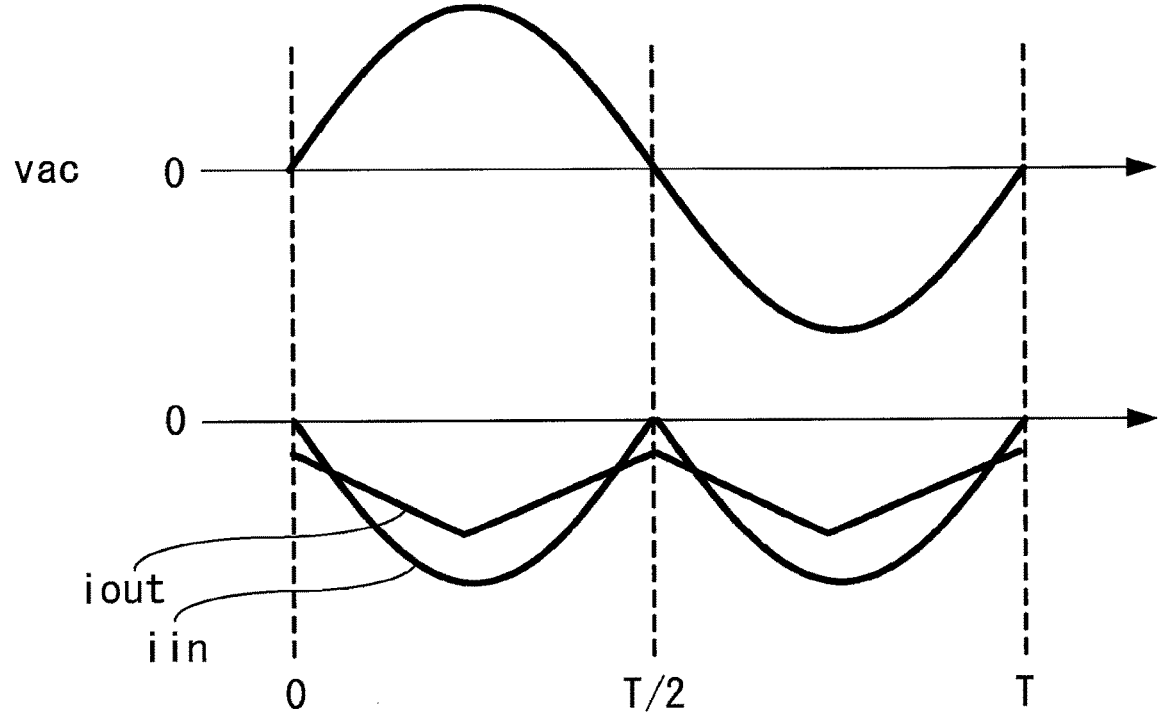
FIG. 42 is a waveform diagram showing input and output currents of the DC capacitor in regeneration operation of the power conversion device according to embodiment 4 of the present invention.

FIG. 42 is a waveform diagram showing input and output currents of the DC capacitor 5 in regeneration operation.

As shown in FIG. 42, at the zero cross phase of the AC power supply 1, the absolute value of output current iout becomes minimum along with input current iin of the DC capacitor 5 becoming almost zero. At the peak phase, the absolute value of output current iout becomes maximum along with the absolute value of input current iin becoming maximum. Thus, the charge/discharge current (iin−iout), which is ripple current, compensated by the DC capacitor 5 can be suppressed, and the ripple voltage vc2 and the ripple current effective value of the DC capacitor 5 can be suppressed.

Also in this case, the frequency component twice as high as the frequency of the AC power supply 1 is focused on, without considering a current component having a carrier frequency of the AC/DC converter 4c and the DC/DC converter 6a.

Figure 43:
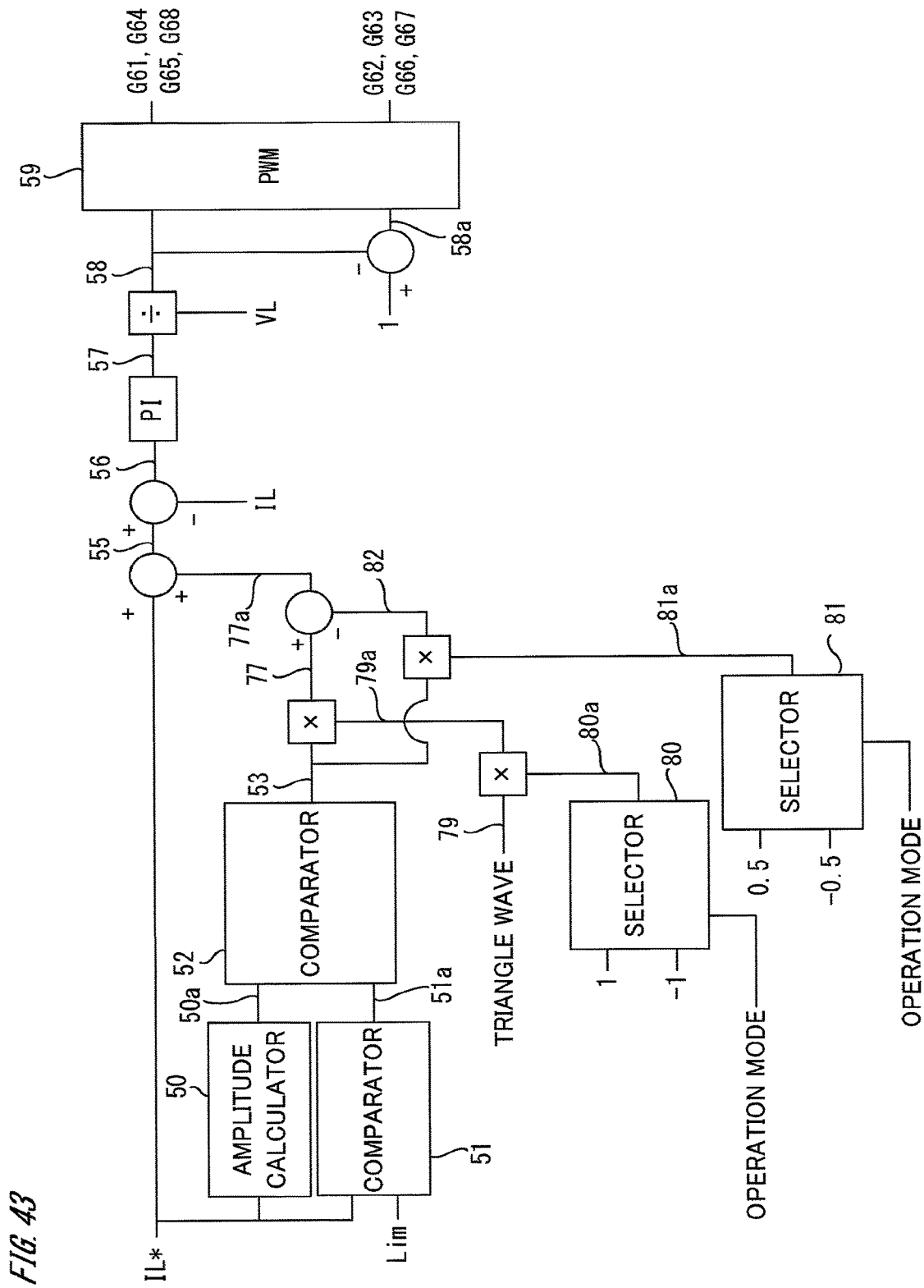
FIG. 43 is a control block diagram showing generation of gate signals for a DC/DC converter according to embodiment 4 of the present invention.

FIG. 43 is a control block diagram showing generation of gate signals G61 to G68 for the respective semiconductor switching elements 61a to 68a in the DC/DC converter 6a, in the control circuit 10c according to the present embodiment 4.

A command value IL* for load current IL outputted to the load 9a is a DC current command having only a DC component, and becomes a positive command value in the case of power-running operation and becomes a negative command value in the case of regeneration operation. As in the above embodiment 2, an amplitude calculator 50 calculates the ripple current peak value 50a on the basis of the command value IL*. The ripple current peak value 50a corresponds to the peak-to-peak value of the triangle wave. A comparator 52 outputs an amplitude 53 corresponding to the peak-to-peak value of the triangle wave, on the basis of the ripple current peak value 50a.

A selector 80 receives an operation mode type, i.e., the power-running mode or the regeneration mode, and a triangle wave 79 having a frequency twice as high as the frequency of AC voltage vac is selected with a polarity 80a according to the operation mode, thereby outputting a triangle wave signal 79a with the polarity thereof inverted between the power-running mode and the regeneration mode. In the power-running mode, the triangle wave signal 79a has the minimum value at the zero cross phase of AC voltage vac and has the maximum value at the peak phase thereof, and this is reversed in the regeneration mode. In addition, a selector 81 receives an operation mode type, i.e., the power-running mode or the regeneration mode, and outputs a coefficient 81a according to the operation mode. The amplitude 53 is multiplied by the coefficient 81a, to generate an offset amount 82. The coefficient 81a is 0.5 in the power-running mode, and −0.5 in the regeneration mode.

Next, the offset amount 82 is subtracted from a current command 77 obtained by multiplying the amplitude 53 by the triangle wave signal 79a, thereby calculating a ripple current command 77a as the AC current command.

The control circuit 10c adds the calculated ripple current command 77a to the command value IL* for load current IL, thereby generating a current command value 55 containing ripple current, as an output current command for the DC/DC converter 6a.

Thereafter, as in the above embodiment 2, the current command value 55 is compared with detected load current IL, and the resultant deviation 56 is subjected to PI control, to calculate a voltage command value 57. The voltage command value 57 is divided by DC voltage VL of the load 9a, thereby calculating a duty cycle 58.

Then, on the basis of the duty cycle 58 and using a carrier signal, a PWM circuit 59 generates gate signals G61 to G68 for the semiconductor switching elements 61a to 68a in the first full-bridge circuit 6b and the second full-bridge circuit 6c of the DC/DC converter 6a.

Also in the present embodiment, as in the above embodiments 1 and 2, ripple voltage and ripple current of the DC capacitor 5 can be reduced, and size reduction of the DC capacitor 5 and size reduction and cost reduction of the power conversion device 101 can be achieved.

Embodiment 5

Next, a power conversion device according to embodiment 5 of the present invention will be described.

In the present embodiment 5, using the same circuit configuration as in the above embodiment 1, the duty cycle for the DC/DC converter 6 is set to be constant, and the voltage command value Vdc* which is a voltage command for the DC capacitor 5 is adjusted to control the AC/DC converter 4.

Figure 44:
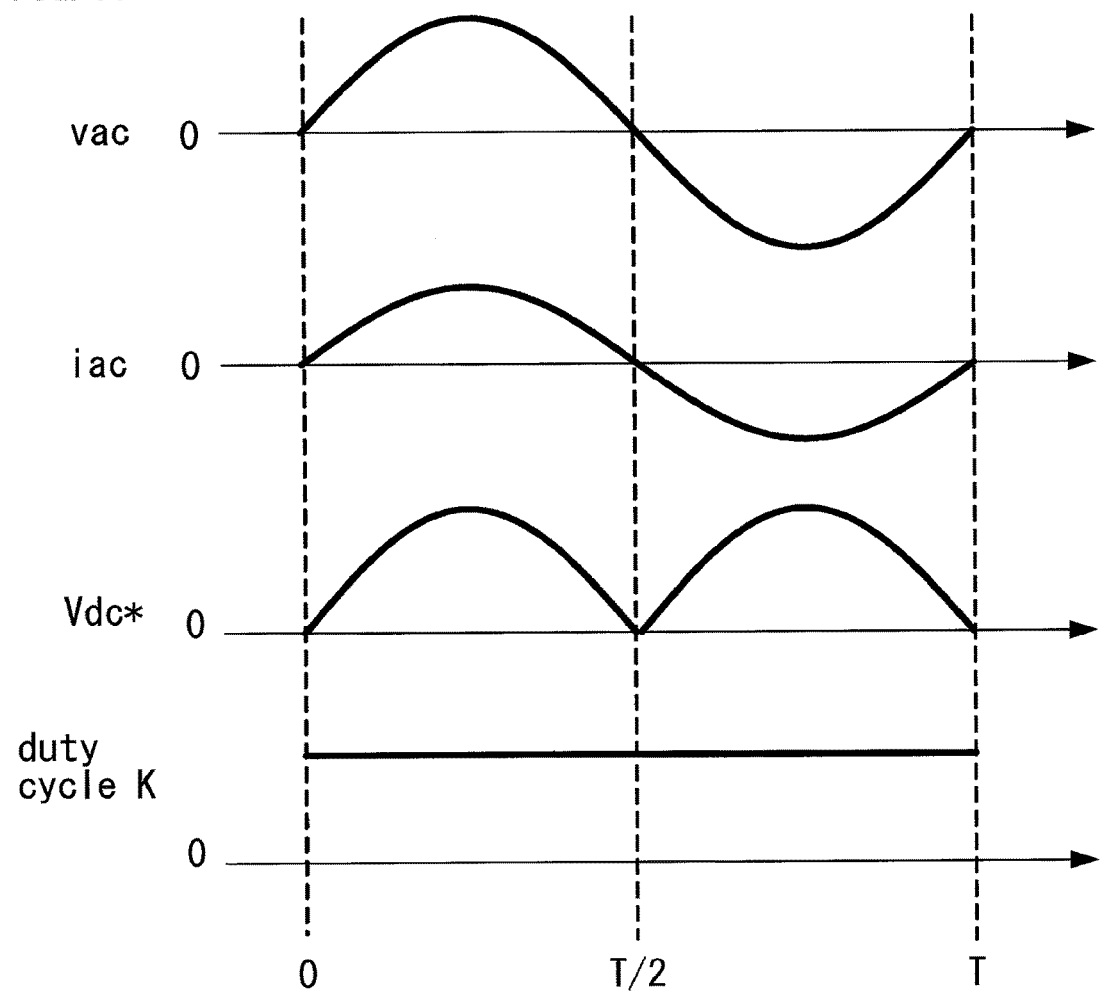
FIG. 44 is a waveform diagram at each section, illustrating operation of a power conversion device according to embodiment 5 of the present invention.

FIG. 44 is a waveform diagram showing voltage vac and current iac of the AC power supply 1, the voltage command value Vdc* for the DC capacitor 5, and a duty cycle K for controlling the DC/DC converter 6. Voltage vc1 of the DC capacitor 5 is controlled to the voltage command value Vdc* obtained by full-wave-rectifying a sinewave synchronized with AC voltage vac.

Next, control for the AC/DC converter 4 and the DC/DC converter 6 by the control circuit 10 will be described.

Figure 45:
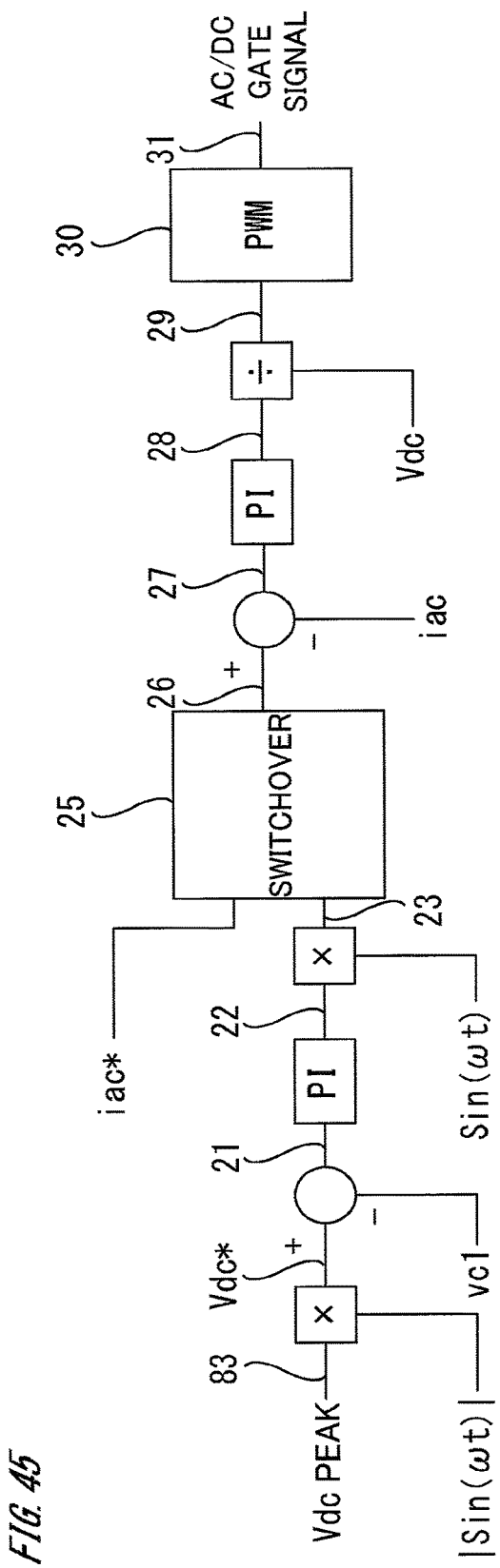
FIG. 45 is a control block diagram showing generation of a gate signal for an AC/DC converter according to embodiment 5 of the present invention.

FIG. 45 is a control block diagram showing generation of a gate signal for the AC/DC converter 4, in the control circuit 10 according to the present embodiment 5. In control for the AC/DC converter 4, the control circuit 10 controls current iac inputted from the AC power supply 1, at a power factor of 1 with respect to voltage vac of the AC power supply 1. Further, the control circuit 10 selectively performs voltage control for the DC capacitor 5.

In the present embodiment, the case where voltage vc1 of the DC capacitor 5 is controlled to the voltage command value Vdc* is shown.

A peak value 83 for DC voltage Vdc of the DC capacitor 5 is set, and the peak value 83 is multiplied by a sinewave |sin ωt| obtained by full-wave-rectifying AC voltage vac, to obtain the voltage command value Vdc* for the DC capacitor 5.

The control circuit 10 performs PI control on a deviation 21 between the voltage command value Vdc* and detected voltage vc1, to calculate a current command amplitude 22. Then, the control circuit 10 multiplies the current command amplitude 22 by a sinewave signal sin wt having the same phase as voltage vac of the AC power supply 1, thereby calculating a current command 23.

In control for the AC/DC converter 4, in the case where the control circuit 10 performs only high power factor control for current iac without performing voltage control for the DC capacitor 5, a current command iac* is prepared.

A switchover device 25 selects one of the current command 23 and the current command iac*, as a current command 26, in accordance with whether or not to perform voltage control for the DC capacitor 5.

Next, as in the above embodiment 1, the control circuit 10 performs PI control on a deviation 27 between the current command 26 and detected current iac, to calculate a voltage command value 28, and divides the voltage command value 28 by the DC voltage component Vdc of the DC capacitor 5, thereby calculating a duty cycle 29. Then, the PWM circuit 30 generates a gate signal 31 for performing PWM control for the AC/DC converter 4, on the basis of the duty cycle 29.

Figure 46:
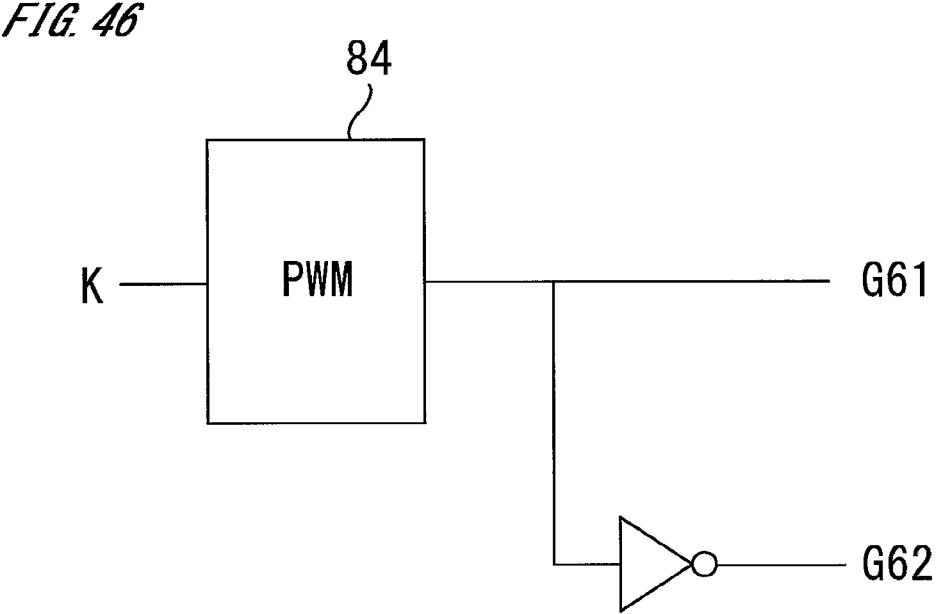
FIG. 46 is a control block diagram showing generation of gate signals for a DC/DC converter according to embodiment 5 of the present invention.

FIG. 46 is a control block diagram showing generation of gate signals for the DC/DC converter 6.

A PWM circuit 84 generates a gate signal G61 for the semiconductor switching element 61a in the DC/DC converter 6, on the basis of a fixed duty cycle K and using a carrier signal. In addition, an inversion device inverts the gate signal G61 to obtain a gate signal G62 for the semiconductor switching element 62a.

In the present embodiment, the voltage command value Vdc* for the DC capacitor 5, which is used for output control for the AC/DC converter 4, contains an AC voltage component, and is generated by multiplying the peak value 83 by the sinewave |sin ωt| obtained by full-wave-rectifying AC voltage vac. In this case, by controlling voltage of the DC capacitor 5, ripple voltage having a frequency twice as high as the frequency of AC voltage vac is arbitrarily generated on the DC capacitor 5. In this case, a voltage difference between AC voltage vac and voltage vc1 of the DC capacitor 5 within the switching cycle is significantly reduced. Thus, the amount of power compensated by the DC capacitor 5 within the switching cycle is greatly reduced, whereby a necessary capacitance of the capacitor can be reduced.

Thus, size reduction of the DC capacitor 5 and size reduction and cost reduction of the power conversion device 100 can be achieved.

It is noted that, within the scope of the present invention, the above embodiments may be freely combined with each other, or each of the above embodiments may be modified or simplified as appropriate.

The invention claimed is:

1. A power conversion device comprising:
an AC/DC converter for performing power factor correction control for a single-phase AC power supply and converting AC power from the single-phase AC power supply, to DC power;
a DC/DC converter which is connected to a DC side of the AC/DC converter and performs voltage conversion of DC power;
a DC capacitor connected between positive and negative DC buses between the AC/DC converter and the DC/DC converter; and
a control circuit for performing output control for the AC/DC converter and the DC/DC converter, wherein
the control circuit superimposes, onto a DC current command, an AC current command decided according to information of ripple voltage derived from the DC capacitor, having a minimum value at a zero cross phase of the single-phase AC power supply and having a maximum value at a peak phase thereof, to generate an output current command for the DC/DC converter, and performs the output control for the DC/DC converter, using the output current command.

2. The power conversion device according to claim 1, wherein
the AC current command is a sinewave current command having a frequency 2×(2n−1) times as high as a fundamental frequency of the single-phase AC power supply, therein n is a natural number.

3. The power conversion device according to claim 2, wherein
the AC current command is generated with a phase thereof lagging by (π/2) relative to a fundamental wave obtained by converting a frequency of sinewave voltage of the single-phase AC power supply.

4. The power conversion device according to claim 1, wherein
the AC current command has a waveform obtained by full-wave-rectifying a sinewave synchronized with AC voltage of the single-phase AC power supply.

5. The power conversion device according to claim 1, wherein
the AC current command is a triangle wave current command having a frequency twice as high as a fundamental frequency of the single-phase AC power supply.

6. The power conversion device according to claim 1, wherein
the AC current command is set such that an average value thereof within one cycle is zero.

7. The power conversion device according to claim 1, wherein
an amplitude of the AC current command is determined based on of an amplitude target value of ripple voltage or ripple current of the DC capacitor.

8. The power conversion device according to claim 1, wherein
an amplitude of the AC current command is determined on the basis of a capacitance target value for the DC capacitor.

9. The power conversion device according to claim 1, wherein
in a case where an amplitude of the AC current command is set in advance, the control circuit adjusts DC voltage of the DC capacitor so as to reduce ripple voltage.

10. The power conversion device according to claim 1, wherein
an amplitude of the AC current command is equal to or smaller than a value of the DC current command.

11. The power conversion device according to claim 1, wherein
the AC/DC converter has a function of converting DC power to AC power to perform power regeneration to the single-phase AC power supply,
the control circuit has two operation modes of a power-running mode for performing power transmission from the single-phase AC power supply, and a regeneration mode for performing power regeneration to the single-phase AC power supply, and
in generating the output current command for the DC/DC converter by superimposing the AC current command onto the DC current command, in the regeneration mode, the control circuit keeps an amplitude, a frequency, and an initial phase of the AC current command as they are in the power-running mode, and inverts polarities of the AC current command and the DC current command from those in the power-running mode.

12. The power conversion device according to claim 1, wherein
the DC capacitor is formed from an aluminum electrolytic capacitor.

13. The power conversion device according to claim 1, wherein
a battery load is connected to the DC/DC converter.

14. The power conversion device according to claim 2, wherein
the AC current command is set such that an average value thereof within one cycle is zero.

15. The power conversion device according to claim 2, wherein
an amplitude of the AC current command is determined based on of an amplitude target value of ripple voltage or ripple current of the DC capacitor.

16. The power conversion device according to claim 2, wherein
an amplitude of the AC current command is determined based on of a capacitance target value for the DC capacitor.

17. The power conversion device according to claim 2, wherein
in a case where an amplitude of the AC current command is set in advance, the control circuit adjusts DC voltage of the DC capacitor so as to reduce ripple voltage.

18. A power conversion device comprising:
an AC/DC converter for performing power factor correction control for a single-phase AC power supply and converting AC power from the single-phase AC power supply, to DC power;
a DC/DC converter which is connected to a DC side of the AC/DC converter and performs voltage conversion of DC power;
a DC capacitor connected between positive and negative DC buses between the AC/DC converter and the DC/DC converter; and
a control circuit for performing output control for the AC/DC converter and the DC/DC converter, wherein
the control circuit controls the DC/DC converter with a constant duty cycle, generates a voltage command for the DC capacitor so as to contain an AC voltage component, and performs the output control for the AC/DC converter, using an output current command based on the voltage command which has a waveform obtained by full-wave-rectifying a sinewave synchronized with AC voltage of the single-phase AC power supply.

* * * * *